US012318951B2

(12) United States Patent
Abouelela et al.

(10) Patent No.: US 12,318,951 B2
(45) Date of Patent: Jun. 3, 2025

(54) SYSTEMS AND METHODS FOR OBJECT DETECTION

(71) Applicant: MUJIN, INC., Tokyo (JP)

(72) Inventors: Ahmed Abouelela, Tokyo (JP); Hamdi Sahloul, Tokyo (JP); Jose Jeronimo Moreira Rodrigues, Tokyo (JP); Xutao Ye, Tokyo (JP); Jinze Yu, Tokyo (JP)

( * ) Notice: Subject to any disclaimer, the term of this patent is extended or adjusted under 35 U.S.C. 154(b) by 165 days.

(21) Appl. No.: 17/884,151

(22) Filed: Aug. 9, 2022

(65) Prior Publication Data

US 2023/0044001 A1 Feb. 9, 2023

Related U.S. Application Data

(60) Provisional application No. 63/230,931, filed on Aug. 9, 2021.

(51) Int. Cl.
| | | |
|---|---|---|
| *G06T 7/70* | (2017.01) | |
| *B25J 9/16* | (2006.01) | |
| *G06T 7/00* | (2017.01) | |
| *G06T 7/73* | (2017.01) | |
| *G06V 10/44* | (2022.01) | |

(Continued)

(52) U.S. Cl.
CPC ............ *B25J 9/1697* (2013.01); *B25J 9/1664* (2013.01); *B25J 9/1669* (2013.01); *G06T 7/0002* (2013.01); *G06T 7/70* (2017.01); *G06T 7/74* (2017.01); *G06V 10/443* (2022.01); *G06V 10/751* (2022.01); *G06V 10/7515* (2022.01); *G06V 10/7715* (2022.01); *G06V 10/776* (2022.01); *G06V 20/50* (2022.01); *G06V 20/653* (2022.01); *G06T 2207/30168* (2013.01); *G06V 2201/06* (2022.01)

(58) Field of Classification Search
CPC ...... B25J 9/1697; B25J 9/1664; B25J 9/1669; B25J 19/02; G06T 7/0002; G06T 7/70; G06T 7/74; G06T 2207/30168; G06V 10/443; G06V 10/751; G06V 10/7515; G06V 10/7715; G06V 10/776; G06V 20/50; G06V 20/653; G06V 2201/06; G06V 20/60; G06V 20/64
USPC ........................................................ 382/103
See application file for complete search history.

(56) References Cited

U.S. PATENT DOCUMENTS

| | | |
|---|---|---|
| 11,006,039 B1 | 5/2021 | Yu et al. |
| 2004/0225472 A1 | 11/2004 | Kraft |

(Continued)

OTHER PUBLICATIONS

Hodan, Tomas, et al. "Detection and fine 3D pose estimation of texture-less objects in RGB-D images." 2015 IEEE/RSJ International Conference on Intelligent Robots and Systems (IROS). IEEE, 2015. (Year: 2015).
Poli, Riccardo, James Kennedy, and Tim Blackwell. "Particle swarm optimization: An overview." Swarm intelligence 1 (2007): 33-57. (Year: 2007).

(Continued)

*Primary Examiner* — Stephen P Coleman
(74) *Attorney, Agent, or Firm* — MEDLER FERRO WOODHOUSE & MILLS PLLC

(57) ABSTRACT

A computing system including a processing circuit in communication with a camera having a field of view. The processing circuit is configured to perform operations related to detecting, identifying, and retrieving objects disposed amongst a plurality of objects. The processing circuit may be configured to perform operations related to object recognition template generation, feature generation, hypothesis generation, hypothesis refinement, and hypothesis validation.

20 Claims, 29 Drawing Sheets

(51) Int. Cl.
  *G06V 10/75* (2022.01)
  *G06V 10/77* (2022.01)
  *G06V 10/776* (2022.01)
  *G06V 20/50* (2022.01)
  *G06V 20/64* (2022.01)

(56) References Cited

U.S. PATENT DOCUMENTS

| | | |
|---|---|---|
| 2011/0157178 A1 | 6/2011 | Tuzel |
| 2012/0098961 A1 | 4/2012 | Handa et al. |
| 2013/0271458 A1* | 10/2013 | Andriluka ............. G06V 40/23 345/619 |
| 2017/0220887 A1 | 8/2017 | Fathi et al. |
| 2019/0272411 A1 | 9/2019 | Zou |

OTHER PUBLICATIONS

Cao, Thanh-Tung, et al. "Parallel banding algorithm to compute exact distance transform with the GPU." Proceedings of the 2010 ACM SIGGRAPH symposium on Interactive 3D Graphics and Games. 2010. (Year: 2010).

Zielinski, Karin, and Rainer Laur. "Stopping criteria for a constrained single-objective particle swarm optimization algorithm." Informatica 31.1 (2007): 51-59. (Year: 2007).

He, Ruotao, Juan Rojas, and Yisheng Guan. "A 3D Object Detection and Pose Estimation Pipeline Using RGB-D Images." arXiv preprint arXiv: 1703.03940v1 (2017). (Year: 2017).

Hinterstoisser, Stefan, et al. "Gradient response maps for real-time detection of textureless objects." IEEE transactions on pattern analysis and machine intelligence 34.5 (2011): 876-888. (Year: 2011).

* cited by examiner

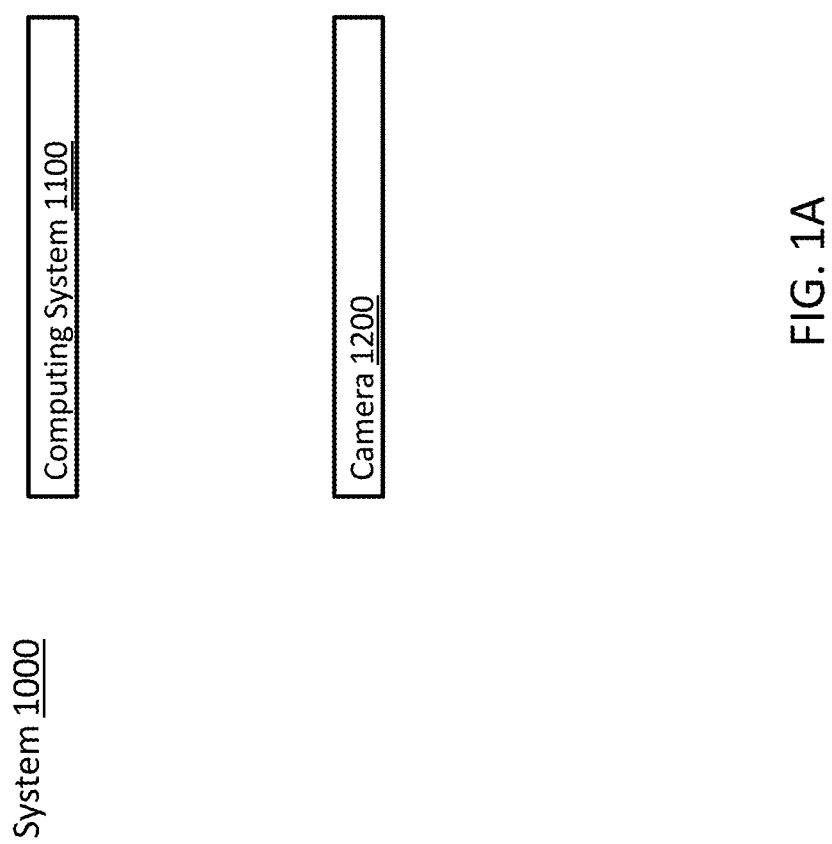

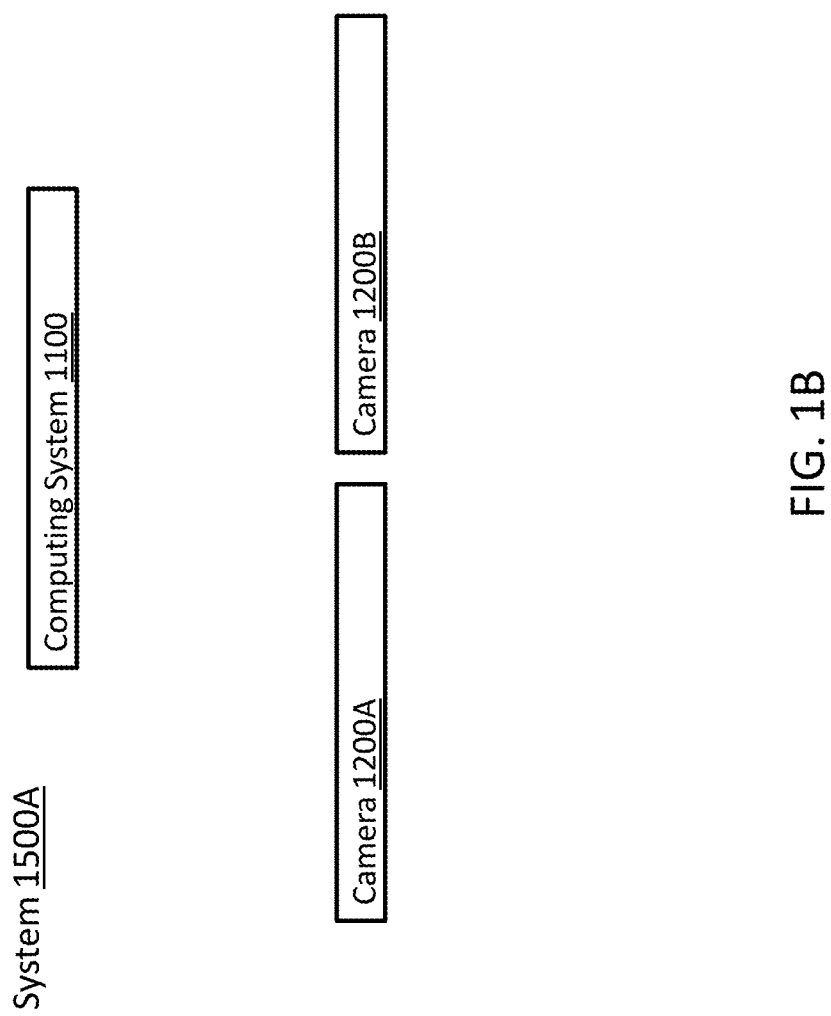

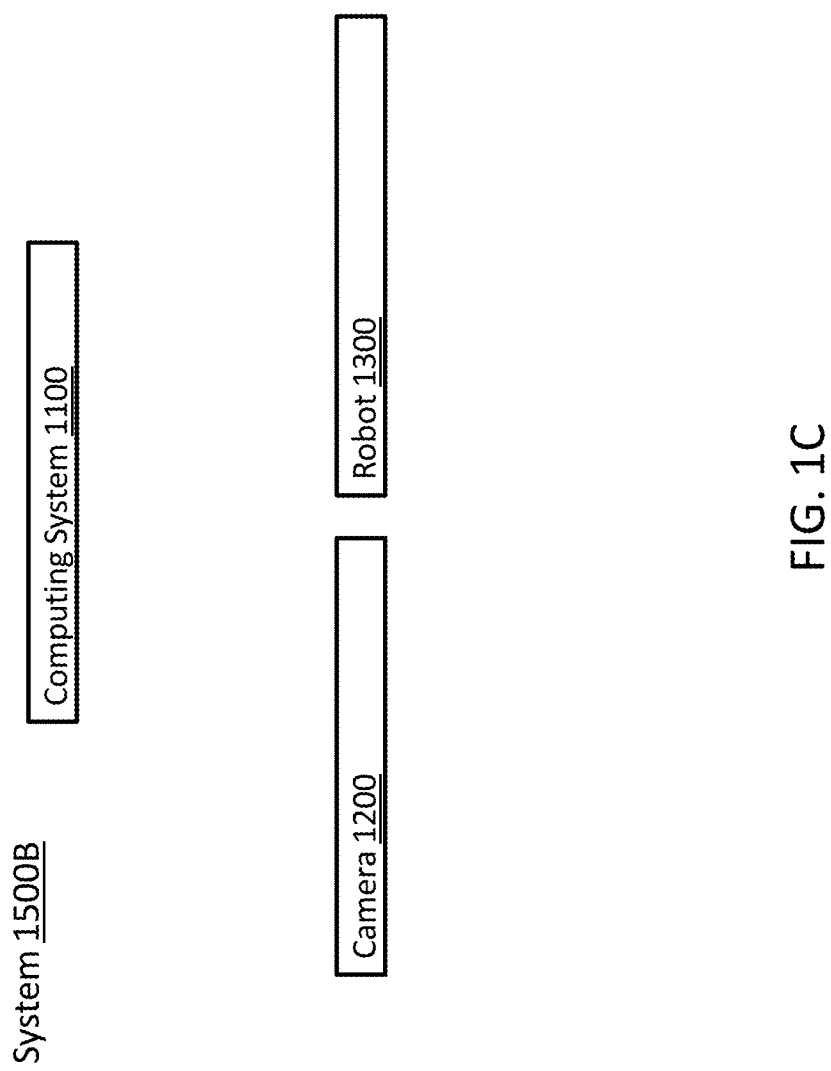

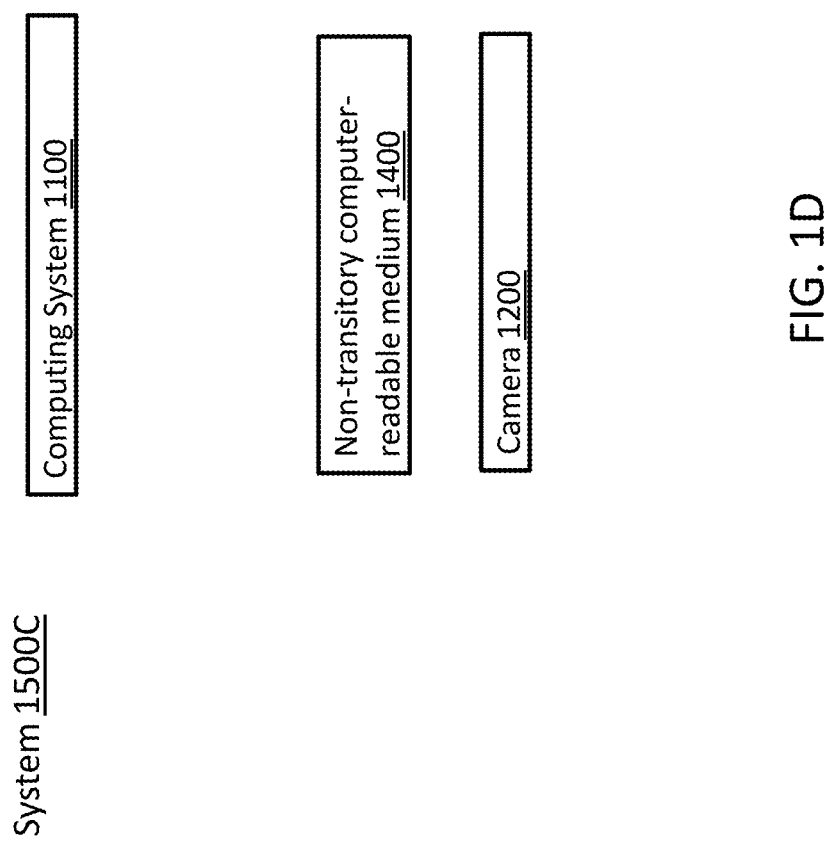

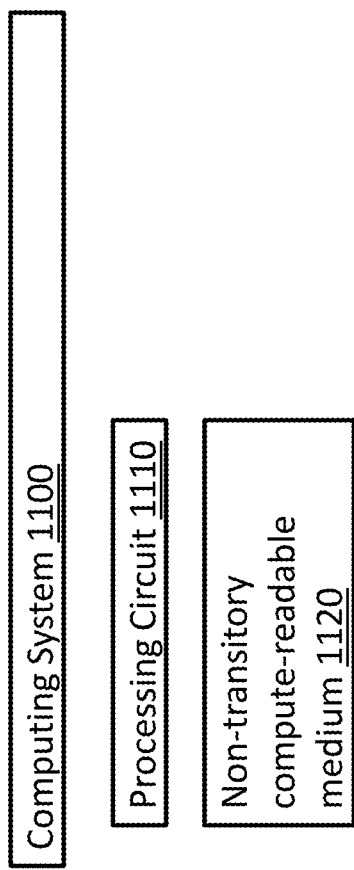

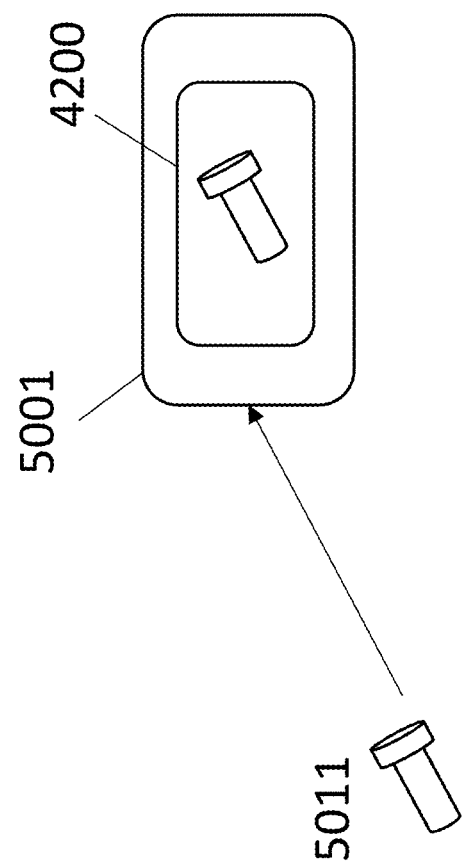

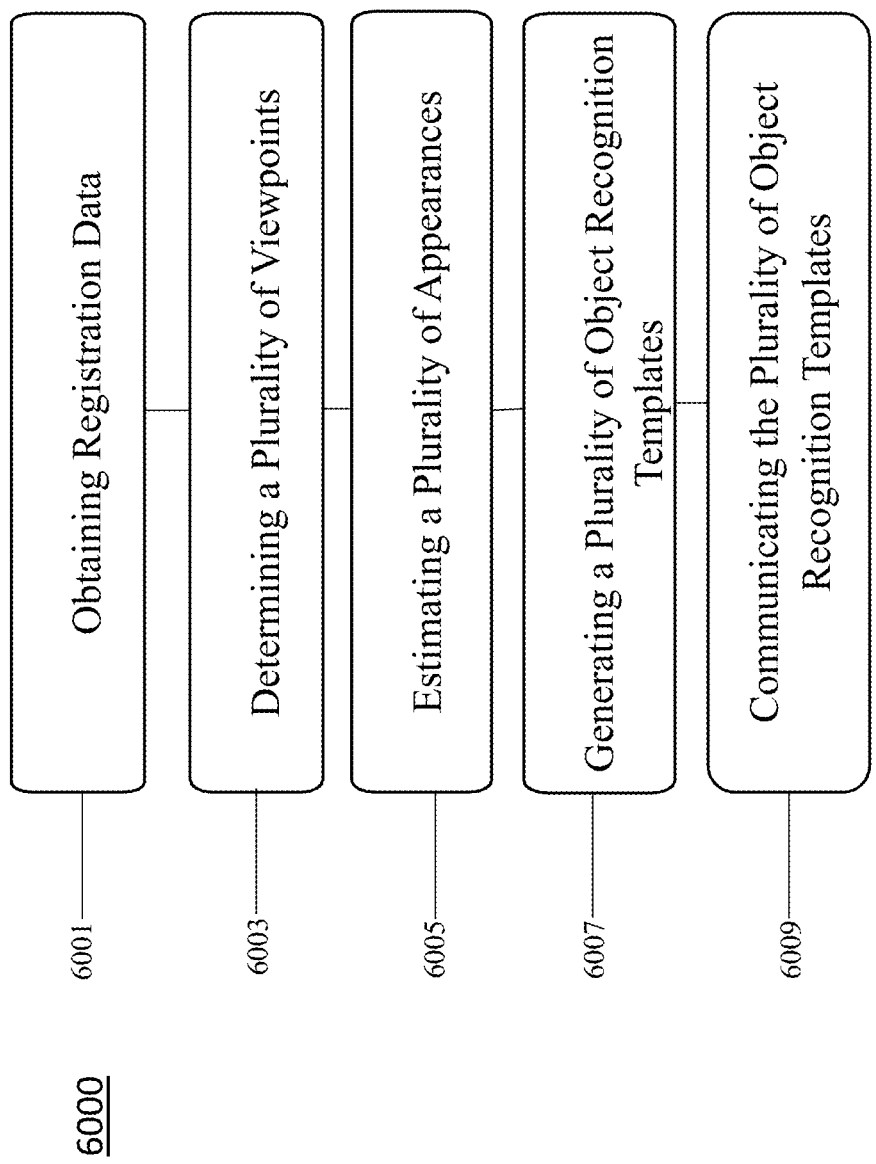

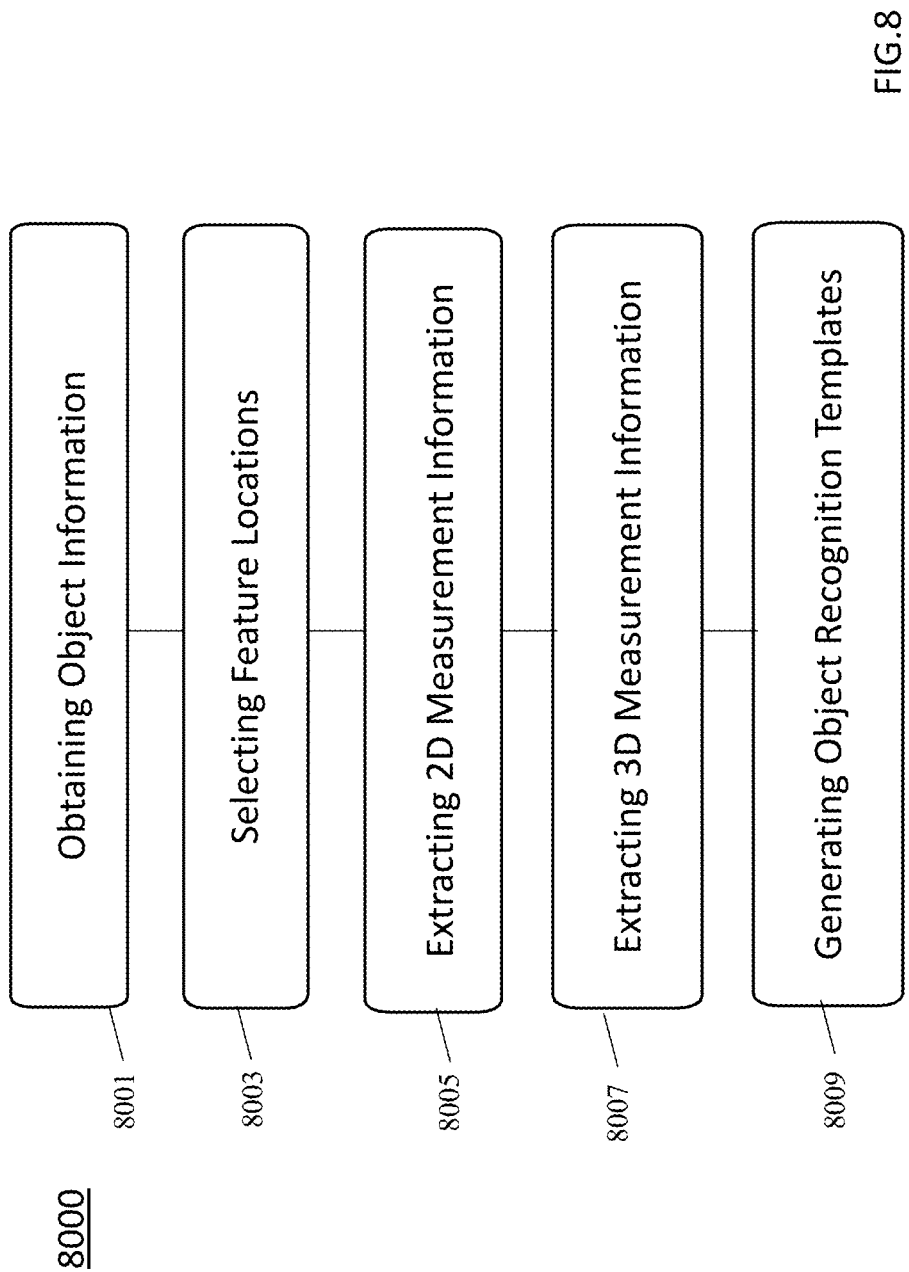

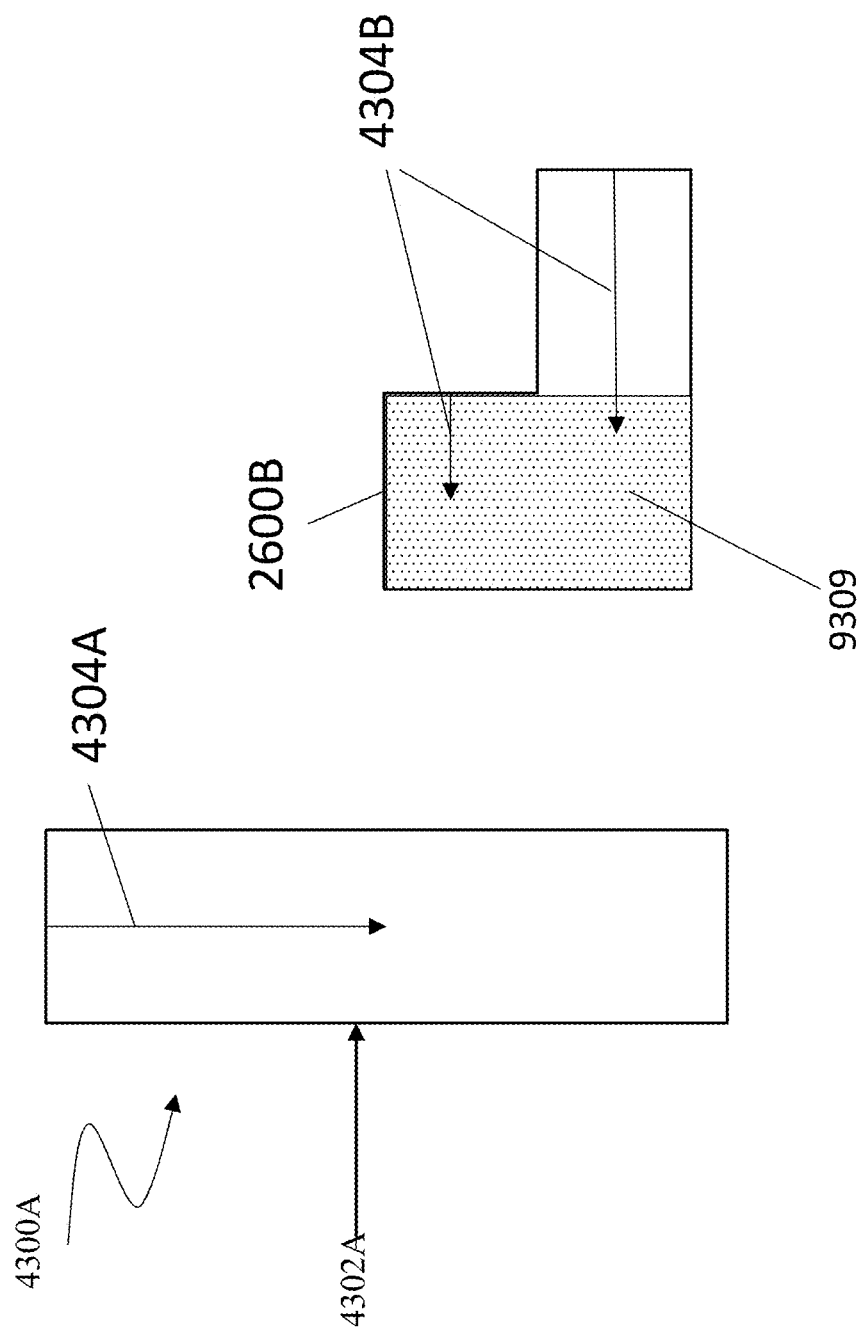

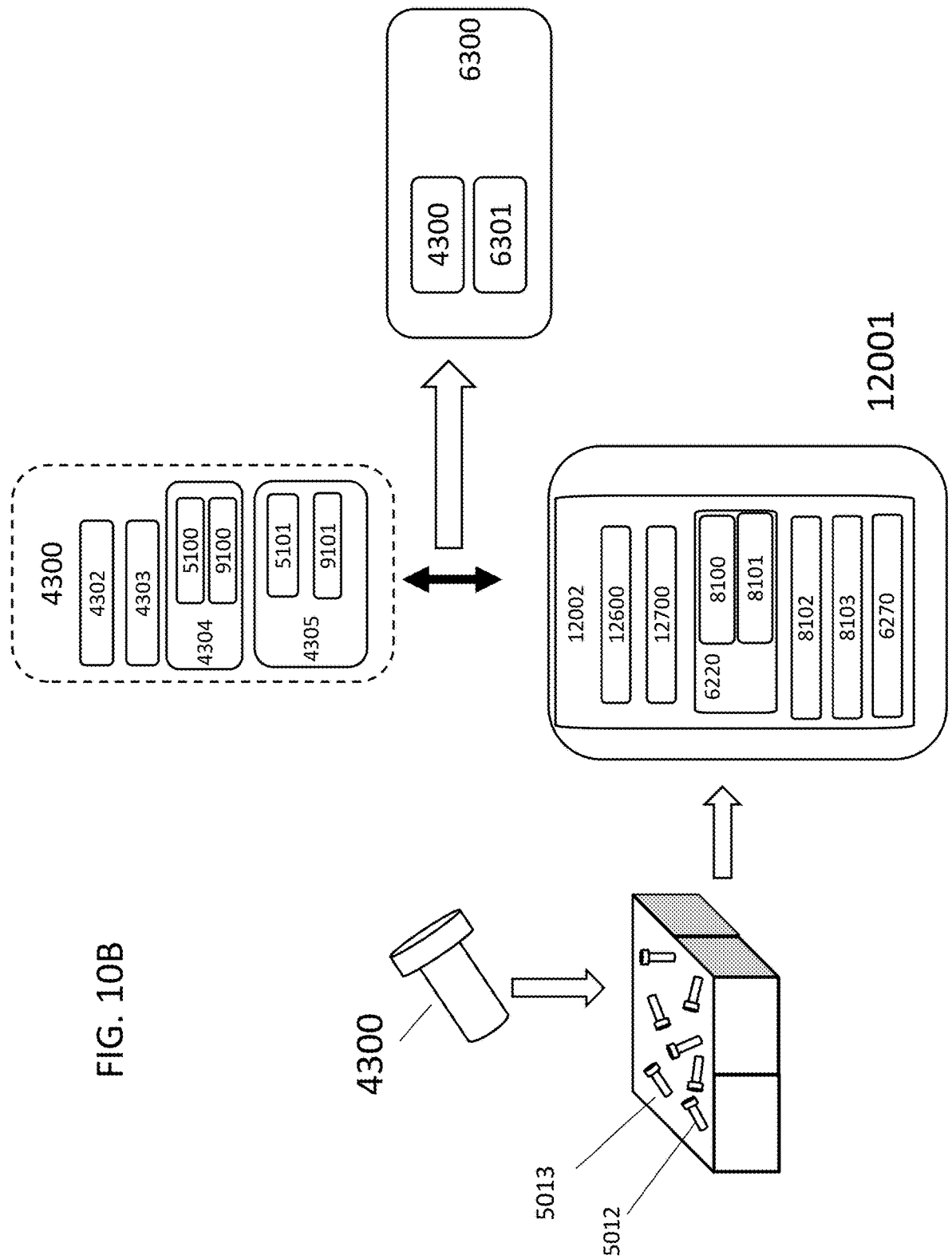

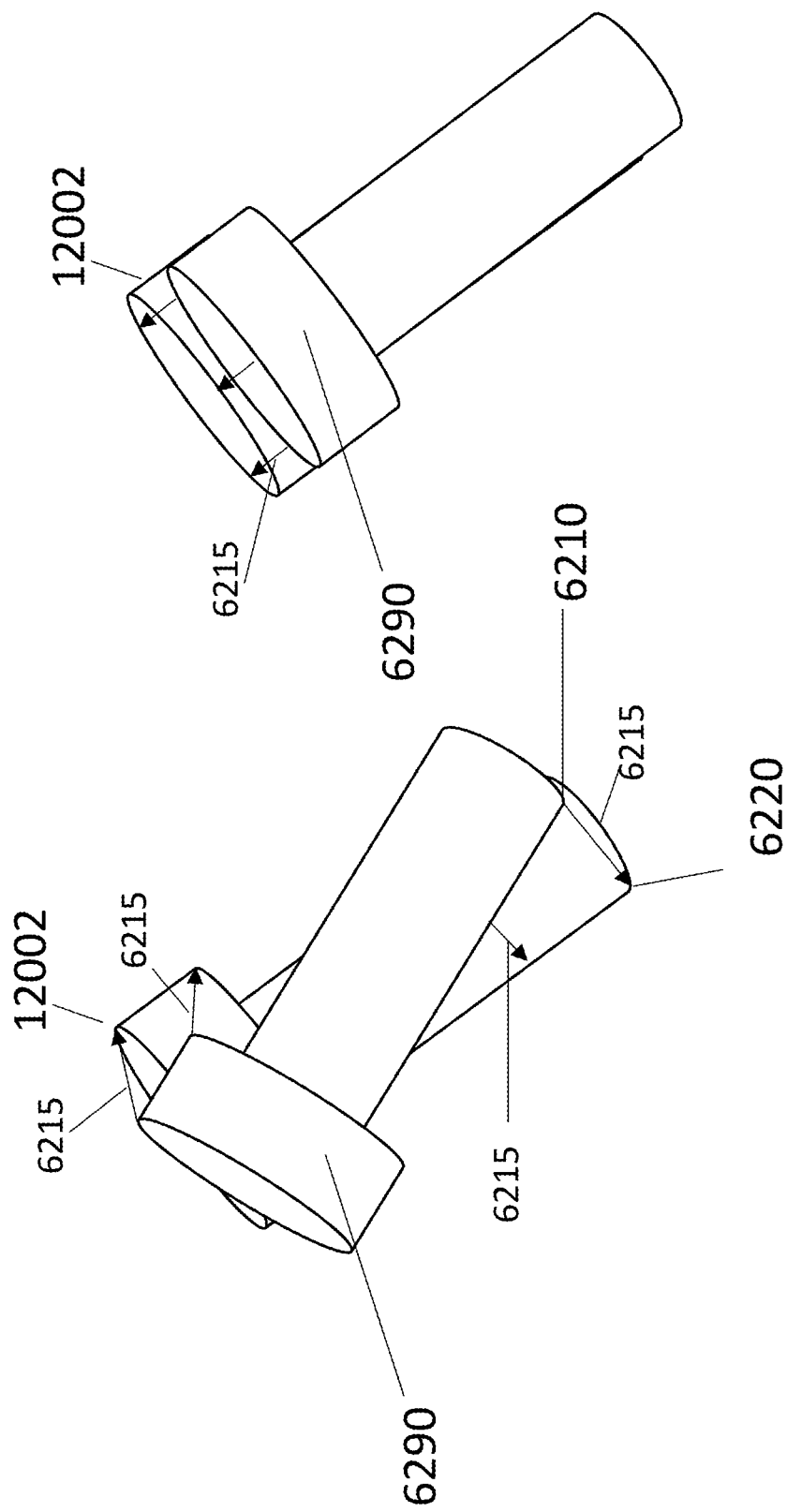

SYSTEMS AND METHODS FOR OBJECT DETECTION

CROSS-REFERENCE TO RELATED APPLICATION(S)

The present application claims the benefit of U.S. Provisional Appl. No. 63/230,931, entitled "A ROBOTIC SYSTEM FOR FACILITATING TEMPLATE MATCHING AND DETECTION FOR OBJECT PICKING" and filed Aug. 9, 2021, the entire content of which is incorporated by reference herein.

FIELD OF THE INVENTION

The present technology is directed generally to robotic systems and, more specifically, to systems, processes, and techniques for identifying and detection objects. More particularly, the present technology may be used for identifying and detection objects in containers.

BACKGROUND

With their ever-increasing performance and lowering cost, many robots (e.g., machines configured to automatically/autonomously execute physical actions) are now extensively used in various different fields. Robots, for example, can be used to execute various tasks (e.g., manipulate or transfer an object through space) in manufacturing and/or assembly, packing and/or packaging, transport and/or shipping, etc. In executing the tasks, the robots can replicate human actions, thereby replacing or reducing human involvements that are otherwise required to perform dangerous or repetitive tasks.

However, despite the technological advancements, robots often lack the sophistication necessary to duplicate human interactions required for executing larger and/or more complex tasks. Accordingly, there remains a need for improved techniques and systems for managing operations and/or interactions between robots.

BRIEF SUMMARY

In an embodiment, a computing system configured to generate an object recognition template set for identifying an object in a scene is provided. The computing system includes at least one processing circuit configured for the following. Obtaining registration data of the object, where the registration data includes an object model representative of the object; determining a plurality of viewpoints of the object model in a three-dimensional space; estimating a plurality of appearances of the object model at each of the plurality of viewpoints; generating a plurality of object recognition templates according to the plurality of appearances, where each of the plurality of object recognition templates correspond to a respective one of the plurality of appearances; and communicating the plurality of object recognition templates as the object recognition template set to a robotic control system. Each of the plurality of object recognition templates represent a pose the object may have relative to an optical axis of a camera generating image information of the object within the scene.

In another embodiment, a method of generating an object recognition template set for identifying an object in a scene is provided. The method comprises obtaining a registration data of the object, the registration data including an object model representative of the object; determining a plurality of viewpoints of the object model in a three-dimensional space; estimating a plurality of appearances of the object model at each of the plurality of viewpoints; generating a plurality of object recognition templates according to the plurality of appearances, where each of the plurality of object recognition templates correspond to a respective one of the plurality of appearances; and communicating the plurality of object recognition templates as the object recognition set to a robotic control system. Each of the plurality of object recognition templates represent a pose the object may have relative to an optical axis of a camera generating image information of the object within the scene.

In another embodiment, a non-transitory computer readable medium, configured with executable instructions for implementing a method for generating an object recognition template for identifying an object in a scene, operable by at least one processing circuit via a communication interface configured to communicate with a robotic system is provided. The method comprises receiving a registration data of the object, the registration data including an object model representative of the object; performing an operation to generate a plurality of viewpoints of the object model in a three-dimensional space; performing an operation to estimate a plurality of appearances of the object model at each of the plurality of viewpoints; performing an operation to generate a plurality of object recognition templates according to the plurality of appearances, where each of the plurality of object recognition templates correspond to a respective one of the plurality of appearances; and outputting the plurality of object recognition templates as the object recognition template set to the robotic system. Each of the plurality of object recognition templates represent a pose the object may have relative to an optical axis of a camera generating image information of the object within the scene.

In another embodiment, a computing system configured to generate an object recognition template for identifying an object in a scene is provided. The computing system includes at least one processing circuit. The processing circuit is configured for the following steps. Obtaining object information including a digitally represented object; extracting two-dimensional measurement information from the object information; extracting three-dimensional measurement information from the object information; and generating an object recognition template according to the two-dimensional measurement information and the three-dimensional measurement information.

In another embodiment, a method of generating an object recognition template for identifying an object in a scene is provided. The method comprises obtaining object information including a digitally represented object; extracting two-dimensional measurement information from the object information; extracting three-dimensional measurement information from the object information; and generating an object recognition template according to the two-dimensional measurement information and the three-dimensional measurement information.

In another embodiment, A non-transitory computer readable medium, configured with executable instructions for implementing a method for generating an object recognition template for identifying an object in a scene, operable by at least one processing circuit via a communication interface configured to communicate with a robotic system is provided. The method comprises receiving object information including a digitally represented object; performing an operation to extract two-dimensional measurement information from the object information; performing an operation to extract three-dimensional measurement information from the object information; and outputting an object recognition template to the robotic system according to the two-dimensional measurement information and the three-dimensional measurement information.

In another embodiment, a computing system is provided. The computing system includes at least one processing circuit in communication with a robot, having an arm and an end-effector connected thereto, and a camera having a field of view and configured, when one or more objects are or have been in the field of view, to execute instructions stored on a non-transitory computer-readable medium. The instructions executed include obtaining object image information of an object in a scene; obtaining a detection hypothesis including a corresponding object recognition template representing a template object; identifying a discrepancy between the template object and the object image information; identifying a set of template locations in the template object corresponding to a set of object locations of the object image information; adjusting the set of template locations to converge to the set of object locations; and generating an adjusted detection hypothesis including an adjusted corresponding object recognition template according to the set of template locations after adjustment.

In another embodiment, a method is provided. The method comprises obtaining object image information of an object in a scene; obtaining a detection hypothesis including a corresponding object recognition template representing a template object; identifying a discrepancy between the template object and the object image information; identifying a set of template locations in the template object corresponding to a set of object locations of the object image information; adjusting the set of template locations to converge to the set of object locations; and generating an adjusted detection hypothesis including an adjusted corresponding object recognition template according to the set of template locations after adjustment.

In another embodiment, a non-transitory computer readable medium, configured with executable instructions for implementing a method for refining a detection hypothesis, operable by at least one processing circuit via a communication interface configured to communicate with a robotic system is provided. The method comprises receiving object image information of an object in a scene; receiving a detection hypothesis including a corresponding object recognition template representing a template object; performing an operation to identify a discrepancy between the template object and the object image information; performing an operation to identify a set of template locations in the template object corresponding to a set of object locations of the object image information; performing an operation to adjust the set of template locations to converge to the set of object locations; and outputting to the robotic system an adjusted detection hypothesis including an adjusted corresponding object recognition template according to the set of template locations after adjustment.

In another embodiment, a computing system is provided. The computing system includes at least one processing circuit in communication with a robot, having an arm and an end-effector connected thereto, and a camera having a field of view and configured, when one or more objects are or have been in the field of view, to execute instructions stored on a non-transitory computer-readable medium. The instructions executed include obtaining object image information of an object in a scene; obtaining a set of detection hypotheses, each detection hypothesis including a corresponding object recognition template representing a template object; and validating each detection hypothesis of the set of detection hypotheses by: generating a plurality of three-dimensional validation scores based on comparing three-dimensional information of the object recognition template of the detection hypothesis and three-dimensional information of the object image information corresponding to the object, the plurality of three-dimensional validation scores including at least one of an occlusion validator score, a point cloud validator score, a hole matching validator score, and a normal vector validator score; generating a plurality of two-dimensional validation scores based on comparing two-dimensional information of the corresponding object recognition template of the detection hypothesis and three-dimensional information of the object image information, the plurality of two-dimensional validation scores including at least one of a rendered match validator score and a template match validator score; filtering the detection hypothesis from the set of detection hypotheses according to the plurality of three-dimensional validation scores and the plurality of two-dimensional validation scores; and detecting the object in the scene according to unfiltered detection hypotheses remaining in the set of detection hypotheses after validating.

In another embodiment, a method is provided. The method comprises obtaining object image information of an object in a scene; obtaining a set of detection hypotheses, each detection hypothesis including a corresponding object recognition template representing a template object; and validating each detection hypothesis of the set of detection hypotheses by: generating a plurality of three-dimensional validation scores based on comparing three-dimensional information of the object recognition template of the detection hypothesis and three-dimensional information of the object image information corresponding to the object, the plurality of three-dimensional validation scores including at least one of an occlusion validator score, a point cloud validator score, a hole matching validator score, and a normal vector validator score; generating a plurality of two-dimensional validation scores based on comparing two-dimensional information of the corresponding object recognition template of the detection hypothesis and three-dimensional information of the object image information, the plurality of two-dimensional validation scores including at least one of a rendered match validator score and a template match validator score; filtering the detection hypothesis from the set of detection hypotheses according to the plurality of three-dimensional validation scores and the plurality of two-dimensional validation scores; and detecting the object in the scene according to unfiltered detection hypotheses remaining in the set of detection hypotheses after validating.

In another embodiment, a non-transitory computer readable medium, configured with executable instructions for implementing a method for validating a detection hypothesis, operable by at least one processing circuit via a communication interface configured to communicate with a robotic system is provided. The method comprises receiving object image information of an object in a scene; receiving a set of detection hypotheses, each detection hypothesis including a corresponding object recognition template representing a template object; performing an operation to generate a plurality of three-dimensional validation scores based on comparing three-dimensional information of the object recognition template of the detection hypothesis and three-dimensional information of the object image information corresponding to the object, the plurality of three-dimensional validation scores including at least one of an occlusion validator score, a point cloud validator score, a hole matching validator score, and a normal vector validator score; performing an operation to generate a plurality of two-dimensional validation scores based on comparing two-dimensional information of the corresponding object recognition template of the detection hypothesis and three-dimensional information of the object image information, the plurality of two-dimensional validation scores including at least one of a rendered match validator score and a template match validator score; performing an operation to filter the detection hypothesis from the set of detection hypotheses according to the plurality of three-dimensional validation scores and the plurality of two-dimensional validation scores; detecting the object in the scene according to unfiltered detection hypotheses remaining in the set of detection hypotheses after validating; and outputting the detected object in the scene to the robotic system.

BRIEF DESCRIPTION OF THE FIGURES

FIG. 1A illustrates a system for performing or facilitating the detection, identification, and retrieval of objects according to embodiments hereof.

FIG. 1B illustrates an embodiment of the system for performing or facilitating t the detection, identification, and retrieval of objects according to embodiments hereof.

FIG. 1C illustrates another embodiment of the system for performing or facilitating the detection, identification, and retrieval of objects according to embodiments hereof.

FIG. 1D illustrates yet another embodiment of the system for performing or facilitating the detection, identification, and retrieval of objects according to embodiments hereof.

FIG. 2A is a block diagram that illustrates a computing system configured to perform or facilitate the detection, identification, and retrieval of objects, consistent with embodiments hereof.

FIG. 5 illustrates an example of object registration data consistent with embodiments hereof.

FIG. 6 illustrates a method of generating object recognition templates consistent with embodiments hereof.

FIG. 8 illustrates a method of generating object recognition templates consistent with embodiments hereof.

FIGS. 9A-9D illustrate aspects of a method of generating object recognition templates consistent with embodiments hereof.

FIG. 10A-10B illustrate methods of object identification and hypothesis generation via template matching consistent with embodiments hereof;

FIGS. 12A-12C illustrate aspects of a method of refining detection hypotheses consistent with embodiments hereof.

DETAILED DESCRIPTION

Figure 2B:
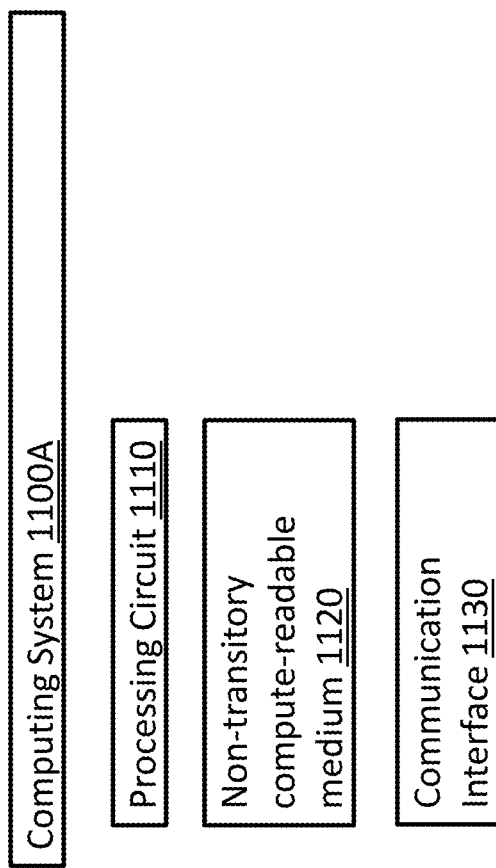
FIG. 2B is a block diagram that illustrates an embodiment of a computing system configured to perform or facilitate the detection, identification, and retrieval of objects, consistent with embodiments hereof.

Systems and methods related to object detection, identification, and retrieval are described herein. In particular, the disclosed systems and methods may facilitate object detection, identification, and retrieval where the objects are located in containers. As discussed herein, the objects may be metal or other material and may be located in containers such as boxes, bins, crates, etc. The objects may be situated in the containers in an unorganized or irregular fashion, for example, a box full of screws. Object detection and identification in such circumstances may be challenging due to the irregular arrangement of the objects, although systems and methods discussed herein may equally improve object detection, identification, and retrieval of objects that are arranged in a regular or semi-regular fashion. Accordingly, systems and methods described herein are designed to identify individual objects from among multiple objects, wherein the individual objects may be arranged in different locations, at different angles, etc. The systems and methods discussed herein may include robotic systems. Robotic systems configured in accordance with embodiments hereof may autonomously execute integrated tasks by coordinating operations of multiple robots. Robotic systems, as described herein, may include any suitable combination of robotic devices, actuators, sensors, cameras, and computing systems configured to control, issue commands, receive information from robotic devices and sensors, access, analyze, and process data generated by robotic devices, sensors, and camera, generate data or information usable in the control of robotic systems, and plan actions for robotic devices, sensors, and cameras. As used herein, robotic systems are not required to have immediate access or control of robotic actuators, sensors, or other devices. Robotic systems, as described here, may be computational systems configured to improve the performance of such robotic actuators, sensors, and other devices through reception, analysis, and processing of information.

The technology described herein provides technical improvements to a robotic system configured for use in object identification, detection, and retrieval. Technical improvements described herein increase the speed, precision, and accuracy of these tasks and further facilitate the detection, identification, and retrieval of objects from a container. The robotic systems and computational systems described herein address the technical problem of identifying, detecting, and retrieving objects from a container, where the objects may be irregularly arranged. By addressing this technical problem, the technology of object identification, detection, and retrieval is improved.

The present application refers to systems and robotic systems. Robotic systems, as discussed herein, may include robotic actuator components (e.g., robotic arms, robotic grippers, etc.), various sensors (e.g., cameras, etc.), and various computing or control systems. As discussed herein, computing systems or control systems may be referred to as "controlling" various robotic components, such as robotic arms, robotic grippers, cameras, etc. Such "control" may refer to direct control of and interaction with the various actuators, sensors, and other functional aspects of the robotic components. For example, a computing system may control a robotic arm by issuing or providing all of the required signals to cause the various motors, actuators, and sensors to cause robotic movement. Such "control" may also refer to the issuance of abstract or indirect commands to a further robotic control system that then translates such commands into the necessary signals for causing robotic movement. For example, a computing system may control a robotic arm by issuing a command describing a trajectory or destination location to which the robotic arm should move to and a further robotic control system associated with the robotic arm may receive and interpret such a command and then provide the necessary direct signals to the various actuators and sensors of the robotic arm to cause the required movement.

In particular, the present technology described herein assists a robotic system to interact with a target object among a plurality of objects in a container. Detection, identification, and retrieval of an object from a container requires several steps, including the generation of suitable object recognition templates, extracting features usable for identification, and generating, refining, and validating detection hypotheses. For example, because of the potential for irregular arrangement of the object, it may be necessary to recognize and identify the object in multiple different poses (e.g., angles and locations) and when potentially obscured by portions of other objects.

In the following, specific details are set forth to provide an understanding of the presently disclosed technology. In embodiments, the techniques introduced here may be practiced without including each specific detail disclosed herein. In other instances, well-known features, such as specific functions or routines, are not described in detail to avoid unnecessarily obscuring the present disclosure. References in this description to "an embodiment," "one embodiment," or the like mean that a particular feature, structure, material, or characteristic being described is included in at least one embodiment of the present disclosure. Thus, the appearances of such phrases in this specification do not necessarily all refer to the same embodiment. On the other hand, such references are not necessarily mutually exclusive either. Furthermore, the particular features, structures, materials, or characteristics described with respect to any one embodiments can be combined in any suitable manner with those of any other embodiment, unless such items are mutually exclusive. It is to be understood that the various embodiments shown in the figures are merely illustrative representations and are not necessarily drawn to scale.

Several details describing structures or processes that are well-known and often associated with robotic systems and subsystems, but that can unnecessarily obscure some significant aspects of the disclosed techniques, are not set forth in the following description for purposes of clarity. Moreover, although the following disclosure sets forth several embodiments of different aspects of the present technology, several other embodiments may have different configurations or different components than those described in this section. Accordingly, the disclosed techniques may have other embodiments with additional elements or without several of the elements described below.

Many embodiments or aspects of the present disclosure described below may take the form of computer- or controller-executable instructions, including routines executed by a programmable computer or controller. Those skilled in the relevant art will appreciate that the disclosed techniques can be practiced on or with computer or controller systems other than those shown and described below. The techniques described herein can be embodied in a special-purpose computer or data processor that is specifically programmed, configured, or constructed to execute one or more of the computer-executable instructions described below. Accordingly, the terms "computer" and "controller" as generally used herein refer to any data processor and can include Internet appliances and handheld devices (including palmtop computers, wearable computers, cellular or mobile phones, multi-processor systems, processor-based or programmable consumer electronics, network computers, mini-computers, and the like). Information handled by these computers and controllers can be presented at any suitable display medium, including a liquid crystal display (LCD). Instructions for executing computer- or controller-executable tasks can be stored in or on any suitable computer-readable medium, including hardware, firmware, or a combination of hardware and firmware. Instructions can be contained in any suitable memory device, including, for example, a flash drive, USB device, and/or other suitable medium.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements co-operate or interact with each other (e.g., as in a cause-and-effect relationship, such as for signal transmission/reception or for function calls), or both.

Any reference herein to image analysis by a computing system may be performed according to or using spatial structure information that may include depth information which describes respective depth value of various locations relative a chosen point. The depth information may be used to identify objects or estimate how objects are spatially arranged. In some instances, the spatial structure information may include or may be used to generate a point cloud that describes locations of one or more surfaces of an object. Spatial structure information is merely one form of possible image analysis and other forms known by one skilled in the art may be used in accordance with the methods described herein.

FIG. 1A illustrates a system 1000 for performing object detection, or, more specifically, object recognition. More particularly, the system 1000 may include a computing system 1100 and a camera 1200. In this example, the camera 1200 may be configured to generate image information which describes or otherwise represents an environment in which the camera 1200 is located, or, more specifically, represents an environment in the camera's 1200 field of view (also referred to as a camera field of view). The environment may be, e.g., a warehouse, a manufacturing plant, a retail space, or other premises. In such instances, the image information may represent objects located at such premises, such as boxes, bins, cases, crates, pallets, or other containers. The system 1000 may be configured to generate, receive, and/or process the image information, such as by using the image information to distinguish between individual objects in the camera field of view, to perform object recognition or object registration based on the image information, and/or perform robot interaction planning based on the image information, as discussed below in more detail (the terms "and/or" and "or" are used interchangeably in this disclosure). The robot interaction planning may be used to, e.g., control a robot at the premises to facilitate robot interaction between the robot and the containers or other objects. The computing system 1100 and the camera 1200 may be located at the same premises or may be located remotely from each other. For instance, the computing system 1100 may be part of a cloud computing platform hosted in a data center which is remote from the warehouse or retail space and may be communicating with the camera 1200 via a network connection.

In an embodiment, the camera 1200 (which may also be referred to as an image sensing device) may be a 2D camera and/or a 3D camera. For example, FIG. 1B illustrates a system 1500A (which may be an embodiment of the system 1000) that includes the computing system 1100 as well as a camera 1200A and a camera 1200B, both of which may be an embodiment of the camera 1200. In this example, the camera 1200A may be a 2D camera that is configured to generate 2D image information which includes or forms a 2D image that describes a visual appearance of the environment in the camera's field of view. The camera 1200B may be a 3D camera (also referred to as a spatial structure sensing camera or spatial structure sensing device) that is configured to generate 3D image information which includes or forms spatial structure information regarding an environment in the camera's field of view. The spatial structure information may include depth information (e.g., a depth map) which describes respective depth values of various locations relative to the camera 1200B, such as locations on surfaces of various objects in the camera 1200B's field of view. These locations in the camera's field of view or on an object's surface may also be referred to as physical locations. The depth information in this example may be used to estimate how the objects are spatially arranged in three-dimensional (3D) space. In some instances, the spatial structure information may include or may be used to generate a point cloud that describes locations on one or more surfaces of an object in the camera 1200B's field of view. More specifically, the spatial structure information may describe various locations on a structure of the object (also referred to as an object structure).

In an embodiment, the system 1000 may be a robot operation system for facilitating robot interaction between a robot and various objects in the environment of the camera 1200. For example, FIG. 1C illustrates a robot operation system 1500B, which may be an embodiment of the system 1000/1500A of FIGS. 1A and 1B. The robot operation system 1500B may include the computing system 1100, the camera 1200, and a robot 1300. As stated above, the robot 1300 may be used to interact with one or more objects in the environment of the camera 1200, such as with boxes, crates, bins, pallets, or other containers. For example, the robot 1300 may be configured to pick up the containers from one location and move them to another location. In some cases, the robot 1300 may be used to perform a de-palletization operation in which a group of containers or other objects are unloaded and moved to, e.g., a conveyor belt. In some implementations, the camera 1200 may be attached to the robot 1300 or the robot 3300, discussed below. This is also known as a camera in-hand or a camera on-hand solution. The camera 1200 may be attached to a robot arm 3320 of the robot 1300. The robot arm 3320 may then move to various picking regions to generate image information regarding those regions. In some implementations, the camera 1200 may be separate from the robot 1300. For instance, the camera 1200 may be mounted to a ceiling of a warehouse or other structure and may remain stationary relative to the structure. In some implementations, multiple cameras 1200 may be used, including multiple cameras 1200 separate from the robot 1300 and/or cameras 1200 separate from the robot 1300 being used in conjunction with in-hand cameras 1200. In some implementations, a camera 1200 or cameras 1200 may be mounted or affixed to a dedicate robotic system separate from the robot 1300 used for object manipulation, such as a robotic arm, gantry, or other automated system configured for camera movement. Throughout the specification, "control" or "controlling" the camera 1200 may be discussed. For camera in-hand solutions, control of the camera 1200 also includes control of the robot 1300 to which the camera 1200 is mounted or attached.

In an embodiment, the computing system 1100 of FIGS. 1A-1C may form or be integrated into the robot 1300, which may also be referred to as a robot controller. A robot control system may be included in the system 1500B, and is configured to e.g., generate commands for the robot 1300, such as a robot interaction movement command for controlling robot interaction between the robot 1300 and a container or other object. In such an embodiment, the computing system 1100 may be configured to generate such commands based on, e.g., image information generated by the camera 1200. For instance, the computing system 1100 may be configured to determine a motion plan based on the image information, wherein the motion plan may be intended for, e.g., gripping or otherwise picking up an object. The computing system 1100 may generate one or more robot interaction movement commands to execute the motion plan.

In an embodiment, the computing system 1100 may form or be part of a vision system. The vision system may be a system which generates, e.g., vision information which describes an environment in which the robot 1300 is located, or, alternatively or in addition to, describes an environment in which the camera 1200 is located. The vision information may include the 3D image information and/or the 2D image information discussed above, or some other image information. In some scenarios, if the computing system 1100 forms a vision system, the vision system may be part of the robot control system discussed above or may be separate from the robot control system. If the vision system is separate from the robot control system, the vision system may be configured to output information describing the environment in which the robot 1300 is located. The information may be outputted to the robot control system, which may receive such information from the vision system and performs motion planning and/or generates robot interaction movement commands based on the information. Further information regarding the vision system is detailed below.

In an embodiment, the computing system 1100 may communicate with the camera 1200 and/or with the robot 1300 via a direct connection, such as a connection provided via a dedicated wired communication interface, such as a RS-232 interface, a universal serial bus (USB) interface, and/or via a local computer bus, such as a peripheral component interconnect (PCI) bus. In an embodiment, the computing system 1100 may communicate with the camera 1200 and/or with the robot 1300 via a network. The network may be any type and/or form of network, such as a personal area network (PAN), a local-area network (LAN), e.g., Intranet, a metropolitan area network (MAN), a wide area network (WAN), or the Internet. The network may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol.

In an embodiment, the computing system 1100 may communicate information directly with the camera 1200 and/or with the robot 1300, or may communicate via an intermediate storage device, or more generally an intermediate non-transitory computer-readable medium. For example, FIG. 1D illustrates a system 1500C, which may be an embodiment of the system 1000/1500A/1500B, that includes a non-transitory computer-readable medium 1400, which may be external to the computing system 1100, and may act as an external buffer or repository for storing, e.g., image information generated by the camera 1200. In such an example, the computing system 1100 may retrieve or otherwise receive the image information from the non-transitory computer-readable medium 1400. Examples of the non-transitory computer readable medium 1400 include an electronic storage device, a magnetic storage device, an optical storage device, an electromagnetic storage device, a semiconductor storage device, or any suitable combination thereof. The non-transitory computer-readable medium may form, e.g., a computer diskette, a hard disk drive (HDD), a solid-state drive (SDD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), and/or a memory stick.

As stated above, the camera 1200 may be a 3D camera and/or a 2D camera. The 2D camera may be configured to generate a 2D image, such as a color image or a grayscale image. The 3D camera may be, e.g., a depth-sensing camera, such as a time-of-flight (TOF) camera or a structured light camera, or any other type of 3D camera. In some cases, the 2D camera and/or 3D camera may include an image sensor, such as a charge coupled devices (CCDs) sensor and/or complementary metal oxide semiconductors (CMOS) sensor. In an embodiment, the 3D camera may include lasers, a LIDAR device, an infrared device, a light/dark sensor, a motion sensor, a microwave detector, an ultrasonic detector, a RADAR detector, or any other device configured to capture depth information or other spatial structure information.

As stated above, the image information may be processed by the computing system 1100. In an embodiment, the computing system 1100 may include or be configured as a server (e.g., having one or more server blades, processors, etc.), a personal computer (e.g., a desktop computer, a laptop computer, etc.), a smartphone, a tablet computing device, and/or other any other computing system. In an embodiment, any or all of the functionality of the computing system 1100 may be performed as part of a cloud computing platform. The computing system 1100 may be a single computing device (e.g., a desktop computer), or may include multiple computing devices.

FIG. 2A provides a block diagram that illustrates an embodiment of the computing system 1100. The computing system 1100 in this embodiment includes at least one processing circuit 1110 and a non-transitory computer-readable medium (or media) 1120. In some instances, the processing circuit 1110 may include processors (e.g., central processing units (CPUs), special-purpose computers, and/or onboard servers) configured to execute instructions (e.g., software instructions) stored on the non-transitory computer-readable medium 1120 (e.g., computer memory). In some embodiments, the processors may be included in a separate/stand-alone controller that is operably coupled to the other electronic/electrical devices. The processors may implement the program instructions to control/interface with other devices, thereby causing the computing system 1100 to execute actions, tasks, and/or operations. In an embodiment, the processing circuit 1110 includes one or more processors, one or more processing cores, a programmable logic controller ("PLC"), an application specific integrated circuit ("ASIC"), a programmable gate array ("PGA"), a field programmable gate array ("FPGA"), any combination thereof, or any other processing circuit.

In an embodiment, the non-transitory computer-readable medium 1120, which is part of the computing system 1100, may be an alternative or addition to the intermediate non-transitory computer-readable medium 1400 discussed above. The non-transitory computer-readable medium 1120 may be a storage device, such as an electronic storage device, a magnetic storage device, an optical storage device, an electromagnetic storage device, a semiconductor storage device, or any suitable combination thereof, for example, such as a computer diskette, a hard disk drive (HDD), a solid state drive (SSD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, any combination thereof, or any other storage device. In some instances, the non-transitory computer-readable medium 1120 may include multiple storage devices. In certain implementations, the non-transitory computer-readable medium 1120 is configured to store image information generated by the camera 1200 and received by the computing system 1100. In some instances, the non-transitory computer-readable medium 1120 may store one or more object recognition template used for performing methods and operations discussed herein. The non-transitory computer-readable medium 1120 may alternatively or additionally store computer readable program instructions that, when executed by the processing circuit 1110, causes the processing circuit 1110 to perform one or more methodologies described here.

FIG. 2B depicts a computing system 1100A that is an embodiment of the computing system 1100 and includes a communication interface 1131. The communication interface 1131 may be configured to, e.g., receive image information generated by the camera 1200 of FIGS. 1A-1D. The image information may be received via the intermediate non-transitory computer-readable medium 1400 or the network discussed above, or via a more direct connection between the camera 1200 and the computing system 1100/1100A. In an embodiment, the communication interface 1131 may be configured to communicate with the robot 1300 of FIG. 1C. If the computing system 1100 is external to a robot control system, the communication interface 1131 of the computing system 1100 may be configured to communicate with the robot control system. The communication interface 1131 may also be referred to as a communication component or communication circuit, and may include, e.g., a communication circuit configured to perform communication over a wired or wireless protocol. As an example, the communication circuit may include a RS-232 port controller, a USB controller, an Ethernet controller, a Bluetooth® controller, a PCI bus controller, any other communication circuit, or a combination thereof.

Figure 2C:
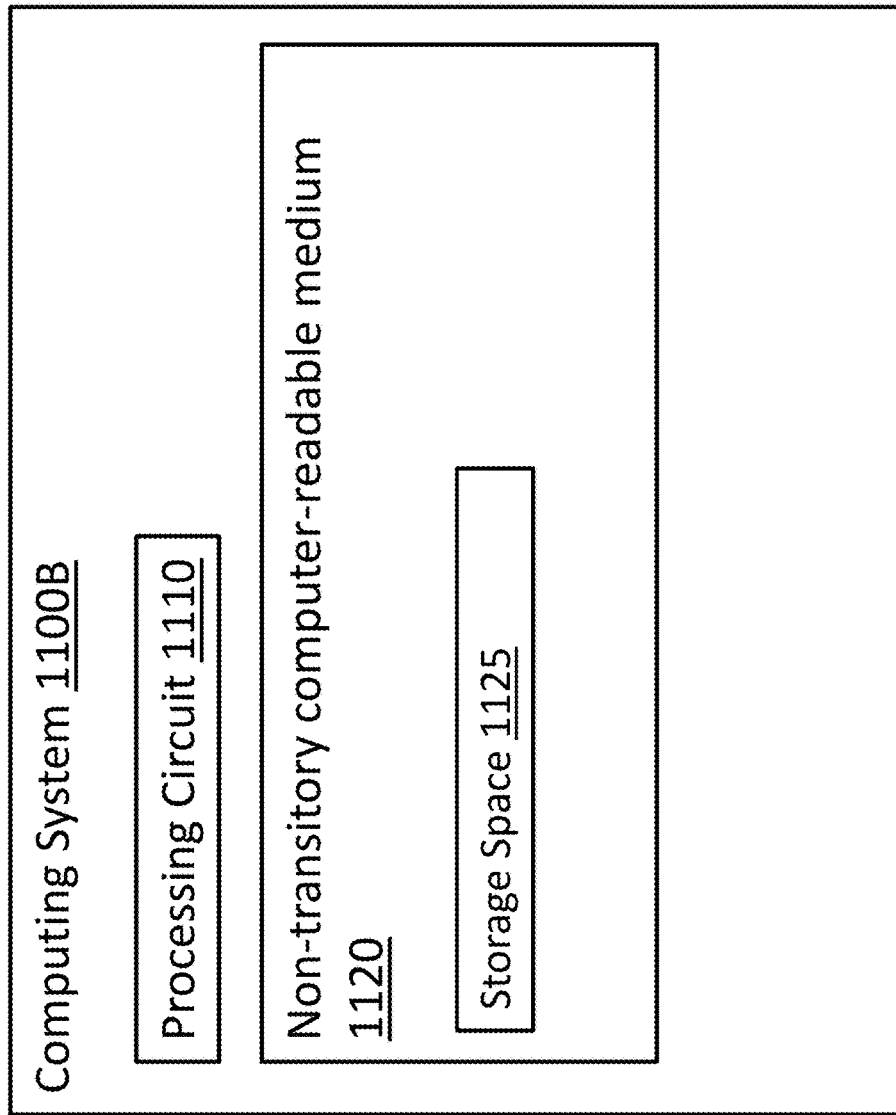
FIG. 2C is a block diagram that illustrates another embodiment of a computing system configured to perform or facilitate the detection, identification, and retrieval of objects, consistent with embodiments hereof.

In an embodiment, as depicted in FIG. 2C, the non-transitory computer-readable medium 1120 may include a storage space 1125 configured to store one or more data objects discussed herein. For example, the storage space may store object recognition templates, detection hypotheses, image information, object image information, robotic arm move commands, and any additional data objects the computing systems discussed herein may require access to.

Figure 2D:
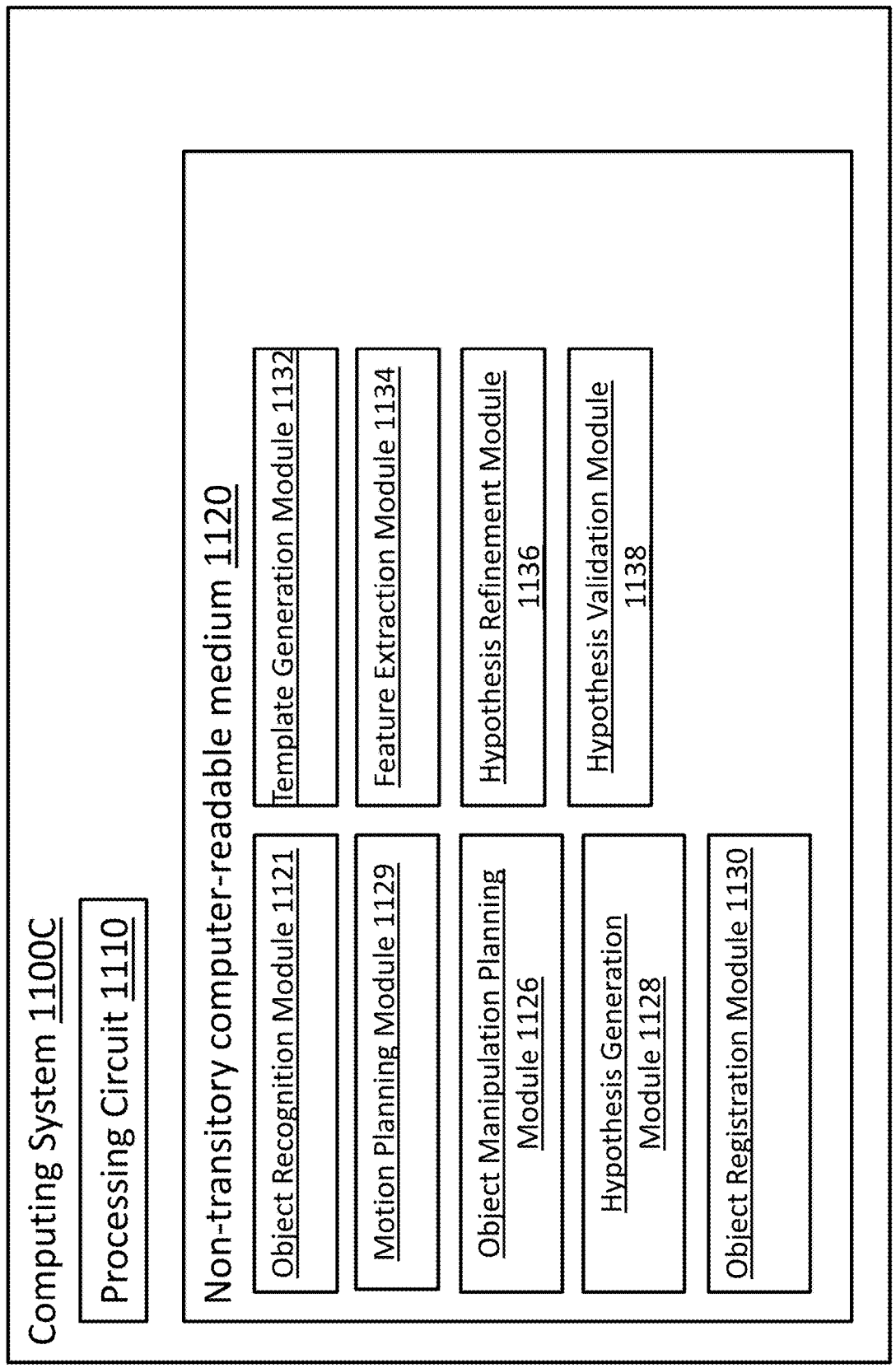
FIG. 2D is a block diagram that illustrates yet another embodiment of a computing system configured to perform or facilitate the detection, identification, and retrieval of objects, consistent with embodiments hereof.

In an embodiment, the processing circuit 1110 may be programmed by one or more computer-readable program instructions stored on the non-transitory computer-readable medium 1120. For example, FIG. 2D illustrates a computing system 1100C, which is an embodiment of the computing system 1100/1100A/1100B, in which the processing circuit 1110 is programmed by one or more modules, including an object recognition module 1121, a motion planning module 1129, and an object manipulation planning module 1126. The processing circuit 1110 may further be programmed with a hypothesis generation module 1128, an object registration module 1130, a template generation module 1132, a feature extraction module 1134, a hypothesis refinement module 1136, and a hypothesis validation module 1138. Each of the above modules may represent computer-readable program instructions configured to carry out certain tasks when instantiated on one or more of the processors, processing circuits, computing systems, etc., described herein. Each of the above module may operate in concert with one another to achieve the functionality described herein. Various aspects of the functionality described herein may be carried out by one or more of the software modules described above and the software modules and their descriptions are not to be understood as limiting the computational structure of systems disclosed herein. For example, although a specific task or functionality may be described with respect to a specific module, that task or functionality may also be performed by a different module as required. Further, the system functionality described herein may be performed by a different set of software modules configured with a different breakdown or allotment of functionality.

In an embodiment, the object recognition module 1121 may be configured to obtain and analyze image information as discussed throughout the disclosure. Methods, systems, and techniques discussed herein with respect to image information may use the object recognition module 1121. The object recognition module may further be configured for object recognition tasks related to object identification, as discussed herein.

The motion planning module 1129 may be configured plan and execute the movement of a robot. For example, the motion planning module 1129 may interact with other modules described herein to plan motion of a robot 3300 for object retrieval operations and for camera placement operations. Methods, systems, and techniques discussed herein with respect to robotic arm movements and trajectories may be performed by the motion planning module 1129.

The object manipulation planning module 1126 may be configured to plan and execute the object manipulation activities of a robotic arm, e.g., grasping and releasing objects and executing robotic arm commands to aid and facilitate such grasping and releasing.

Figure 10A:
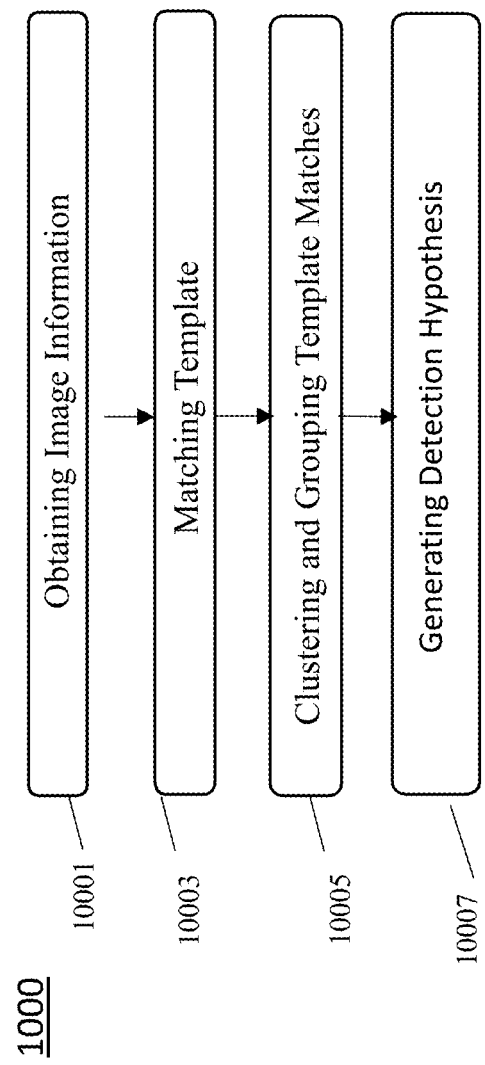

The hypothesis generation module 1128 may be configured to perform template matching and recognition tasks to generate a detection hypothesis, as described, e.g., with respect to FIGS. 10A-10B. The hypothesis generation module 1128 may be configured to interact or communicate with any other necessary module.

The object registration module 1130 may be configured to obtain, store, generate, and otherwise process object registration information that may be required for various tasks discussed herein. The object registration module 1130 may be configured to interact or communicate with any other necessary module.

The template generation module 1132 may be configured to complete object recognition template generation tasks as discussed herein, for example, as related to FIGS. 6-9D. The template generation module 1132 may be configured to interact with the object registration module 1130, the feature extraction module 1134, and any other necessary module.

The feature extraction module 1134 may be configured to complete feature extraction and generation tasks as discussed herein, for example, as related to FIGS. 8-9D. The feature extraction module 1134 may be configured to interact with the object registration module 1130, the template generation module 1132, the hypothesis generation module 1128, and any other necessary module.

Figure 11:
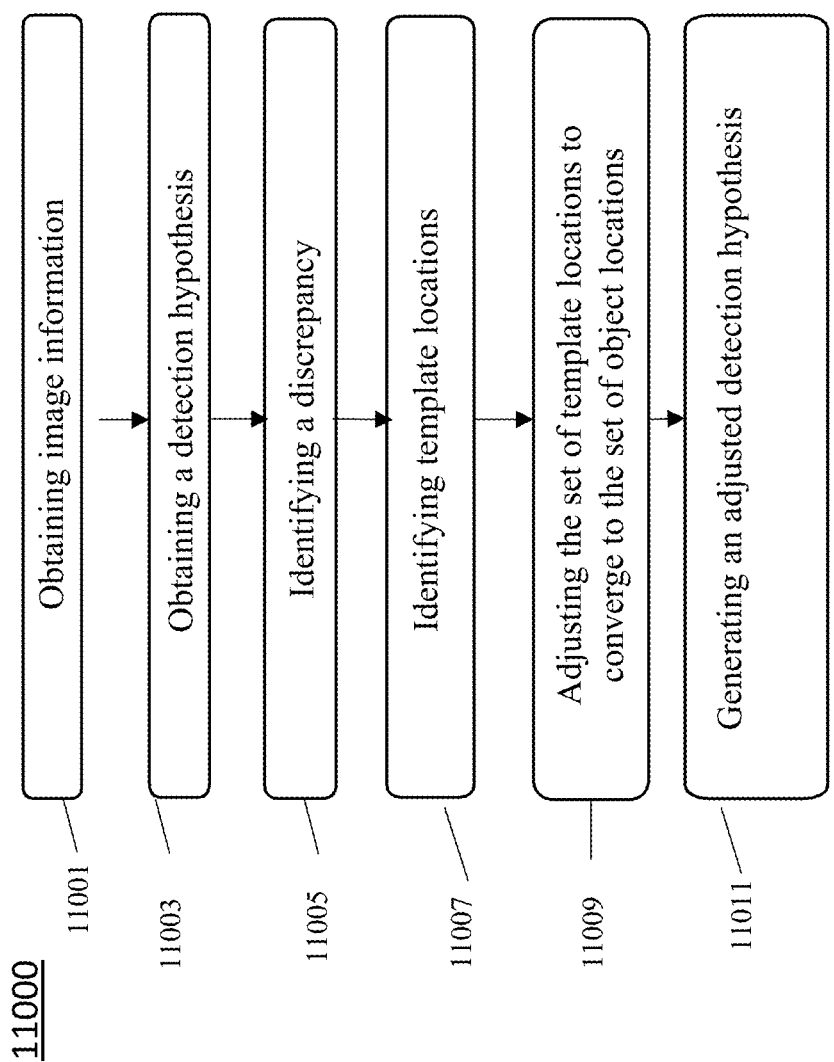
FIG. 11 illustrates a method of refining detection hypotheses consistent with embodiments hereof.
Figure 12A:
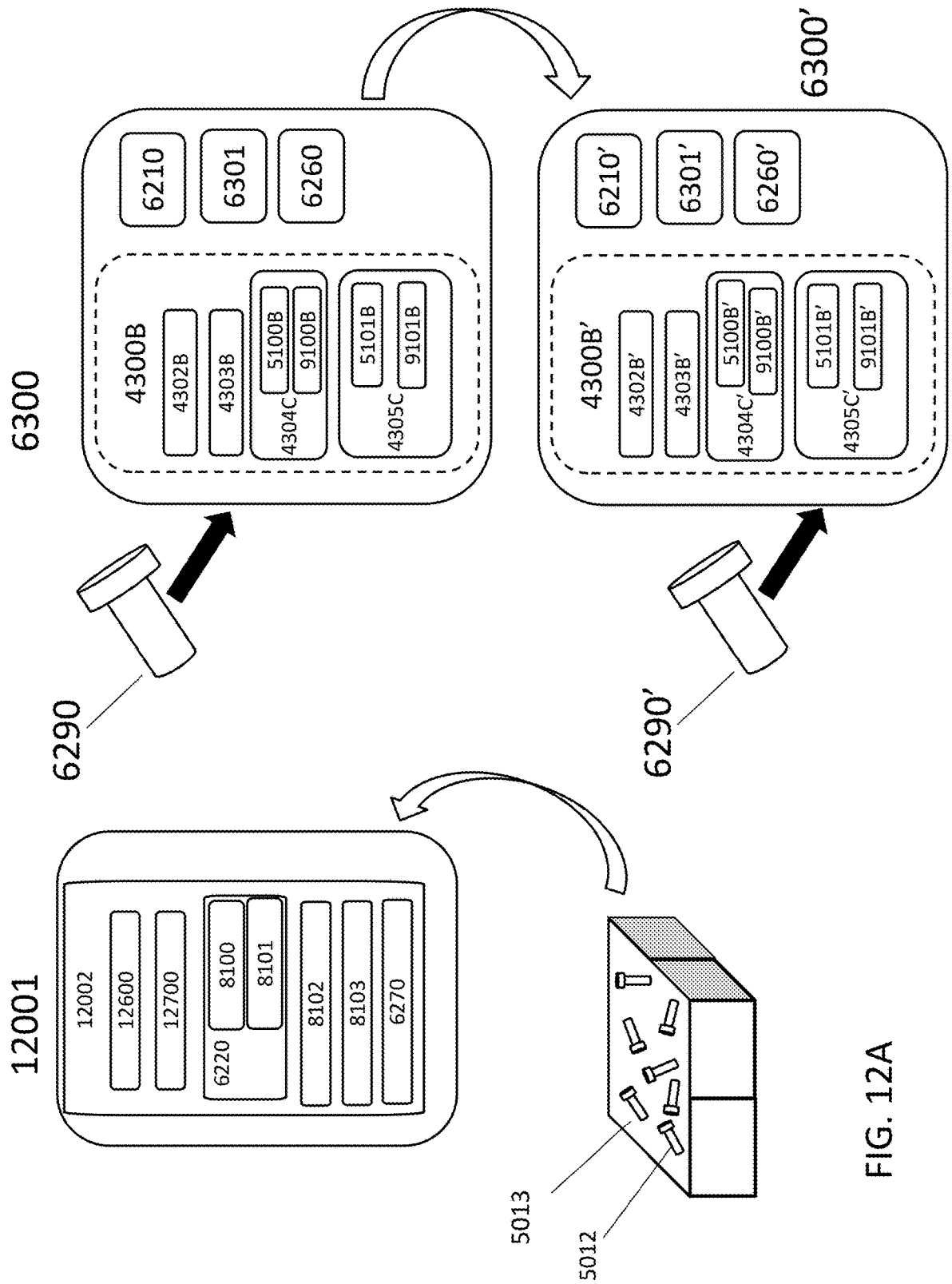

The hypothesis refinement module 1136 may be configured to complete hypothesis refinement tasks as discussed herein, for example, as related to FIGS. 11-12C. The hypothesis refinement module 1136 may be configured to interact with the object recognition module 1121 and the hypothesis generation module 1128, and any other necessary module.

Figure 13:
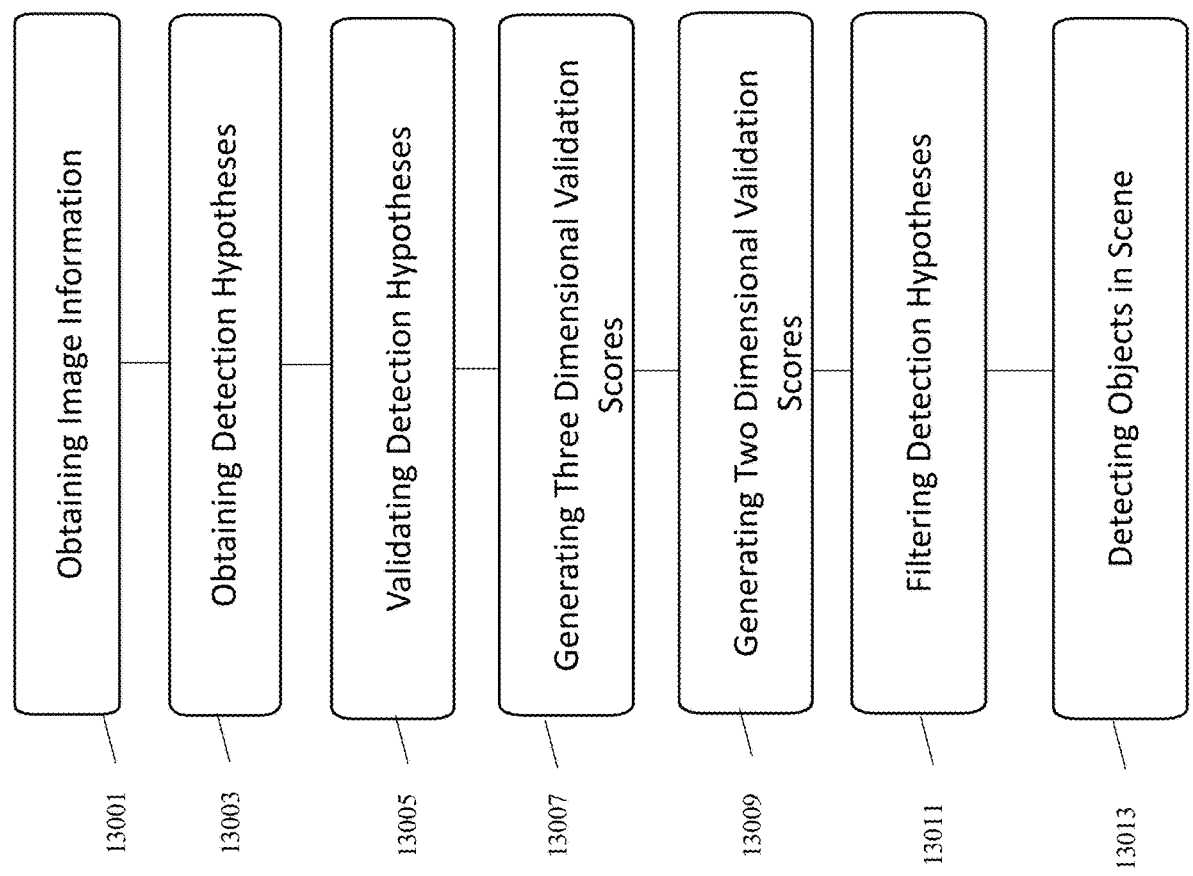
FIG. 13 illustrates a method of validating detection hypotheses consistent with embodiments hereof.
Figure 14:
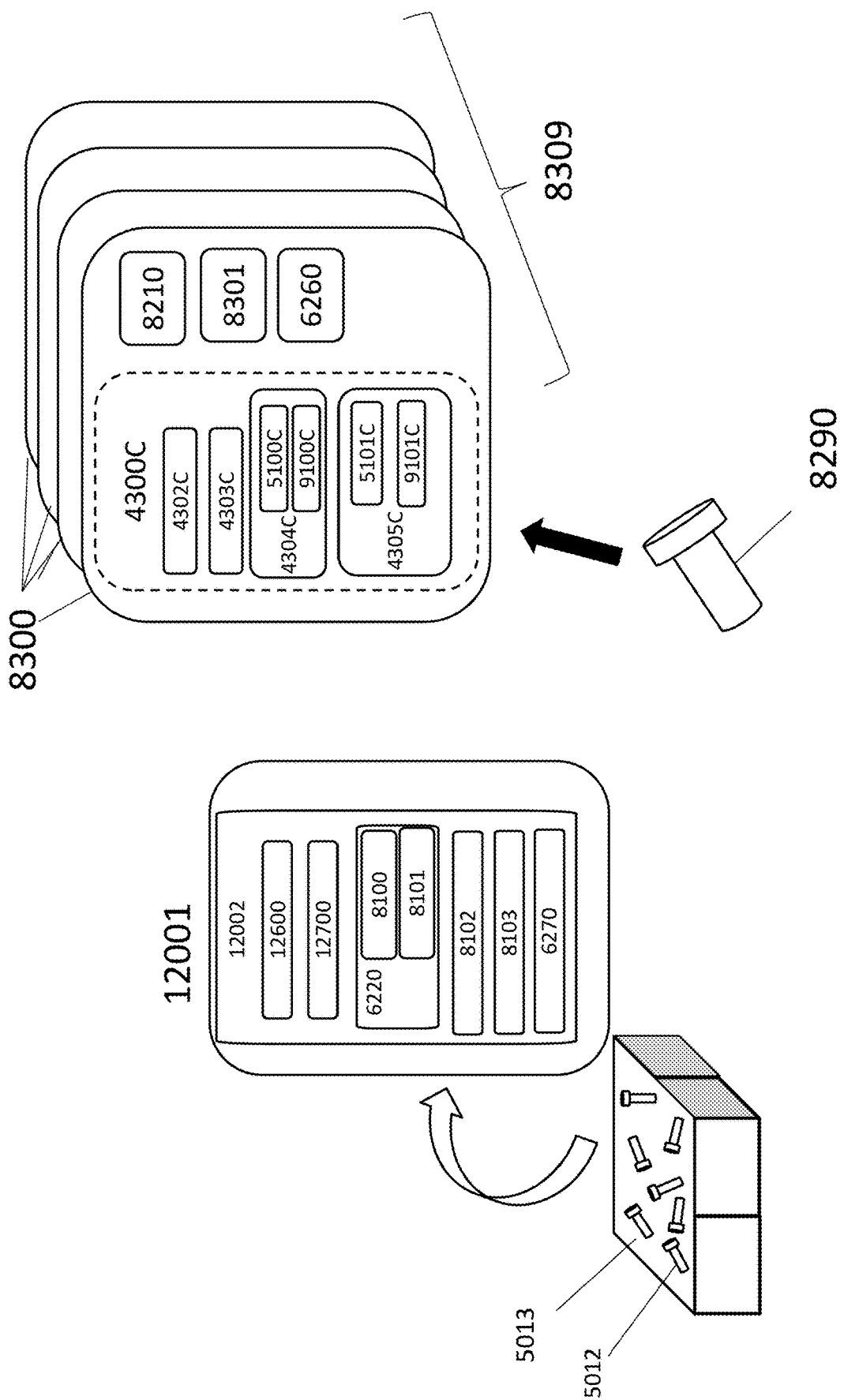
FIG. 14 illustrates aspects of a method of refining detection hypotheses consistent with embodiments hereof.

The hypothesis validation module 1138 may be configured to complete hypothesis validation tasks as discussed herein, for example, as related to FIGS. 13-14. The hypothesis validation module 1138 may be configured to interact with the object registration module 1130, the feature extraction module 1134, the hypothesis generation module 1128, the hypothesis refinement module 1136, and any other necessary modules.

Figure 2E:
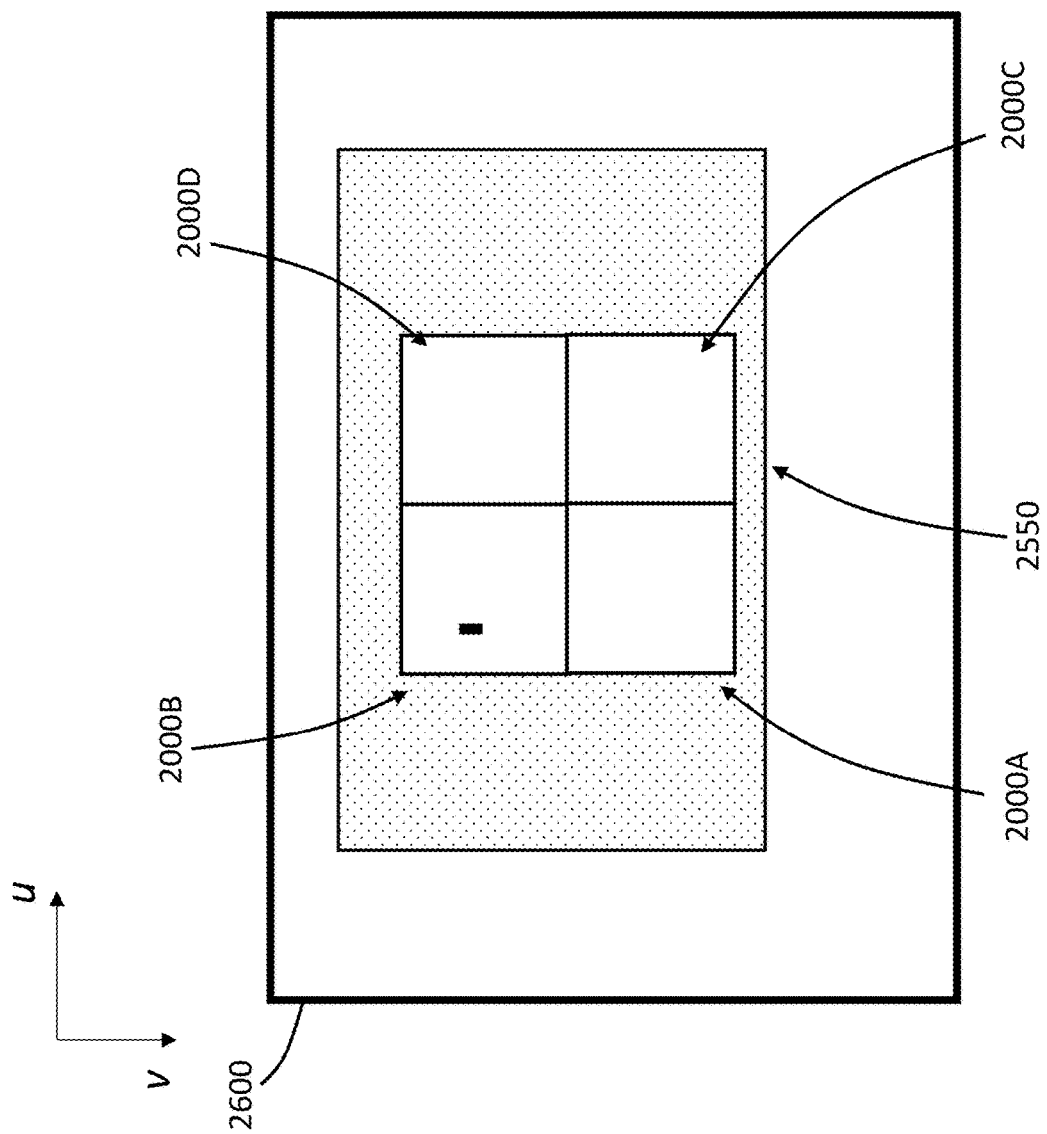
FIG. 2E is an example of image information processed by systems and consistent with embodiments hereof.
Figure 2F:
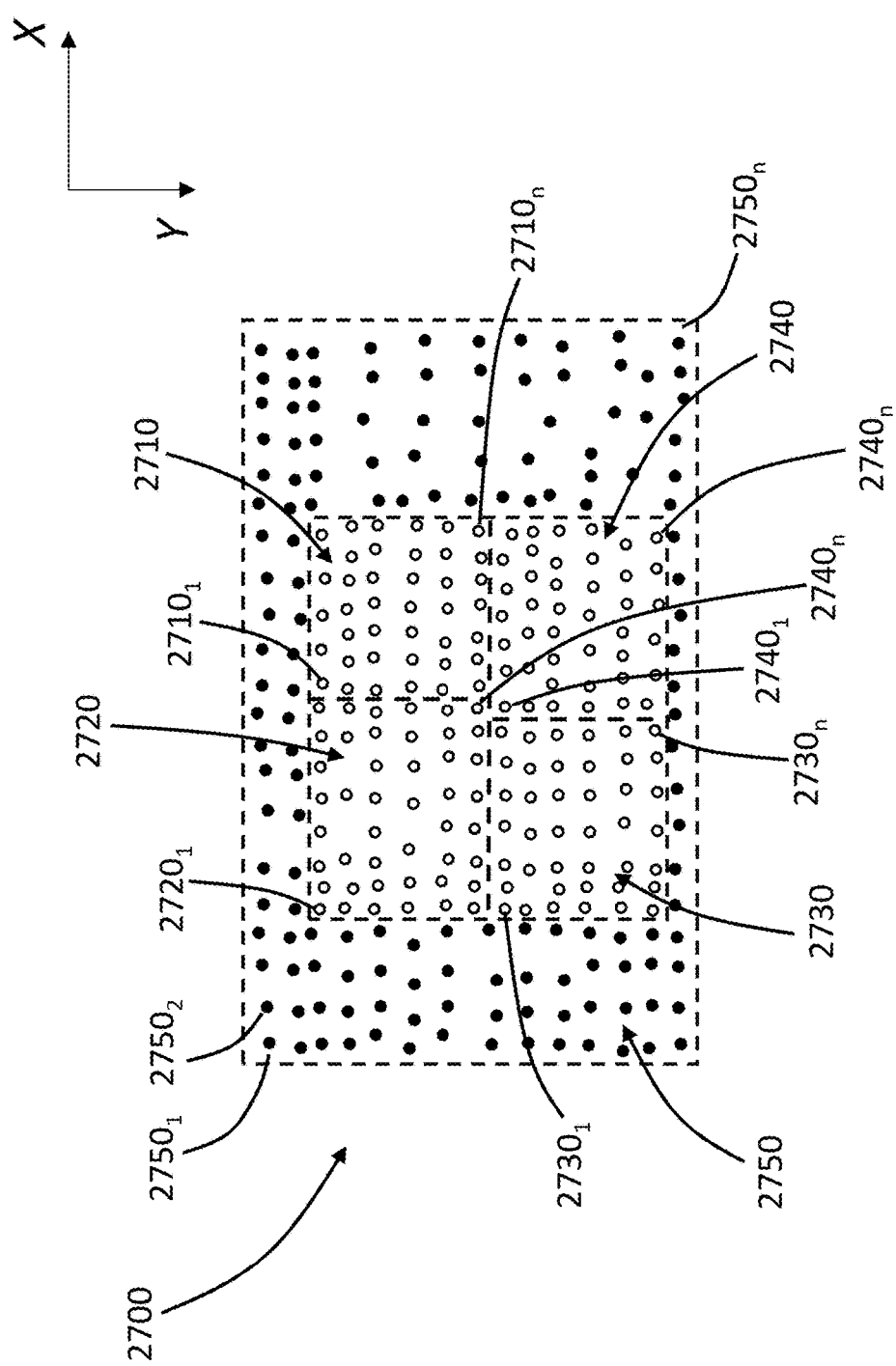
FIG. 2F is another example of image information processed by systems and consistent with embodiments hereof.
Figure 3A:
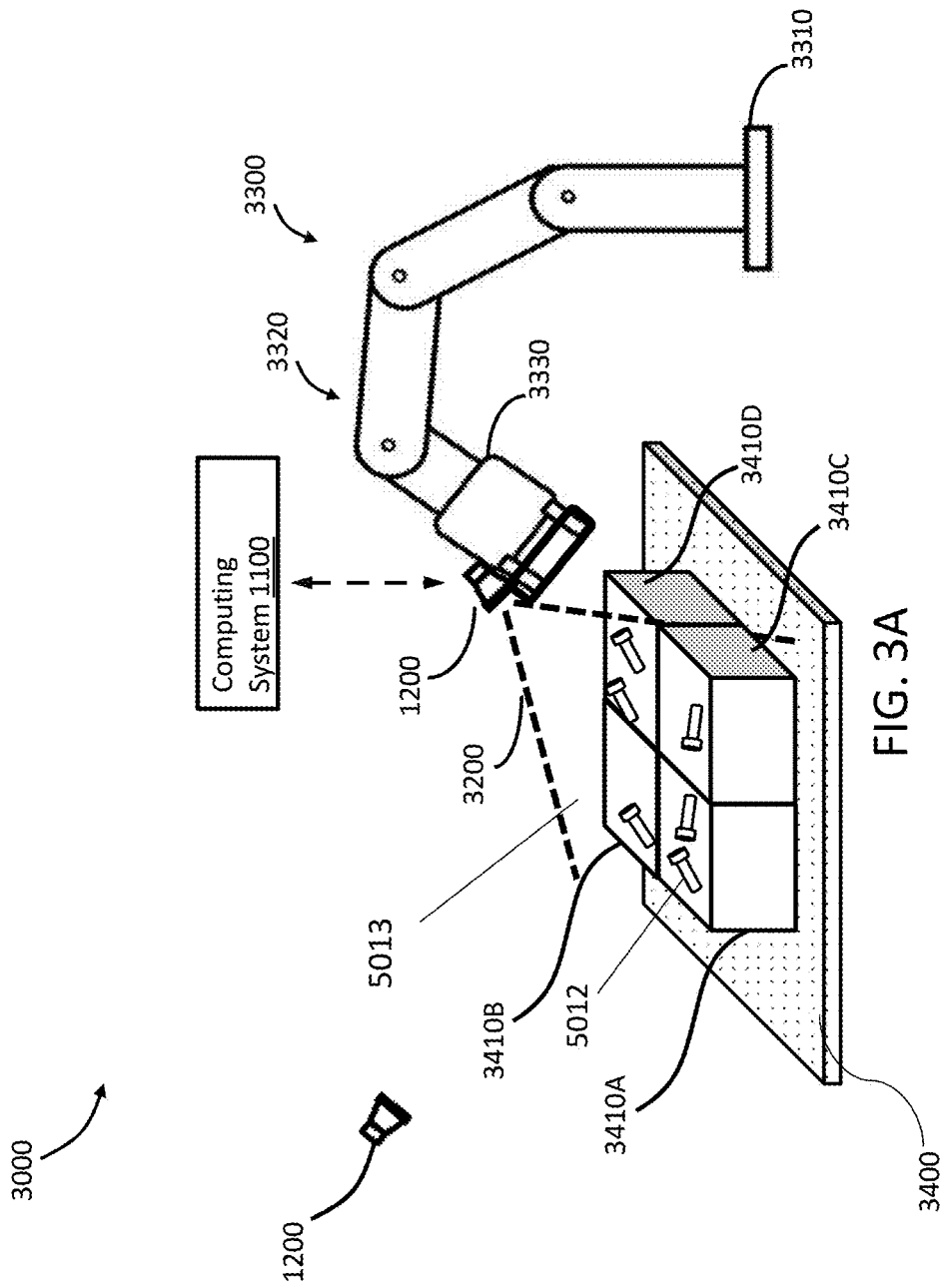
FIG. 3A illustrates an exemplary environment for operating a robotic system, according to embodiments hereof.
Figure 3B:
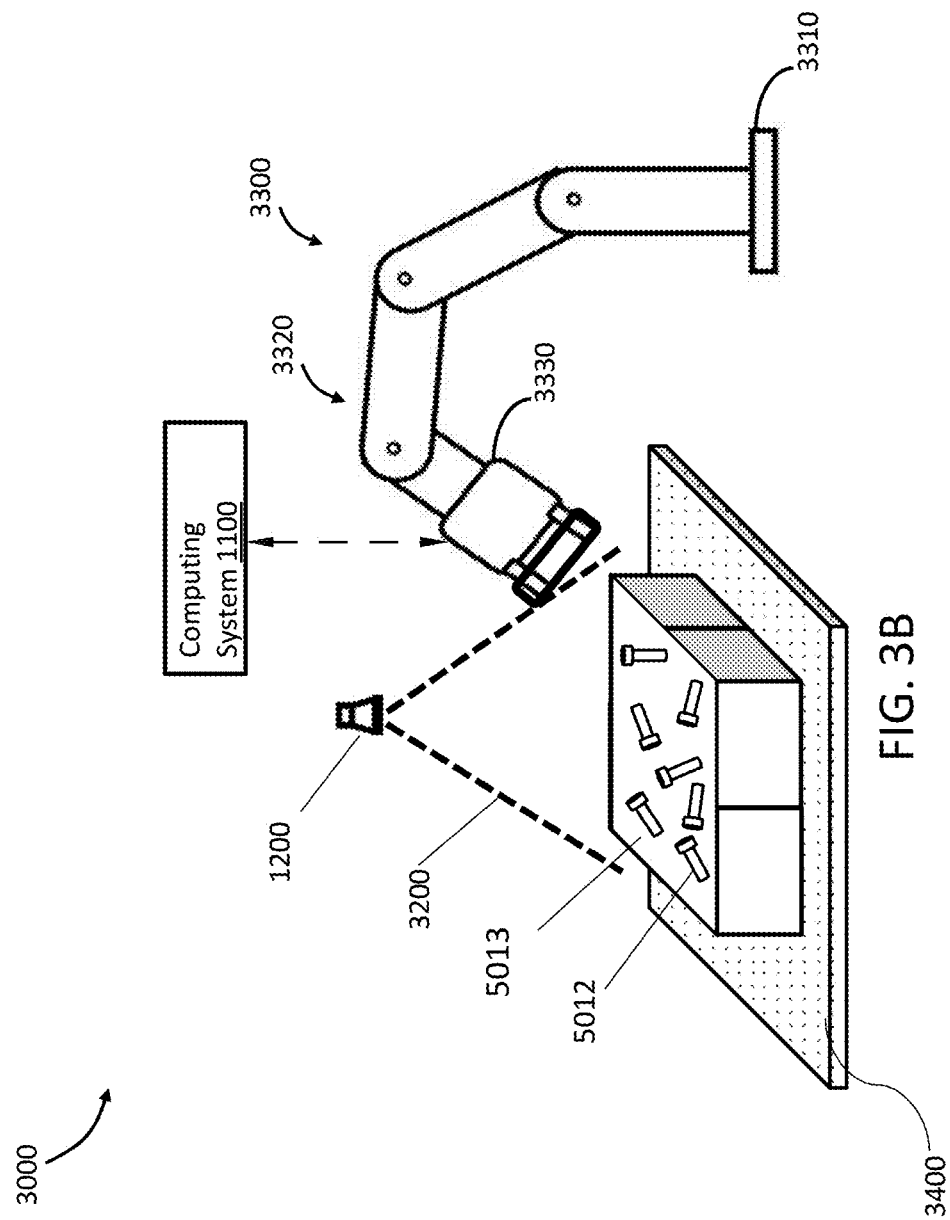
FIG. 3B illustrates an exemplary environment for the detection, identification, and retrieval of objects by a robotic system, consistent with embodiments hereof.

With reference to FIGS. 2E, 2F, 3A, and 3B, methods related to the object recognition module 1121 that may be performed for image analysis are explained. FIGS. 2E and 2F illustrate example image information associated with image analysis methods while FIGS. 3A and 3B illustrate example robotic environments associated with image analysis methods. References herein related to image analysis by a computing system may be performed according to or using spatial structure information that may include depth information which describes respective depth value of various locations relative a chosen point. The depth information may be used to identify objects or estimate how objects are spatially arranged. In some instances, the spatial structure information may include or may be used to generate a point cloud that describes locations of one or more surfaces of an object. Spatial structure information is merely one form of possible image analysis and other forms known by one skilled in the art may be used in accordance with the methods described herein.

In embodiments, the computing system 1100 may obtain image information representing an object in a camera field of view (e.g., 3200) of a camera 1200. The steps and techniques described below for obtaining image information may be referred to below as an image information capture operation 3001. In some instances, the object may one object 5012 from a plurality of objects 5012 in a scene 5013 in the field of view 3200 of a camera 1200. The image information 2600, 2700 may be generated by the camera (e.g., 1200)

when the objects 5012 are (or have been) in the camera field of view 3200 and may describe one or more of the individual objects 5012 or the scene 5013. The object appearance describes the appearance of an object 5012 from the viewpoint of the camera 1200. If there are multiple objects 5012 in the camera field of view, the camera may generate image information that represents the multiple objects or a single object (such image information related to a single object may be referred to as object image information), as necessary. The image information may be generated by the camera (e.g., 1200) when the group of objects is (or has been) in the camera field of view, and may include, e.g., 2D image information and/or 3D image information.

As an example, FIG. 2E depicts a first set of image information, or more specifically, 2D image information 2600, which, as stated above, is generated by the camera 1200 and represents the objects 3410A/3410B/3410C/3410D/3401 of FIG. 3A. More specifically, the 2D image information 2600 may be a grayscale or color image and may describe an appearance of the objects 3410A/3410B/3410C/3410D/3401 from a viewpoint of the camera 1200. In an embodiment, the 2D image information 2600 may correspond to a single-color channel (e.g., red, green, or blue color channel) of a color image. If the camera 1200 is disposed above the objects 3410A/3410B/3410C/3410D/3401, then the 2D image information 2600 may represent an appearance of respective top surfaces of the objects 3410A/3410B/3410C/3410D/3401. In the example of FIG. 2E, the 2D image information 2600 may include respective portions 2000A/2000B/2000C/2000D/2550, also referred to as image portions or object image information, that represent respective surfaces of the objects 3410A/3410B/341C/3410D/3401. In FIG. 2E, each image portion 2000A/2000B/2000C/2000D/2550 of the 2D image information 2600 may be an image region, or more specifically a pixel region (if the image is formed by pixels). Each pixel in the pixel region of the 2D image information 2600 may be characterized as having a position that is described by a set of coordinates [U, V] and may have values that are relative to a camera coordinate system, or some other coordinate system, as shown in FIGS. 2E and 2F. Each of the pixels may also have an intensity value, such as a value between 0 and 255 or 0 and 1023. In further embodiments, each of the pixels may include any additional information associated with pixels in various formats (e.g., hue, saturation, intensity, CMYK, RGB, etc.)

As stated above, the image information may in some embodiments be all or a portion of an image, such as the 2D image information 2600. In examples, the computing system 1100 may be configured to extract an image portion 2000A from the 2D image information 2600 to obtain only the image information associated with a corresponding object 3410A. Where an image portion (such as image portion 2000A) is directed towards a single object it may be referred to as object image information. Object image information is not required to contain information only about an object to which it is directed. For example, the object to which it is directed may be close to, under, over, or otherwise situated in the vicinity of one or more other objects. In such cases, the object image information may include information about the object to which it is directed as well as to one or more neighboring objects. The computing system 1100 may extract the image portion 2000A by performing an image segmentation or other analysis or processing operation based on the 2D image information 2600 and/or 3D image information 2700 illustrated in FIG. 2F. In some implementations, an image segmentation or other processing operation may include detecting image locations at which physical edges of objects appear (e.g., edges of the object) in the 2D image information 2600 and using such image locations to identify object image information that is limited to representing an individual object in a camera field of view (e.g., 3200) and substantially excluding other objects. By "substantially excluding," it is meant that the image segmentation or other processing techniques are designed and configured to exclude non-target objects from the object image information but that it is understood that errors may be made, noise may be present, and various other factors may result in the inclusion of portions of other objects.

FIG. 2F depicts an example in which the image information is 3D image information 2700. More particularly, the 3D image information 2700 may include, e.g., a depth map or a point cloud that indicates respective depth values of various locations on one or more surfaces (e.g., top surface or other outer surface) of the objects 3410A/3410B/3410C/3410D/3401. In some implementations, an image segmentation operation for extracting image information may involve detecting image locations at which physical edges of objects appear (e.g., edges of a box) in the 3D image information 2700 and using such image locations to identify an image portion (e.g., 2730) that is limited to representing an individual object in a camera field of view (e.g., 3410A).

The respective depth values may be relative to the camera 1200 which generates the 3D image information 2700 or may be relative to some other reference point. In some embodiments, the 3D image information 2700 may include a point cloud which includes respective coordinates for various locations on structures of objects in the camera field of view (e.g., 3200). In the example of FIG. 2F, the point cloud may include respective sets of coordinates that describe the location of the respective surfaces of the objects 3410A/3410B/3410C/3410D/3401. The coordinates may be 3D coordinates, such as [X Y Z] coordinates, and may have values that are relative to a camera coordinate system, or some other coordinate system. For instance, the 3D image information 2700 may include a first image portion 2710, also referred to as an image portion, that indicates respective depth values for a set of locations $2710_1$-$2710_n$, which are also referred to as physical locations on a surface of the object 3410D. Further, the 3D image information 2700 may further include a second, a third, a fourth, and a fifth portion 2720, 2730, 2740, and 2750. These portions may then further indicate respective depth values for a set of locations, which may be represented by $2720_1$-$2720_n$, $2730_1$-$2730_n$, $2740_1$-$2740_n$, and $2750_1$-$2750_n$ respectively. These figures are merely examples, and any number of objects with corresponding image portions may be used. Similarly to as stated above, the 3D image information 2700 obtained may in some instances be a portion of a first set of 3D image information 2700 generated by the camera. In the example of FIG. 2E, if the 3D image information 2700 obtained represents an object 3410A of FIG. 3A, then the 3D image information 2700 may be narrowed as to refer to only the image portion 2710. Similar to the discussion of 2D image information 2600, an identified image portion 2710 may pertain to an individual object and may be referred to as object image information. Thus, object image information, as used herein, may include 2D and/or 3D image information.

In an embodiment, an image normalization operation may be performed by the computing system 1100 as part of obtaining the image information. The image normalization operation may involve transforming an image or an image portion generated by the camera 1200, so as to generate a transformed image or transformed image portion. For example, if the image information, which may include the 2D image information 2600, the 3D image information 2700, or a combination of the two, obtained may undergo an image normalization operation to attempt to cause the image information to be altered in viewpoint, object pose, lighting condition associated with the visual description information. Such normalizations may be performed to facilitate a more accurate comparison between the image information and model (e.g., template) information. The viewpoint may refer to a pose of an object relative to the camera 1200, and/or an angle at which the camera 1200 is viewing the object when the camera 1200 generates an image representing the object.

For example, the image information may be generated during an object recognition operation in which a target object is in the camera field of view 3200. The camera 1200 may generate image information that represents the target object when the target object has a specific pose relative to the camera. For instance, the target object may have a pose which causes its top surface to be perpendicular to an optical axis of the camera 1200. In such an example, the image information generated by the camera 1200 may represent a specific viewpoint, such as a top view of the target object. In some instances, when the camera 1200 is generating the image information during the object recognition operation, the image information may be generated with a particular lighting condition, such as a lighting intensity. In such instances, the image information may represent a particular lighting intensity, lighting color, or other lighting condition.

In an embodiment, the image normalization operation may involve adjusting an image or an image portion of a scene generated by the camera, so as to cause the image or image portion to better match a viewpoint and/or lighting condition associated with information of an object recognition template. The adjustment may involve transforming the image or image portion to generate a transformed image which matches at least one of an object pose or a lighting condition associated with the visual description information of the object recognition template.

The viewpoint adjustment may involve processing, warping, and/or shifting of the image of the scene so that the image represents the same viewpoint as visual description information that may be included within an object recognition template. Processing, for example, may include altering the color, contrast, or lighting of the image, warping of the scene may include changing the size, dimensions, or proportions of the image, and shifting of the image may include changing the position, orientation, or rotation of the image. In an example embodiment, processing, warping, and or/shifting may be used to alter an object in the image of the scene to have an orientation and/or a size which matches or better corresponds to the visual description information of the object recognition template. If the object recognition template describes a head-on view (e.g., top view) of some object, the image of the scene may be warped so as to also represent a head-on view of an object in the scene.

Further aspects of the object recognition methods performed herein are described in greater detail in U.S. application Ser. No. 16/991,510, filed Aug. 12, 2020, and U.S. application Ser. No. 16/991,466, filed Aug. 12, 2020, each of which is incorporated herein by reference.

In various embodiments, the terms "computer-readable instructions" and "computer-readable program instructions" are used to describe software instructions or computer code configured to carry out various tasks and operations. In various embodiments, the term "module" refers broadly to a collection of software instructions or code configured to cause the processing circuit 1110 to perform one or more functional tasks. The modules and computer-readable instructions may be described as performing various operations or tasks when a processing circuit or other hardware component is executing the modules or computer-readable instructions.

FIGS. 3A-3B illustrate exemplary environments in which the computer-readable program instructions stored on the non-transitory computer-readable medium 1120 are utilized via the computing system 1100 to increase efficiency of object identification, detection, and retrieval operations and methods. The image information obtained by the computing system 1100 and exemplified in FIG. 3A influences the system's decision-making procedures and command outputs to a robot 3300 present within an object environment.

FIGS. 3A-3B illustrate an example environment in which the process and methods described herein may be performed. FIG. 3A depicts an environment having a system 3000 (which may be an embodiment of the system 1000/1500A/1500B/1500C of FIGS. 1A-1D) that includes at least the computing system 1100, a robot 3300, and a camera 1200. The camera 1200 may be an embodiment of the camera 1200 and may be configured to generate image information which represents a scene 5013 in a camera field of view 3200 of the camera 1200, or more specifically represents objects (such as boxes) in the camera field of view 3200, such as objects 3000A, 3000B, 3000C, and 3000D. In one example, each of the objects 3000A-3000D may be, e.g., a container such as a box or crate, while the object 3550 may be, e.g., a pallet on which the containers are disposed. Further, each of the objects 3000A-3000D may further be containers containing individual objects 5012. Each object 5012 may, for example, be a rod, bar, gear, bolt, nut, screw, nail, rivet, spring, linkage, cog, or any other type of physical object, as well as assemblies of multiple objects. FIG. 3A illustrates an embodiment including multiple containers of objects 5012 while FIG. 3B illustrates an embodiment including a single container of objects 5012.

In an embodiment, the system 3000 of FIG. 3A may include one or more light sources. The light source may be, e.g., a light emitting diode (LED), a halogen lamp, or any other light source, and may be configured to emit visible light, infrared radiation, or any other form of light toward surfaces of the objects 3000A-3000D. In some implementations, the computing system 1100 may be configured to communicate with the light source to control when the light source is activated. In other implementations, the light source may operate independently of the computing system 1100.

In an embodiment, the system 3000 may include a camera 1200 or multiple cameras 1200, including a 2D camera that is configured to generate 2D image information 2600 and a 3D camera that is configured to generate 3D image information 2700. The camera 1200 or cameras 1200 may be mounted or affixed to the robot 3300, may be stationary within the environment, and/or may be affixed to a dedicated robotic system separate from the robot 3300 used for object manipulation, such as a robotic arm, gantry, or other automated system configured for camera movement. FIG. 3A shows an example having a stationary camera 1200 and an on-hand camera 1200, while FIG. 3B shows an example having only a stationary camera 1200. The 2D image information 2600 (e.g., a color image or a grayscale image) may describe an appearance of one or more objects, such as the objects 3000A/3000B/3000C/3000D or the object 5012 in the camera field of view 3200. For instance, the 2D image information 2600 may capture or otherwise represent visual detail disposed on respective outer surfaces (e.g., top surfaces) of the objects 3000A/3000B/3000C/3000D and 5012, and/or contours of those outer surfaces. In an embodiment, the 3D image information 2700 may describe a structure of one or more of the objects 3000A/3000B/3000C/3000D/3550 and 5012, wherein the structure for an object may also be referred to as an object structure or physical structure for the object. For example, the 3D image information 2700 may include a depth map, or more generally include depth information, which may describe respective depth values of various locations in the camera field of view 3200 relative to the camera 1200 or relative to some other reference point. The locations corresponding to the respective depth values may be locations (also referred to as physical locations) on various surfaces in the camera field of view 3200, such as locations on respective top surfaces of the objects 3000A/3000B/3000C/3000D/3550 and 5012. In some instances, the 3D image information 2700 may include a point cloud, which may include a plurality of 3D coordinates that describe various locations on one or more outer surfaces of the objects 3000A/3000B/3000C/3000D/3550 and 5012, or of some other objects in the camera field of view 3200. The point cloud is shown in FIG. 2F In the example of FIGS. 3A and 3B, the robot 3300 (which may be an embodiment of the robot 1300) may include a robot arm 3320 having one end attached to a robot base 3310 and having another end that is attached to or is formed by an end effector apparatus 3330, such as a robot gripper. The robot base 3310 may be used for mounting the robot arm 3320, while the robot arm 3320, or more specifically the end effector apparatus 3330, may be used to interact with one or more objects in an environment of the robot 3300. The interaction (also referred to as robot interaction) may include, e.g., gripping or otherwise picking up at least one of the objects 3000A-3000D and 5012. For example, the robot interaction may be part of an object picking operation to identify, detect, and retrieve the objects 5012 from containers. The end effector apparatus 3330 may have suction cups or other components for grasping or grabbing the object 5012. The end effector apparatus 3330 may be configured, using a suction cup or other grasping component, to grasp or grab an object through contact with a single face or surface of the object, for example, via a top face.

The robot 3300 may further include additional sensors configured to obtain information used to implement the tasks, such as for manipulating the structural members and/or for transporting the robotic units. The sensors can include devices configured to detect or measure one or more physical properties of the robot 3300 (e.g., a state, a condition, and/or a location of one or more structural members/joints thereof) and/or of a surrounding environment. Some examples of the sensors can include accelerometers, gyroscopes, force sensors, strain gauges, tactile sensors, torque sensors, position encoders, etc.

Figure 4:
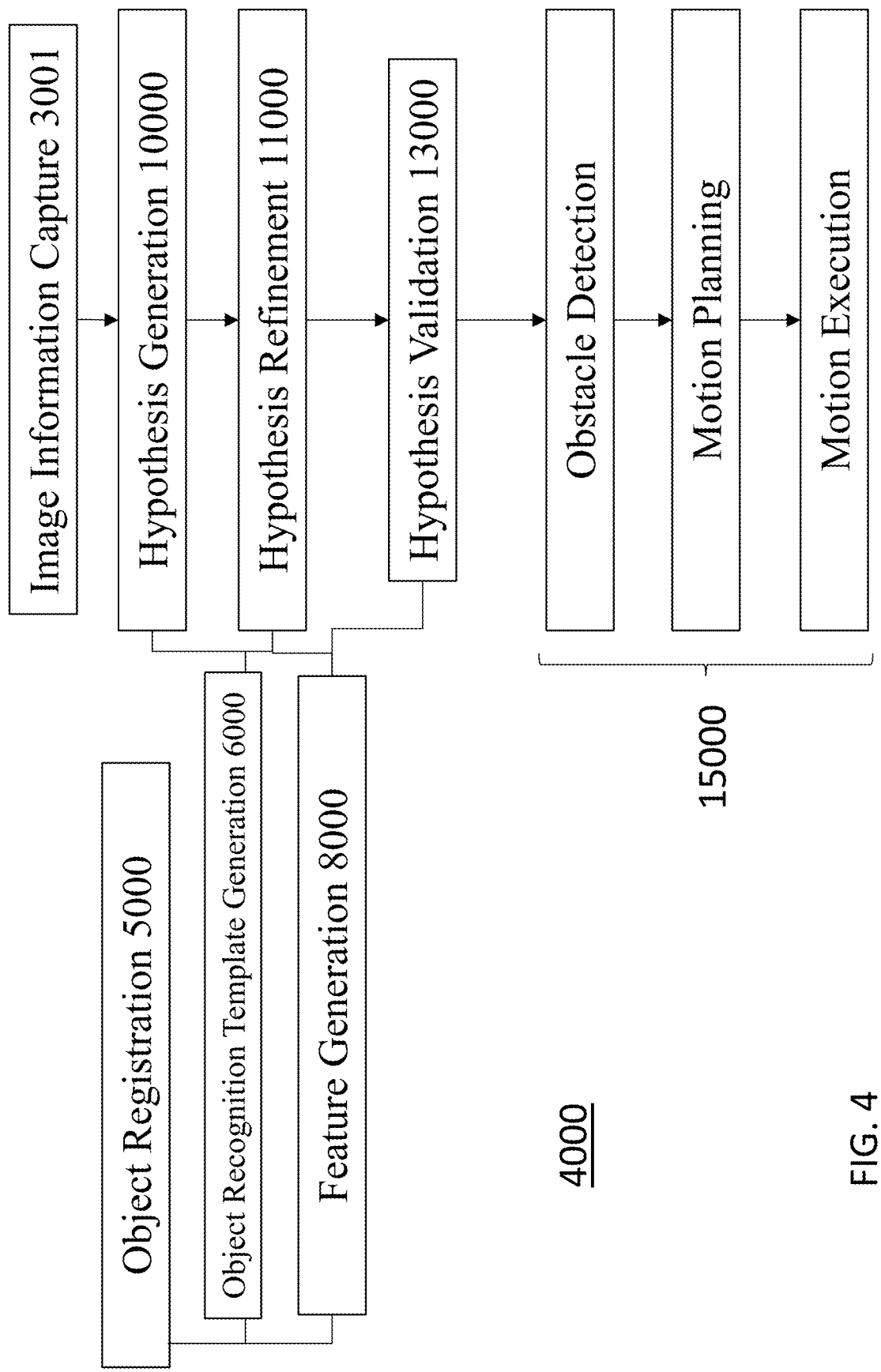
FIG. 4 provides a flow diagram illustrating an overall flow of methods and operations for the detection, identification, and retrieval of objects, according to embodiments hereof.

FIG. 4 provides a flow diagram illustrating an overall flow of methods and operations for the detection, identification, and retrieval of objects, according to embodiments hereof. The object detection, identification, and retrieval method 4000 may include any combination of features of the sub-methods and operations described herein. The method 4000 may include any or all of an object registration operation 5000, an object recognition template generation method 6000, a feature generation method 8000, an image information capture operation 3001, a hypothesis generation operation 10000, a hypothesis refinement method 11000, a hypothesis validation method 13000, and a robotic control operation 15000, including obstacle detection, motion planning, and motion execution. In embodiments, the object registration operation 5000, the object recognition template generation method 6000, and the feature generation method 8000 may be performed in a pre-processing or offline environment outside the context of robotic operation. Thus, these operations and methods may be performed in advance to facilitate later action by a robot. The image information capture operation 3001, the hypothesis generation operation 10000, the hypothesis refinement method 11000, the hypothesis validation method 13000, and the robotic control operation 15000 may each be performed in the context of robotic operation for detecting, identifying, and retrieving objects from a container.

FIG. 5 illustrates object registration data related to an object type, which may be generated, obtained, received, or otherwise acquired during an object registration operation 5000. As described above, methods and systems described herein are configured to obtain and use object registration data 5001, e.g., known, previously stored information related to an object 5011, to generate object recognition templates for use in identifying and recognizing similar objects in a physical scene. Object registration data 5001 may include any type of computer-readable information that identifies, relates to, and/or describes an object model 4200. The object registration data 5001 of the object model 4200 may represent an object 5011, wherein the object model 4200 is in two or three-dimensional format that provides measurements and dimensions of the object 5011 that is represented and that may or may not be interactive. Object registration data 5001 may include, for example, CAD (i.e., computer aided design) data or other modeling data describing an object model 4200 and stored in any suitable format. The registration data may be a solid CAD model, a wireframe CAD model, or a surface CAD model. In an embodiment, the registration data may be in any type of three-dimensional file format, such as FBX, OBJ, USD, STL, STEP, COLLADE, and the like. The object model 4200 represents one or more physical objects. The object model 4200 is a modeled (i.e., computer stored) version of one or more corresponding objects 5011 that exist physically within the world. As shown in FIG. 5, the object 5011 is a physical object existing in the physical world, while the object model 4200 is a digital representation of the object 5011 that is described by the object registration data 5001. The object 5011 represented may be any object, including, for example, a rod, bar, gear, bolt, nut, screw, nail, rivet, spring, linkage, cog, or any other type of physical object, as well as assemblies of multiple objects. In embodiments, the object 5011 may refer to objects accessible from a container (e.g., a bin, box, bucket, etc.) having a mass in a range of, e.g., several grams to several kilograms, and a size in the range of, e.g., 5 mm to 500 mm. The object model 4200 may be specific to an exact version of a real world object 5011, for example, a screw having a specific length, thread count, thread size, head size, etc. For example and illustrative purposes, this description refers to a screw-shaped object as the object 5011. This is presented for purposes of convenience alone, and is not intended to limit the scope of the description in any way.

In some embodiments, the present disclosure relates to generating an object recognition template set for identifying an object 5012 within a scene 5013. The object registration data 5001 may be based on a physical object 5011 and may be use to facilitate recognition of other physical objects 5012 that are similar to (and may be copies or versions of) the physical object 5011. Identifying an object 5012 within a scene may include identifying an object model 4200 to which the object 5012 corresponds (e.g., identifying what the object 5012 is), identifying a pose of the object 5012 (e.g., identifying a position, angle, and orientation of the object 5012).

FIG. 6 depicts a flow diagram for an example object recognition template generation method 6000 for generating the object recognition template set. In an embodiment, the object recognition template generation method 6000 may be performed by, e.g., the computing system 1100 (or 1100A/1100B/1100C) of FIGS. 2A-2D or the computing system 1100 of FIGS. 3A-3B, or more specifically by the at least one processing circuit 1110 of the computing system 1100. In some scenarios, the computing system 1100 may perform the object recognition template generation method 6000 by executing instructions stored on a non-transitory computer-readable medium (e.g., 1120). For instance, the instructions may cause the computing system 1100 to execute one or more of the modules illustrated in FIG. 2D, which may perform object recognition template generation method 6000. For example, in embodiments, steps of the object recognition template generation method 6000 may be performed by the object registration module 1130 and the template generation module 1132 may operate in concert to generate object recognition templates.

The steps of the object recognition template generation method 6000 may be employed to achieve object recognition template generation, which may later be used in conjunction with specific sequential robot trajectories for performing specific tasks. As a general overview, the object recognition template generation method 6000 may operate to cause the computing system 1100 to generate sets of object recognition templates for a computing system to use in identifying an object in a scene for operations related to object picking. The object recognition template generation method 6000 is described below with additional reference to FIGS. 7A and 7B.

The at least one processing circuit 1110 may perform specific steps of object recognition template generation method 6000 for generating the object recognition template set 4301, which may include a plurality of object recognition templates 4300. The object recognition template generation method 6000 may begin with or otherwise include an operation 6001, including obtaining object registration data 5001 of an object model 4200 representing an object 5011.

In an operation 6001, object recognition template generation method 6000 may include obtaining the object registration data 5001 representative of an object 5011, where the object registration data 5001 may include an object model 4200 representative of the object 5011. The at least one processing circuit 1110 may determine a plurality of viewpoints 4120 of the object model in a three-dimensional space 4100. The at least one processing circuit 1110 may further estimate a plurality of appearances 4140 of the object model 4200 at each of the plurality of viewpoints 4120. The robotic system may further generate a plurality of object recognition templates 4300 (e.g., 4300A/4300B/4300C/4300D) according to the plurality of appearances, where each of the plurality of object recognition templates 4300 corresponds to a respective one of the plurality of appearances 4140. The at least one processing circuit 1110 may then communicate the plurality of object recognition templates 4300 as the object recognition template set 4301 to a robotic system or storage system for later use. Each of the plurality of object recognition templates 4300 may represent a pose the object model 4200 may have relative to an optical axis 4130 of a virtual camera 4110. Each object recognition template 4300 represents the view of the object 5011 corresponding to the object model 4200 from the perspective of the camera 1200 having a perspective corresponding to that of the virtual camera 4110 during object recognition template 4300 generation.

The at least one processing circuit 1110 may obtain the object registration data 5001 from within its own hardware storage components (i.e. HDDs, SSDs, USBs, CDs, RAIDs, etc.), or software storage components (i.e. Cloud, VSP, etc.). In an embodiment, the at least one processing circuit 1110 may obtain the registration data from an outside processor (i.e. outside laptop, desktop, cell phone, or any other separate device with its own processing system).

The object recognition template generation method 6000 may further include an operation 6003, which may include determining a plurality of viewpoints 4120 of the object model 4200 in a three-dimensional space 4100. This may be referred to as a space sub-sampling procedure. A three-dimensional space 4100 surrounding the object model 4200 may be enclosed by a surface 4101. The three-dimensional space 4100 and the surface 4101 are virtual entities surrounding the object model 4200, which is also a virtual entity. Each of the plurality of viewpoints 4120 determined at operation 6003 may correspond to, or be representative of, a location of the virtual camera 4110 on the surface 4101 enclosing the three-dimensional space 4100 and of a rotational angle of the virtual camera 4110 around an optical axis 4130 of the virtual camera 4110. Thus, each location on the surface 4101 may correspond to multiple viewpoints 4120.

Figure 7A:
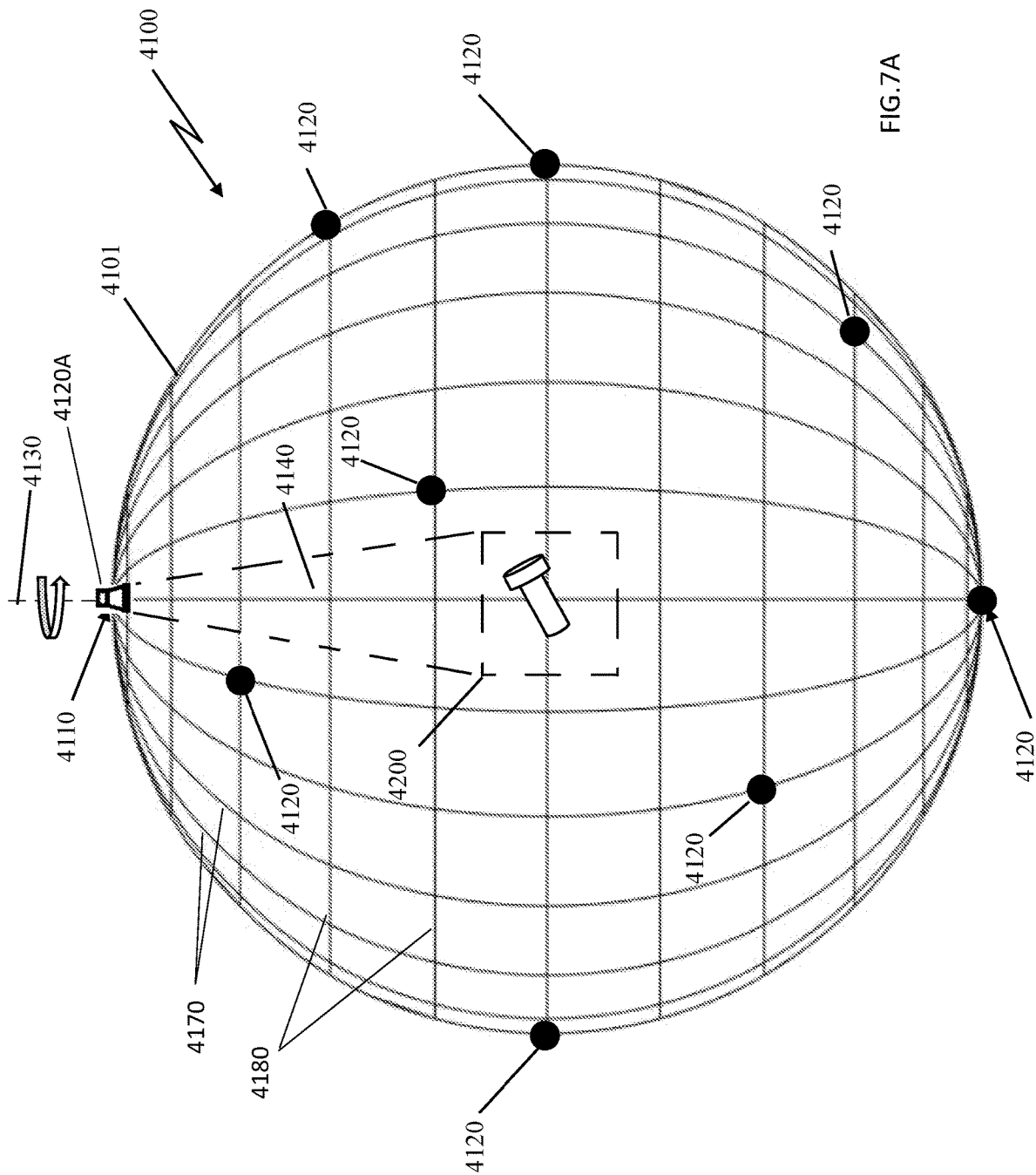
FIGS. 7A and 7B illustrate aspects of a method of generating object recognition templates consistent with embodiments hereof.
Figure 7B:
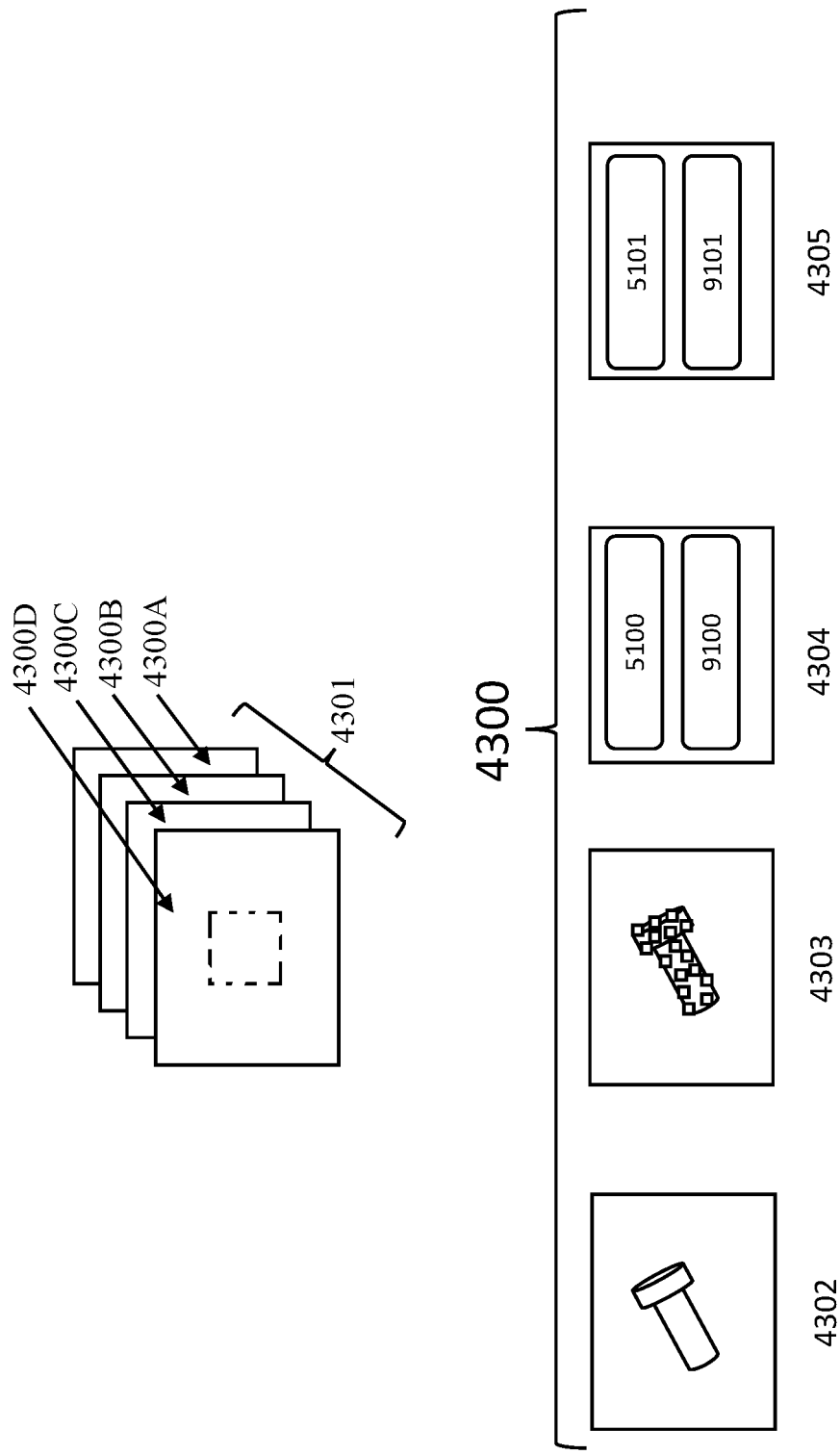

The virtual camera 4110 used in the space sub-sampling procedure may capture an appearance of the object from the viewpoint 4120 at which the virtual camera 4110 is located. For example, as illustrated in FIG. 7A, the virtual camera 4110 located at the individual viewpoint 4120A may capture an appearance 4140 of the object model 4200. The appearance 4140 includes information describing the appearance of the object model 4200 to the virtual camera 4110, based on the angle of view and the rotation of the virtual camera 4110 around it's optical axis. The object model 4200 may be fixed within this three-dimensional space 4100. In an embodiment, the three-dimensional space may be substantially spherical. The object model 4200 may further be fixed at the center, or approximately at the center, of the substantially spherical three-dimensional space. In another embodiment, the three-dimensional space may be any other suitable three-dimensional shape, such as ellipsoidal, or parallelepiped, or the like. The object model 4200 may be fixed on any point, central or non-central, within the three-dimensional space. Each of the individual object recognition templates 4300A/4300B/4300C/4300D etc. generated (e.g., via operation 6007 as further discussed below) may correspond to one captured appearance 4140 of the object model 4200 from one viewpoint 4120 of the plurality of viewpoints 4120. Each object recognition template 4300 may include an appearance 4140 of the object model 4200 from a viewpoint 4120 that captures a pose of the object, i.e., the orientation and visible surface(s) of the object, etc. In an embodiment, each of the plurality of viewpoints 4120 may further correspond to a rotation angle of the virtual camera 4110 within the three-dimensional space 4100; i.e. the rotational angle of the camera with respect to its optical axis 4130, between 1-360°.

The operation 6003 may include a space sub-sampling procedure performed to select the viewpoints 4120 from which corresponding object recognition templates 4300 will be included in the object recognition template set 4301. The efficiency of the object recognition template generation method 6000 may be increased or maximized by reducing or otherwise optimizing the space (e.g., the number of viewpoints 4120 and appearances 4140) from which the object recognition templates 4300 are generated. In embodiments, excess viewpoints 4120 may be eliminated after initially capturing an object appearance 4140 at those viewpoints 4120. For example, excess viewpoints 4120 may eliminated when it is determined that they contain information substantially similar to other viewpoints 4120 (e.g., due to symmetry). In embodiments, excess viewpoints 4120 may be eliminated prior to object appearance 4140 capture, based on predetermined decisions about pose, spacing, etc., as discussed below. In embodiments, a number of selected viewpoints 4120 and the distance in spacing between neighboring viewpoints 4120 may be dependent on the number of object recognition templates 4300 that are needed, for example, based upon the complexity and/or symmetry of the object model 4200 in question.

The plurality of viewpoints 4120 may be selected or determined according to several different methods. For example, the at least one processing circuit 1110 may determine viewpoints 4120 according to intersections of longitudinal circles 4170 and latitudinal circles 4180. Viewpoints 4120 may be located at the intersections of longitudinal circles 4170 and latitudinal circles 4180 spanning a surface 4101 of the three-dimensional space 4100. In such a selection scheme, a high density of viewpoints 4120 may be clustered at or near the poles of the surface 4101, and a low density of viewpoints may form around the intersecting longitudinal and latitudinal circles further away from the poles (e.g., closer to the equator of the surface 4101). Such an uneven distribution of the sample locations may cause the plurality of object recognition templates 4300 to over-represent one range or set of ranges of relative pose/orientation between the virtual camera 4110 and the object model 4200, and to under-represent another range or set of ranges. Such a selection may be advantageous in some scenarios with some object models 4200 and less advantageous in other scenarios.

In further embodiments, the plurality of viewpoints 4120 may be selected according to an even distribution across the surface 4101 that encloses the three-dimensional space 4100. An even distribution may refer to the viewpoints 4120 being distributed at equal distances from one another across the surface 4101. An even distribution may provide more consistent template generation than an uneven distribution and may be preferable for objects that lack symmetry.

In some embodiments, the plurality of viewpoints 4120 may be selected so as to reduce the total number of viewpoints 4120 and/or weight or bias the viewpoint distribution in favor of particular viewpoints.

In an embodiment, the plurality of viewpoints 4120 may be determined based on a predictable range of poses that are expected to be observed for a plurality of the objects 5011 in a physical situation. For example, in a container that holds several tapered bottles, it may be expected that the pose of the bottles be such that the wider or base end faces downward. Accordingly, the viewpoint distribution may be biased or weighted to have more viewpoints 4120 in a top half of the surface 4101.

In another embodiment, the plurality of viewpoints 4120 may be determined based on symmetry (or lack thereof) of the object model 4200. Symmetry of the object model 4200 may be determined based on whether an appearance 4140 of the object model 4200 changes after rotation of the object model 4200 by a number of degrees around an axis of the object model 420. For example, an object model 4200 that appears substantially the same after a 180 degree rotation has two way symmetry. An object model 4200 that appears substantially the same after a 120 degree rotation has three way symmetry. An object model 4200 that appears substantially the same after a 90 degree rotation has four way symmetry. An object model 4200 that appears substantially the same after a 60 degree rotation has six way symmetry. Other symmetries may be possible for different objects. Substantially the same appearance may be determined according to a threshold of similarity.

The object recognition template generation method 6000 may further include an operation 6005, including estimating or capturing a plurality of appearances 4140 of the object model 4200 at each of the plurality of viewpoints 4120. Estimating the plurality of appearances 4140 may be performed at each viewpoint 4120 of the plurality of viewpoints 4120. Each appearance 4140 includes the pose or orientation of the object model 4200 as seen a respective viewpoint 4120. Each of the object recognition templates 4300 corresponds to a respective viewpoint 4120 of the plurality of viewpoints 4120, and includes information representing an appearance 4140 of the object model 4200 from the respective viewpoint 4120. For example, an object recognition template 4300 may correspond to, or represent, a respective appearance 4140 of the object model 4200 from a respective viewpoint 4120, that corresponds to the virtual camera 4110 being disposed directly above the object model (i.e. along the Y-axis of the three-dimensional plane). In another example, an object recognition template 4300 may correspond to a respective appearance 4140 of the object model 4200 from a respective viewpoint 4120 that corresponds to the virtual camera 4110 being disposed directly left of the object model (i.e. along the X-axis of the three-dimensional plane). In an embodiment, each of the object recognition templates 4300 of the object recognition template set 4301 may correspond to, or represent, respective appearances 4140 of the plurality of appearances 4140 of the object model 4200 from respective viewpoints 4120 of the plurality of viewpoints 4120 corresponding to the virtual camera 4110 being disposed at numerous different locations and orientations around the object model 4200 (i.e. numerous locations within the three-dimensional plane). Thus, estimating the plurality of appearances 4140 may include determining, or estimating, how the object model 4200 looks when observed at a particular orientation from a particular viewpoint. For example, the viewpoint may include a direct top-down look of the object model 4200, a bottom-up look, a leftward look, a rightward look, or any angle/location in between main axes X, Y, and Z of and on the surface 4101 enclosing the three-dimensional space 4100. As discussed above, each viewpoint 4120 may also include a rotational angle of the virtual camera 4110 with respect to the camera's optical axis 4130, between 1-360°. Each camera location may thus correspond to a set of viewpoints 4120, and each viewpoint 4120 of the set of viewpoints may further correspond to a different rotational angle of the virtual camera 4110. For example, two separate viewpoints 4120 of the set of viewpoints 4120 may be estimated, or captured, from the same angle/location in between the main axes X, Y, and Z of the surface 4101, but the rotational angle of the first viewpoint 4120 is rotated 45° with respect to the rotational angle of the second viewpoint 4120.

The object recognition template generation method 6000 may further include an operation 6007, in which a plurality of object recognition templates 4300 are generated based on the plurality of appearances 4140. Each of the plurality of object recognition templates 4300 corresponds to a respective one of the plurality of appearances 4140. The generated object recognition templates 4300 may thus include information representative of the object model 4200 in a certain pose, and at a certain angle and/or rotation of the virtual camera 4110 with respect to the object model 4200. Thus, each of the plurality of object recognition templates 4300 may be different from others of the plurality of object recognition templates 4300 (although, in some scenarios, two different object recognition templates 4300 may include substantially the same information due to symmetry of the object model 4200 that is not accounted for in viewpoint 4120 selection).

Each object recognition template 4300 may include a 2D appearance 4302 and a 3D appearance 4303 generated according to the captured or estimated respective appearance 4140. The 2D appearance 4302 may include a rendered two-dimensional image, for example, which may be rendered according to ray tracing and discontinuity detection techniques. The 3D appearance 4303 includes a rendered 3D point cloud, for example, similar to the 3D image information 2700 described with respect to FIG. 2F.

In some implementations, the 2D appearance 4302 and/or the 3D appearance may be generated via ray tracing techniques. The ray tracing operation may simulate various rays from the virtual camera 4110 perspective hitting a surface of the object model 4200. It may further determine the angles at which the rays hit the surface of the object model 4200, the distance traveled by the rays to the surface of the object model 4200, and/or the effects of diffuse reflection (where a deflected ray is done so at multiple angles) or specular reflection (wherein a deflected ray is done so at a singular angle). The angles of deflected rays reflected from the surface the object model 4200 may be indicative of a change in the angle of a surface normal of the object. Such a change in angle of the surface normal of the object may occur at an edge of the object.

A total number of the plurality of object recognition templates 4300 generated for an object model 4200 may range from approximately 100 templates to 3200 templates, wherein a higher number of templates may correlate to the complexity of the object model 4200 from which the plurality of object recognition templates 4300 are generated from. The cited numbers are common for some applications and some object types, but more or fewer templates may be used without departing from the scope of the invention. For example, an object model 4200 that presents a substantially symmetrical appearance (e.g., a threaded nut) will generate a high number of redundant templates (i.e. matching templates) or templates that are substantially the same. Such a simple object model 4200 may thus generate as few as 100 templates, or any number of templates in the lower half of the range between 100 to 3200 templates. Conversely, an object model 4200 that lacks symmetry may require more object recognition templates 4300 to provide for proper representation of the object model 4200 at a greater number of viable angles.

The object recognition template generation method 6000 may further include an operation 6009 including communicating the plurality of object recognition templates 4300 as the object recognition template set 4301 to a robotic control system. The object recognition template set 4301 may be communicated to a robotic control system such as the computing system 1100, any other type of robotic control system, and/or any other system that may employ object recognition templates 4300. In embodiments, communicating the object recognition template set 4301 may include direct communication via any suitable networking protocol and/or storage to a memory or other storage device for any period of time for later access by a robotic control system or other system that can employ the object recognition templates Each of the plurality of object recognition templates 4300 in the object recognition template set 4301 represents a pose the object model 4200 may have relative to an optical axis 4130 of the virtual camera 4110 when located at a specific viewpoint 4120. As previously described, the pose may include any positional angle and rotational angle.

As discussed above, the object recognition template generation method 6000 of the present invention involves generating an object recognition template set 4301 from object registration data 5001. The object recognition template set 4301 may be used to identify one or more objects 5011 in a scene during physical operations to grab, pick, or otherwise interact with one or more objects 5011. Object registration data 5001 of an object model 4200 representative of an object 5011 is obtained. A plurality of viewpoints 4120 of the object model 4200 in a three-dimensional space 4100 are determined. Appearances 4140 of the object model at each of the plurality of viewpoints 4120 are estimated or captured. A plurality of object recognitions templates 4300 are generated according to the plurality of appearances 4140, where each of the plurality of object recognition templates 4300 correspond to a respective one of the plurality of appearances 4140. The plurality of object recognition templates 4300 are communicated to a robotic control system as the object recognition template set 4301. Each of the plurality of object recognition templates 4300 represents a pose the object model 4200 may have relative to the optical axis 4130 of the virtual camera 4110. Each of the plurality of object recognition templates 4300 may thus correspond to a potential pose of an object 5011 in a physical scene relative to an optical axis of a camera (such as camera 1200) generating image information (e.g., image information 2600/2700) of the object 5011 within the physical scene.

In further embodiments, additional or alternative methods may be used to generate an object recognition template set 4301 from the object registration data 5001 and an object recognition template 4300 may include additional or different information than the 2D appearance 4302 and the 3D appearance 4303. Specifically, an object recognition template 4300 may include two-dimensional (2D) measurement information 4304 and three-dimensional (3D) measurement information 4305.

2D measurement information 4304 may refer to a gradient feature map. A gradient feature map may include gradient information 9100 captured or extracted from a digital representation of an object at one or more gradient extraction locations 5100 on the surface of the digital object, as described below. 3D measurement information 4305 may refer to a surface normal feature map. A surface normal feature map may include surface normal vectors 9101 captured or extracted from a digital representation of an object at one or more surface normal locations 5101 on the surface of the digital object, as described below. The generation and/or extraction of 2D measurement information 4304 and 3D measurement information 4305 is described in greater detail below with respect to FIGS. 8-9C.

FIG. 8 illustrates a flow diagram for an example feature generation method 8000. In embodiments, the feature generation method 8000 may be used for generating an object recognition template set and/or a plurality of object recognition templates. In further embodiments, as discussed in greater detail below, the feature generation method 8000 may be used to extract features from object image information in hypothesis generation, refinement, and validation methods. In an embodiment, the feature generation method 8000 may be performed by, e.g., the computing system 1100 (or 1100A/1100B/1100C) of FIGS. 2A-2D or the computing system 1100 of FIGS. 3A-3B, or more specifically by the at least one processing circuit 1110 of the computing system 1100. In some scenarios, the computing system 1100 may perform the feature generation method 8000 by executing instructions stored on a non-transitory computer-readable medium (e.g., 1120). For instance, the instructions may cause the computing system 1100 to execute one or more of the modules illustrated in FIG. 2D, which may perform feature generation method 8000. For example, in embodiments, steps of the feature generation method 8000 may be performed by the object registration module 1130, the object recognition module 1121, the feature extraction module 1134, and the template generation module 1132 operating in conjunction.

In embodiments, the steps of the feature generation method 8000 may be employed to achieve object recognition template generation, for example through feature generation and/or extraction methods, which may later be used in conjunction with specific sequential robot trajectories for performing specific tasks. In embodiments, the steps of the feature generation method 8000 may be applied to extract or generate features from object image information for use in hypothesis generation, refinement, and validation. As a general overview, the feature generation method 8000 may operate to cause the computing system 1100 to generate sets of object recognition templates, feature maps, and/or extracted/generated features for a computing system (e.g., computing system 1100 or a similar computing system) to use in identifying an object in a scene for operations related to object picking. The feature generation method 8000 is described below with additional reference to FIGS. 7A and 7B and FIGS. 9A-9C.

Figure 9A:
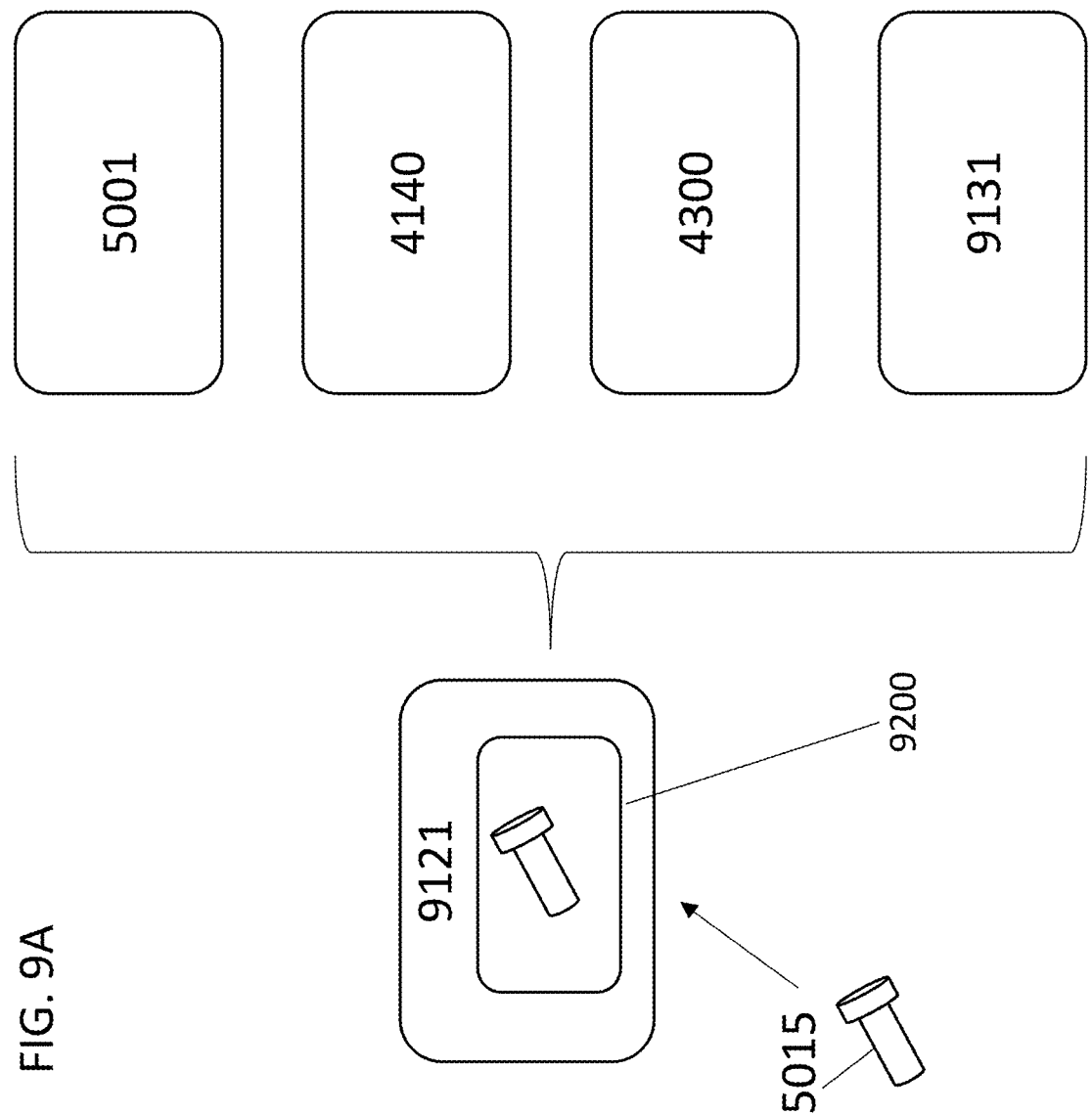

The feature generation method 8000 may include generating 2D measurement information 4304 and 3D measurement information 4305 that may be used for generating an object recognition template 4300 and/or for characterizing an object 5012 (see, e.g., FIG. 3B) within a physical scene 5013. The at least one processing circuit 1110 may obtain object information 9121. As shown in FIG. 9A, the object information 9121 may include a digitally represented object 9200, for example, the object registration data 5001 of an object model 4200, an appearance 4140 of an object model 4200, an object recognition template 4300, and/or scene information 9131. Scene information 9131 may include 2D or 3D image information captured of a physical scene 5013 containing multiple objects 5012, similar to, for example, 2D image information 2600 and/or 3D image information 2700. Scene information 9131 may also include image information 12001, discussed below with respect to hypothesis generation, validation, and refinement methods and operations. The at least one processing circuit 1110 may further extract or generate 2D measurement information 4304 and/or 3D measurement information 4305 from the object information 9121. In embodiments, the at least one processing circuit 1110 may still further generate an object recognition template 4300 according to the 2D measurement information 4304 and the 3D measurement information 4305. In embodiments, the 2D measurement information 4304 and the 3D measurement information 4305 may be used or employed for alternate purposes, such as hypothesis generation, validation, and refinement. The at least one processing circuit 1110 may perform specific steps of feature generation method 8000 for generating the object recognition template set 4301 and/or for use in hypothesis refinement and validation.

In an operation 8001, the feature generation method 8000 may include obtaining the object information 9121. The object information 9121 may include a digitally represented object 9200. The object information 9121 and the digitally represented object 9200 may represent an object 5015, physically present in the world. The object 5015 may include, for example, the object 5011 (e.g., a physical object represented by the object model 4200) and/or the object 5012 (e.g., a physical object represented by image information captured of a physical scene 5013). In embodiments, the object information 9121 may include one or more of an object recognition template 4300, object registration data 5001, an object appearance 4140 and/or scene information 9131. The at least one processing circuit 1110 may obtain the object information 9121 from within the hardware storage components (i.e. HDDs, SSDs, USBs, CDs, RAIDs, etc.), or software storage components (i.e. Cloud, VSP, etc.) of the computing system 1100. The at least one processing circuit 1110 may obtain the object information 9121 as part of internal processing, e.g., as an object recognition template 4300. The at least one processing circuit 1110 may obtain the object information 9121 from a camera 1200 associated with the computing system 1100. The at least one processing circuit 1110 may obtain the object information 9121 of the object from an outside processor (i.e. outside laptop, desktop, cell phone, or any other separate device with its own processing system) or an outside storage device.

Figure 9B:
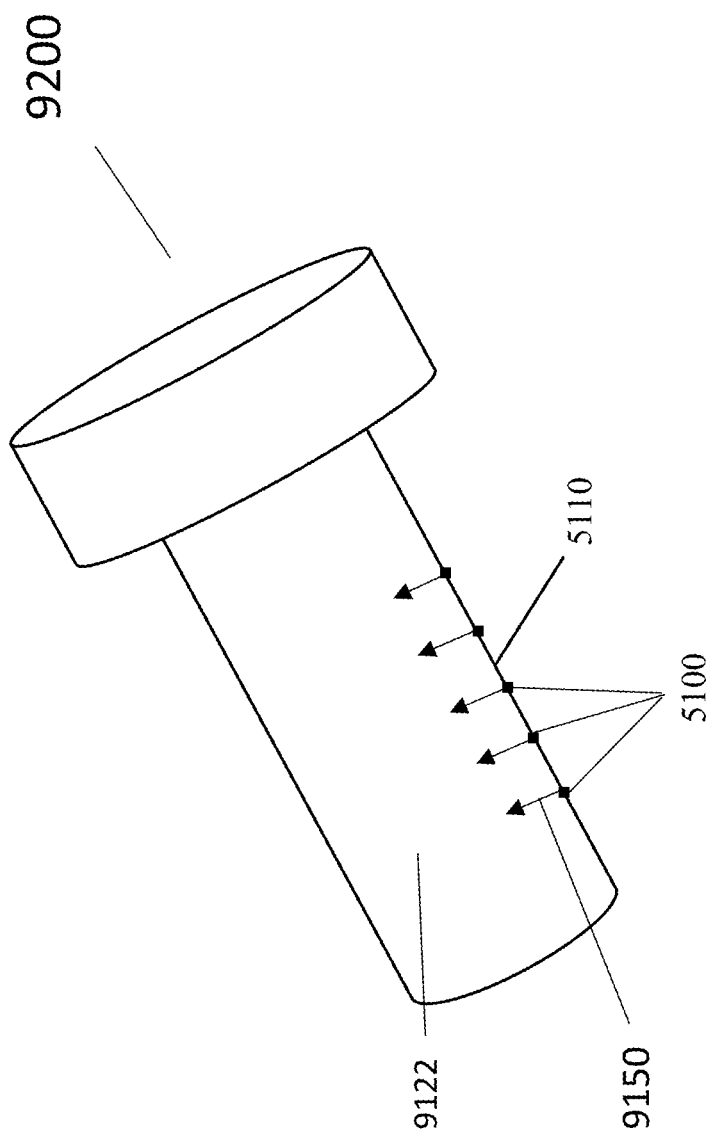
Figure 9C:
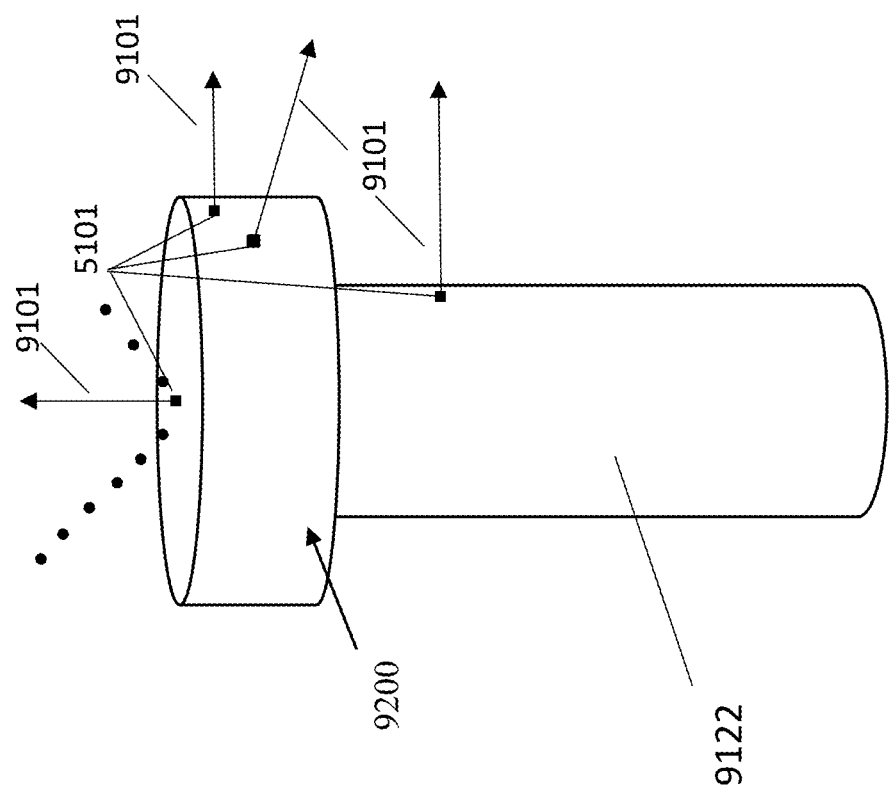

In an operation 8003, the feature generation method 8000 may further include selecting feature locations including gradient extraction locations 5100 (shown in FIG. 9B) and surface normal locations 5101 (shown in FIG. 9C). The gradient extraction locations 5100 are locations selected for the extraction or generation of the 2D measurement information 4304. The surface normal locations 5101 are locations selected for extraction or generation of the 3D measurement information 4305. Each of the gradient extraction locations 5100 and surface normal locations 5101 are locations on the surface 9122 of the digitally represented object 9200.

In embodiments, the gradient extraction locations 5100 and the surface normal locations 5101 may correspond to one another. In embodiments, some gradient extraction locations 5100 may correspond to some surface normal locations 5101 while other gradient extraction locations 5100 do not correspond to surface normal locations 5101. In further embodiments, gradient extraction locations 5100 and the surface normal locations 5101 may be selected so as to be non-overlapping with one another. Thus, the gradient extraction locations 5100 and the surface normal locations 5101 may have any amount of overlap, including complete overlap and no overlap.

In embodiments, the gradient extraction locations 5100 and the surface normal locations 5101 location on the surface 9122 of the digitally represented object 9200 may be selected as a limited set to limit the amount of memory required to store the extracted or generated 2D measurement information 4304 and 3D measurement information 4305. This memory conservation practice may be referred to as a linear modality, which may refer to a fixed number of total features (such as gradient information 9100 and/or surface normal vectors 9101, as described below) extracted and/or analyzed regardless of the size (in bytes) of the object information 9121 of the digitally represented object 9200. The number of features captured for the 2D measurement information 4304 may be the same or different to the number of features captured for the 3D measurement information 4305.

In embodiments, the limited number of gradient extraction locations 5100 and surface normal locations 5101 may be located so as to generate efficient results. For example, the gradient extraction locations 5100 may be located along identified edges of the digitally represented object 9200, as shown in FIG. 9B, while the surface normal locations 5101 may be located away from edges of the digitally represented object 9200. In embodiments, edges of the digitally represented object 9200 may be identified, e.g., according to ray tracing, pixel intensity discontinuities, or other analysis techniques. This may prove efficient because the gradient information 9100, as described below, may be more significant in hypothesis generation, validation, and refinement when captured near object edges while surface normal vectors 9101 may be more significant when captured away from edges. The combined number of the gradient extraction locations 5100 and the surface normal locations 5101 selected may range from 100-1000, from 50-5000, and/or from 10-1000, although more or fewer may be appropriate as well. In a specific embodiment, the number of the gradient extraction locations 5100 and the surface normal locations 5101 may each be 256 or may total to 256.

In an operation 8005, the feature generation method 8000 may further include extracting 2D measurement information 4304 from the object information 9121. The 2D measurement information 4304 may represent a smaller set of information (e.g., as compared to the 2D appearance 4302) to represent the object 5015, so as to conserve memory or other resources, and/or to improve a speed by which an object recognition template set 4301 is generated or hypothesis validation and refinement is performed. As described above, an object recognition template 4300 from the object recognition template set 4301 may include 2D measurement information 4304 (and/or 3D measurement information 4305) that describes the object 5015.

The 2D measurement information 4304 may include two-dimensional features extracted or generated from the object information 9121. In an embodiment, extracting or generating the 2D measurement information 4304 may include extracting gradient information 9100 from the object information 9121. Thus, the 2D measurement information 4304 may include a gradient feature map including gradient information 9100 as described herein. The gradient information 9100 indicates a direction or orientation of an edge 5110 of the digitally represented object 9200. The gradient information 9100 may be extracted at a plurality of gradient extraction locations 5100 of the digitally represented object 9200. The gradient extraction locations 5100 may be representative of any or all internal and external edges identified within the digitally represented object 9200.

Extracting the gradient information 9100 may include analyzing pixel intensity of two-dimensional image information of the object information 9121 to measure a direction (e.g., as represented by arrows 9150) in which the pixel intensity of the two-dimensional image information at each gradient extraction location is changing in a process referred to as gradient extraction. Changes in pixel intensity may represent contours and orientations of surfaces and edges of a digitally represented object 9200, thus providing information that may help in comparing two digitally represented objects 9200. Locations near one another along an edge 5110 may be likely to have similar gradient information 9100, e.g., the pixel intensity near such neighboring locations changes in similar ways with increasing distance from the edge 5110. In some examples, portions of digitally represented object 9200 presenting higher than average pixel intensity may be indicative of an edge 5110 or other identifiable feature. As discussed above, in some examples, the gradient extraction locations 5100 may be disposed along the edges 5110 of the digitally represented object 9200.

In an embodiment, the extracted gradient information 9100 may be used to improve a template matching operation, hypothesis generation, or hypothesis validation operation, which may determine whether an object recognition template 4300 from the object recognition template set 4301 matches an object 5012 in a scene. For example, if a 2D appearance 4302 has certain portions which overlap or intersect with a digitally represented object 9200 from a scene, the at least one processing circuit 1110 may determine whether the matching portions also present matching or similar gradients (e.g., whether portions of the 2D measurement information 4304 match). If the gradients are dissimilar or do not match, then the at least one processing circuit 1110, may determine that the dissimilar certain portions are a result of a poor match, or are coincidental. The poor match may be the result of the 2D appearance 4302 overlapping a portion of the scene by some slight amount.

For example, referring now to FIG. 9D, a 2D appearance 4302A of an object recognition template 4300A is represented by a rectangle and 2D measurement information 4304A (e.g., gradient information 9100) of the object recognition template 4300A is represented by an arrow. 2D image information 2600B of an object 5012 (physical object not shown) in the scene is represented by the L shaped solid. The object 5012 is further represented by the 2D measurement information 4304B, represented by arrows. A portion of the 2D appearance 4302A may be compared and overlapped with the patterned portion 9309 of the 2D image information 2600B representative of an object 5012 (physical object not shown) in the scene. However, the gradients represented by the 2D measurement information 4304A and 4304B do not match and it may be determined by the at least one processing circuit 1110, therefore, that the object recognition template 4300A is a poor fit for the object 5012 in the scene 5013.

In an operation 8007, the feature generation method 8000 may further include extracting or generating 3D measurement information 4305 from the object information 9121. Referring now to FIG. 9C, the operation 8007 may include determining surface normal vectors 9101 at the surface normal locations 5101. The 3D measurement information 4305 may include a surface normal feature map including the extracted or generated surface normal vectors 9101.

Extracted 3D measurement information 4305 may include surface normal vector information, e.g., measurements describing surface normal vectors 9101, which may be normal vectors (vectors perpendicular to the surface) taken at the surface normal locations 5101 found on the surface 9122 of the digitally represented object 9200. In an embodiment, extracting or generating the 3D measurement information 4305 includes extracting or generating the surface normal vectors 9101 and/or the surface normal vector information from the object information 9121. The surface normal vectors 9101 describe a plurality of vectors normal to a surface (or surfaces) 9122 of the digitally represented object 9200. The surface normal vectors 9101 may be extracted or generated at a plurality of surface normal locations 5101 of the digitally represented object 9200. Extracting the surface normal vectors 9101 may include identifying the plurality of surface normal vectors 9101 of the digitally represented object 9200 at respective ones of the surface normal vector location 5101.

In an operation 8009, the feature generation method 8000 may include generating an object recognition template set 4301 or a plurality of object recognition templates 4300. The at least one processing circuit 1110 may generate one or more object recognition templates 4300 including the above discussed 2D measurement information 4304 and the 3D measurement information 4305. The one or more object recognition templates 4300 may form an object recognition template set 4301. As discussed above, an object recognition template 4300 may include one or more of the 2D measurement information 4304, the 3D measurement information 4305, the 2D appearance 4302, and the 3D appearance 4303. Thus, in some embodiments, the feature generation method 8000 may augment or further develop previously established object recognition templates 4300 and object recognition template sets 4301. The extracted or generated 3D measurement information 4305 and 2D measurement information 4304 may be used for identifying an object 5012 in a scene during real-time or near real time picking operations, as discussed below. The feature generation method 8000 may work or operate in tandem with or subsequently after the object recognition template generation method 6000 described above in generating the object recognition template set 4301 for later performing matching (hypothesis refinement and validation) operations against the scene (or the object within the scene). The feature generation method 8000 may serve as the final steps towards the creation of the object recognition template set 4301 to be used in later hypothesis operations (such as method 11000 and method 13000 described in further detail below).

FIGS. 10A and 10B illustrates aspects of a template matching and hypothesis generation method 10000 consistent with embodiments hereof. The hypothesis generation techniques discussed herein may be generally consistent with a lineMod technique.

In an operation 10001, the template matching and hypothesis generation method 10000 may include obtaining image information. In an embodiment, obtaining the image information 12001 may include capturing an image of the scene 5013 and one or more objects 5012 within the scene. In such instances, the image information 12001 may represent objects 5012 located in boxes, bins, cases, crates, pallets, or other containers. The image information 12001 may be obtained by a camera 1200, as discussed herein.

The at least one processing circuit 1110 may be configured to generate, receive, and/or process the image information 12001, such as by using the image information 12001 to distinguish between individual objects in the camera 1200 field of view, to perform object recognition based on the image information 12001. In an embodiment, the image information 12001 may include two-dimensional image information (e.g., akin to 2D image information 2600) that describes a visual appearance of the environment or scene 5013 in the field of view of the camera 1200. In an embodiment, the image information 12001 may include three-dimensional image information (e.g., akin to 3D image information 2700) that provides a point cloud, spatial structure information, depth map, or other three-dimensional image of the scene 5013 in the field of view of the camera 1200. The three-dimensional image information in this example may be used to estimate how the objects 5012 are spatially arranged in three-dimensional space (e.g. the scene 5013). Obtaining the image information 12001 may include generating or obtaining the image information 12001 that represents the scene 5013 and may include generating or obtaining object image information 12002 that represent individual objects 5012 or multiple objects 5012 in the scene 5013, as necessary. The image information 12001 may be generated by the camera 1200 when the object(s) 5012 is (or has been) in the field of view of the camera 1200, and may include, e.g., two-dimensional image information and/or three-dimensional image information.

In an embodiment, the image information 12001 may include a two-dimensional grayscale or color image and may describe an appearance of the scene 5013 (and/or the object(s) 5012 within the scene) from the viewpoint of the camera 1200. In an embodiment, the image information 12001 may correspond to a single-color channel (e.g., red, green, or blue color channel) of a color image. If the camera 1200 is disposed above the objects 5012, then the two-dimensional image information may represent an appearance of respective top surfaces of the objects 5012. Further, the image information 12001 may include three-dimensional image information, which may include, e.g., a depth map or a point cloud that indicates respective depth values of various object locations 6220 on one or more surfaces (e.g., top surface or other outer surface) or along one or more edges of the objects 5012. The two-dimensional image information and the three-dimensional image information of the object image information 12002 may be referred to as 2D image information 12600 and 3D image information 12700 respectively. In some implementations, the object locations 6220 representing physical edges of an object 5012 may be used to identify object image information 12002 that is limited to representing an individual object 5012.

The object image information 12002 may include image information related to specific physical objects 5012 within the scene 5013. The object image information 12002 may include 2D image information 12600 representative of the object 5012 similar to image information 2600. The object image information 12002 may include 3D image information 12700 representative of the object 5012 similar to image information 2700. The object image information 12002 may include object locations 6220, which may further include gradient extraction locations 8100 and surface normal locations 8101, representing locations at which respective gradient information 8102 and surface normal vectors 8103 are obtained. e.g., via a feature generation method 8000 The gradient extraction locations 8100, surface normal locations 8101, gradient information 8102, and surface normal vectors 8103 may be similar to the gradient extraction locations 5100, surface normal locations 5101, gradient information 9100, and surface normal vectors 9101, described above, excepting that the gradient extraction locations 8100, surface normal locations 8101, gradient information 8102, and surface normal vectors 8103 are obtained from image information obtained of a physical object.

The template matching and hypothesis generation operations discussed below may be performed by comparing object recognition templates to the image information 12001 and/or the object image information 12002. In embodiments, the object image information 12002 may be generated from the image information 12001, for example based on image segmentation or other techniques as well as the feature generation method 8000, as discussed above.

In an operation 10003, the template matching and hypothesis generation method 10000 may include matching a template to the object image information. The types of objects 5012 present in the scene 5013 (whether it be a single type or multiple types) may be known. Accordingly, object recognition template sets 4301 that correspond to the known object types may be obtained, e.g., via any method as described herein. The information of each object recognition template 4300 of the object recognition template sets 4301, which represent information about how the object 5012 should look in various poses, may be compared to the object image information 12002 representative of the object 5012 to determine whether each object recognition template 4300 is a candidate for a match. Good candidates for match may then be selected for the generation of detection hypotheses.

Any relevant information of the object recognition template 4300 may be compared to the corresponding information of the object image information 12002. For example, the gradient information 8102 and gradient extraction locations 8100 of the object image information 12002 may be compared to the gradient information 9100 and gradient extraction locations 5100 of the object recognition templates 4300. The surface normal vectors 8103 and surface normal locations 8101 of the object image information 12002 may be compared to the surface normal vectors 9101 and the surface normal locations 5101 of the object recognition templates 4300. The 2D information 12600 and the 3D information 12700 may respectively be compared to the 2D appearance 4302 and the 3D appearance 4303.

The above described information from the object recognition templates 4300 and from the object image information 12002 may be understood as maps, in that the information can be ascribed to a series of two-dimensional locations. The template map (representing any of the object recognition template 4300 information) may be slid laterally against the object map (representing any of the object image information 12002) until a match exceeding a threshold is found. Template matching may involve comparing the respective gradient information, the respective 2D image information, the respective 3D information, and/or the respective surface normal vector information.

Thresholds may be used and tolerancing may be permitted to account for potential variations in pose between the object recognition templates 4300 and the object image information 12002. It is not possible for the space sub-sampling procedure described above to capture every possible pose in the object recognition templates 4300 and thus it may be understood and accounted for that some variation is acceptable. Such tolerancing techniques may include, for example, spreading, whereby the gradient information 9100 is spread out among neighboring gradient extraction locations 5100 in an object recognition template 4300 to increase a chance of a match. Another tolerancing technique may include finding a match based on a threshold level of matching, e.g., when gradient information or surface normal vectors are close to one another but not perfectly matching. Template matching may generate template matching score to indicate a quality of match.

In an operation 10005, the template matching and hypothesis generation method 10000 may include clustering and grouping the matching templates to reduce a total number of matches. The template matching operation may find multiple object recognition templates 4300 that match objects represented by the object image information 12002. In some implementations, the template matching operation may be limited, by time or computing resources, in terms of how many matches may be identified. In such situations, the operation 10005 may avoid concentrating the matches on a single portion or set of portions in the scene 5013. Thus, the matched templates that have a good quality match (e.g., exceeding a threshold) may be clustered, grouped, and filtered to maintain good scene coverage. Object recognition templates 4300 that are identified as corresponding to the same object image information 12002 may be clustered or grouped. Among each clusters or groups, the best matches may be selected and the remainder eliminated. Thus, the remaining matches may represent objects 5012 throughout the scene 5013, rather than clustering in a single area. In an example, if an object 5012 in a scene 5013 is near the top of the container and quite easily recognizable, it may generate more matches than an object that is partially obscured. By only selecting the best matches for each object image information 12002, more objects can be identified.

In an operation 10007, the template matching and hypothesis generation method 10000 may include generating one or more sets of detection hypotheses. The object recognition templates 4300 remaining after clustering and grouping may be selected as detection hypotheses. These object recognition templates 4300 may be stored with pose information 6301 indicating information about where in the scene 5013 each object recognition template 4300 should be located to match the corresponding object image information. The pose information 6301 may further include information that associates each object recognition template 4300 with the corresponding object image information 12002. The detection hypotheses 6300 may be combined in groups and/or sets. For example, a detection hypothesis set 8309 may include multiple detection hypotheses 8300 pertaining to object image information 12002 representative of a single object 5012 while a group of detection hypotheses 8300 may include multiple detection hypotheses 8300 pertaining to object image information 12002 representative of multiple different objects 5012 within a scene 5013.

FIG. 11 depicts a flow diagram for an example hypothesis refinement method 11000 for refining a detection hypothesis. In an embodiment, the hypothesis refinement method 11000 may be performed by, e.g., the computing system 1100 (or 1100A/1100B/1100C) of FIGS. 2A-2D or the computing system 1100 of FIGS. 3A-3B, or more specifically by the at least one processing circuit 1110 of the computing system 1100. In some scenarios, the computing system 1100 may perform the hypothesis refinement method 11000 by executing instructions stored on a non-transitory computer-readable medium (e.g., 1120). For instance, the instructions may cause the computing system 1100 to execute one or more of the modules illustrated in FIG. 2D, which may perform method 11000. For example, in embodiments, steps of the method 11000 may be performed by the hypothesis generation module 1128 and the hypothesis refinement module 1136 operating in conjunction.

The hypothesis refinement method 11000 may be used to refine one or more detection hypotheses 6300 (e.g., as discussed above) generated to identify an object 5012 physically located within a scene 5013. The hypothesis refinement method 11000 may operate on image information 12001 obtained of a scene 5013. The image information 12001 may be similar to the 2D image information 2600 and the 3D image information 2700. Within the image information 12001 may be one or more object image information 12002 representative of the objects 5012 within the scene 5013. Identifying an object 5012 may include identifying an object type or identifying object dimensions from a corresponding object image information 12002 and/or may include matching an object image information 12002 to an object recognition template 4300. Thus, the detection hypothesis 6300 may be a hypothesis regarding which of one or more object recognition templates 4300 may match an object image information 12002 of the image information 12001 representative of the scene 5013. The object image information 12002 may include 2D image information 12600 representative of the object 5012. The 2D image information 12600 may be similar to image information 2600 and/or may include rendered 2D image information generated according to rendering techniques such as ray tracing and discontinuity detection. The object image information 12002 may include 3D image information 12700 representative of the object 5012 similar to image information 2700. The detection hypothesis 6300 may be generated according to template matching procedures, as described above. For example, in an embodiment, the detection hypothesis 6300 may be generated via lineMod algorithms and/or procedures as described above. The hypothesis refinement method 11000 may operate to refine matching of the object recognition template 4300 with the object image information 12002, even in scenarios where the object recognition template 4300 does not match exactly to the object image information 12002.

In the hypothesis refinement method 11000, the at least one processing circuit 1110 may be in communication with a robot 3300, having a robotic arm 3320 and an end effector apparatus 3330 connected thereto, and a camera 1200 having a field of view and configured, when one or more objects 5012 are or have been in the field of view, to execute instructions stored on a non-transitory computer-readable medium. In embodiments, the at least one processing circuit 1110 may not be in direct communication from with the robot 3300, but may receive and transmit information to robot 3300 via networks and/or via storage devices. In embodiments, the at least one processing circuit 1110 may be in direct communication from with the robot 3300. The at least one processing circuit 1110 may obtain image information 12001 of one or more objects 5012 in the scene 5013. The at least one processing circuit 1110 may also obtain a detection hypothesis 6300. The detection hypothesis 6300 may include information associating an object image information 12002 with an object recognition template 4300 (e.g., a corresponding object recognition template 4300B selected from multiple object recognition templates 4300) and may include pose information 6301 of an object 5012 represented by the object image information 12002. The pose information 6301 of the object 5012 may refer to the location and orientation of the object 5012. In embodiments, the detection hypothesis 6300 may include or may include a reference to a corresponding object recognition template 4300B. The at least one processing circuit 1110 may operate to identify a discrepancy between the corresponding object recognition template 4300B and the object image information 12002 to which it corresponds. The at least one processing circuit 1110 may operate to identify a set of template locations 6210 in the corresponding object recognition template 4300B corresponding to a set of object locations 6220 in the object image information 12002. The at least one processing circuit 1110 may further operate to adjust the set of template locations 6210 to converge to the set of object locations 6220. The at least one processing circuit 1110 may operate to generate an adjusted detection hypothesis 6300' or multiple iterative adjusted detection hypotheses 6300' including an adjusted object recognition template according to the set of template locations 6210 after adjustment.

The at least one processing circuit 1110 may perform the specific steps of the hypothesis refinement method 11000 for refining the detection hypothesis 6300. In an operation 11001, the hypothesis refinement method 11000 may include obtaining the image information 12001 of one or more objects 5012 in the scene 5013. In an embodiment, obtaining the image information 12001 may include capturing an image of the scene 5013. In such instances, the image information 12001 may represent objects 5012 located in boxes, bins, cases, crates, pallets, or other containers. The image information 12001 may be obtained by a camera 1200, as discussed herein.

The at least one processing circuit 1110 may be configured to generate, receive, and/or process the image information 12001, such as by using the image information 12001 to distinguish between individual objects in the camera 1200 field of view, to perform object recognition or object registration based on the image information 12001. In an embodiment, the image information 12001 may include two-dimensional image information (e.g., akin to 2D image information 2600) that describes a visual appearance of the environment or scene 5013 in the field of view of the camera 1200. In an embodiment, the image information 12001 may include three-dimensional image information (e.g., akin to 3D image information 2700) that provides a point cloud, spatial structure information, depth map, or other three-dimensional image of the scene 5013 in the field of view of the camera 1200. The three-dimensional image information in this example may be used to estimate how the objects 5012 are spatially arranged in three-dimensional space (e.g. the scene 5013). Regarding the operation 11001, obtaining the image information 12001 may include generating or obtaining the image information 12001 that represents the scene 5013 and may include generating or obtaining one or more object image information 12002 that represent individual objects 5012 or multiple objects 5012 in the scene 5013, as necessary. The image information 12001 may be generated by the camera 1200 when the object(s) 5012 is (or has been) in the field of view of the camera 1200, and may include, e.g., two-dimensional image information and/or three-dimensional image information.

In an embodiment, the image information 12001 may include a two-dimensional grayscale or color image and may describe an appearance of the scene 5013 (and/or the object(s) 5012 within the scene) from the viewpoint of the camera 1200. In an embodiment, the image information 12001 may correspond to a single-color channel (e.g., red, green, or blue color channel) of a color image. If the camera 1200 is disposed above the objects 5012, then the two-dimensional image information may represent an appearance of respective top surfaces of the objects 5012.

The object image information 12002 may include image information related to specific physical objects 5012 within the scene 5013. The object image information 12002 may include 2D image information 12600 representative of the object 5012 similar to image information 2600. The object image information 12002 may include 3D image information 12700 representative of the object 5012 similar to image information 2700. The object image information 12002 may include object locations 6220, which may further include gradient extraction locations 8100 and surface normal locations 8101, representing locations at which respective gradient information 8102 and surface normal vectors 8103 are obtained. e.g., via a feature generation method 8000 The gradient extraction locations 8100, surface normal locations 8101, gradient information 8102, and surface normal vectors 8103 may be similar to the gradient extraction locations 5100, surface normal locations 5101, gradient information 9100, and surface normal vectors 9101, described above, excepting that the gradient extraction locations 8100, surface normal locations 8101, gradient information 8102, and surface normal vectors 8103 are obtained from image information obtained of a physical object.

In an operation 11003, the hypothesis refinement method 11000 may further include obtaining a detection hypothesis 6300. The detection hypothesis 6300 may include multiple pieces of information. For example, the detection hypothesis 6300 may include corresponding object recognition template 4300B and object pose information 6301 indicating the location and orientation of the corresponding object recognition template 4300B necessary to overlay a corresponding object image information 12002 within the image information 12001. The corresponding object recognition template 4300B may include one or more of a 2D appearance 4302B, a 3D appearance 4303B, 2D measurement information 4304B, and 3D measurement information 4305B. As discussed above, the 2D measurement information 4304B may include gradient information 9100B and gradient extraction locations 5100B while the 3D measurement information 4305B may include surface normal vectors 9101B and surface normal locations 5101B. The corresponding object recognition template 4300B may further include template locations 6210, which may include the gradient extraction locations 5100B and surface normal locations 5101B or a subset thereof.

In an operation 11005, the hypothesis refinement method 11000 may further include identifying a discrepancy between the corresponding object recognition template 4300B and the object image information 12002 to which it has been template matched according to the detection hypothesis 6300. The two-dimensional information of the corresponding object recognition template 4300B (e.g., the 2D appearance 4302B) may be compared to the object image information 12002 to identify a discrepancy. Discrepancies may be identified or quantified according to areas of non-alignment or other mismatches between the 2D appearance 4302B and the object image information 12002.

Upon identification of a discrepancy or mismatch between the corresponding object recognition template 4300B, the two-dimensional information of the corresponding object recognition template 4300B (e.g., the 2D appearance 4302B) may be transformed from two-dimensional space to three-dimensional space for comparison and alignment with the object image information 12002. In some instances, the 3D appearance 4303B or the 3D transformation of the 2D appearance 4302B may be used for comparison with the object image information 12002 to identify a discrepancy. In some embodiments, discrepancies may be identified or quantified according to mismatches between object locations 6220 and template locations 6210. Object locations 6220 represent points on the digital representation of the object 5012 (e.g., the object image information 12002), while the template locations 6210 represent points on a template object 6290 (as discussed below).

The transformation from two-dimensional space to three-dimensional space may be based on calibration parameters or other parameters of the camera 1200 or other image sensor, which may have been determined during a camera calibration operation, or may have been predefined. As discussed above, the corresponding object recognition template 4300B is derived from object registration data 5001 and may have a coordinate system associated therewith. In transforming to three-dimensional space, the coordinate system of the corresponding object recognition template 4300B may be mapped to a coordinate system of the scene 5013, as captured in the image information 12001. Accordingly, calibration parameters or other parameters of the camera 1200, which captured the image information 12001, may be employed for the transformation. The information of the detection hypothesis 6300 may define a digital representation of an object, which is referred to herein as the template object 6290. The three-dimensional transformation may be referred to as a template object 6290 and may represent the information of the detection hypothesis 6300 in three-dimensional space in the coordinate system of the image information 12001 for comparison to the object image information 12002.

In an operation 11007, the hypothesis refinement method 11000 may further include identifying a set of template locations in the corresponding object template corresponding to a set of object locations on the corresponding object. Object locations 6220 represent points on the digital representation of the object 5012 (e.g., the object image information 12002), while the template locations 6210 represent points on the template object 6290. Accordingly, aligning the object locations 6220 with the template locations 6210 may serve to refine the detection hypothesis 6300.

As discussed above, the template locations 6210 may correspond to the gradient extraction locations 5100B and the surface normal locations 5101B or to a subset thereof. In further embodiments, the template locations 6210 may include additional or different locations to be used for alignment with the object locations 6220 of the object image information 12002.

The template locations 6210 (and object locations 6220 that correspond) may be selected according to locations having a high impact on hypothesis refinement (e.g., alignment between the object image information 12002 and the template object 6290). In some instances, the template locations 6210 and the object locations 6220 may be selected as locations around the edges of the respective template object 6290 and object image information 12002. Such locations may be more valuable for performing the hypothesis refinement, because they may be less susceptible to noise, and may provide an outline of the shape of the object.

In an operation 11009, the hypothesis refinement method 11000 may further include adjusting the set of template locations 6210 to converge to the set of object locations 6220. The at least one processing circuit 1110 may further be configured to adjust the set of template locations 6210. If a discrepancy is identified, the at least one processing circuit 1110, may make adjustments to improve alignment values between the template locations 6210 of the template object 6290 to corresponding object locations 6220 of the object image information 12002.

The alignment procedure may be performed using an iterative closest point (ICP) technique, as shown in FIGS. 12B and 12C. An ICP technique may include adjusting the template locations 6210 to converge to the set of object locations 6220. A set of vectors 6215 between the template locations 6210 and their corresponding object locations 6220 may be determined. Each vector 6215 may represent a direction and a magnitude. In an embodiment, the direction and magnitude of the vectors may be used for adjusting the template locations 6210 to converge to the object locations 6220. A vector 6215 extending from a template location 6210 to an object location 6220 has a direction and a magnitude. If the collection of vectors 6215 are mathematically understood as forces having the direction and magnitude of the vectors and operating on the template object 6290 at the template locations 6210, the template object 6290 may be adjusted or moved according to the direction and magnitude of the vectors 6215 applied or acting at their respective template locations 6210. Thus, vectors 6215 having a greater magnitude, representing template location 6210 and object location 6220 that are further apart (e.g., having a greater delta or offset), may be understood to apply a greater "force" in the template adjustment. For example, with reference to FIG. 12B, a template object 6290 may overlay the object image information 12002. The vectors 6215 extend between the template locations 6210 and the object locations 6220. If the vectors 6215 are collectively applied as "forces" to the template object 6290 based on their direction and magnitude, the template object 6290 (as shown in FIG. 12B) will tend to rotate clockwise, bringing it into closer alignment with the object image information 12002. After applying the vectors 6215, a new set of vectors 6215 may be generated and applied, in an iterative fashion. In another example, as shown in FIG. 12C, applying the vectors 6215 may cause a translational movement of the template object 6290 to bring it into alignment with the object image information 12002. In some embodiments, through iterative generation and application of the vectors 6215, the template object 6290 will move into better alignment with the object image information 12002 until the remaining vectors 6215 cancel each other out and no further movement can be generated. When no further movement can be generated, alignment quality may be assessed. In some embodiments, iterative adjustment may be performed until an alignment quality surpasses a threshold.

Quality of alignment (or level of misalignment) may be assessed or determined in multiple different ways. For example, quality of alignment may be assessed or determined according to a level of misalignment defined by the directions and magnitudes of the vectors 6215. Quality of alignment may also be assessed or determined according to distance measurements between the new, updated, or adjusted set of template locations 6210 and the set of object locations 6220. Quality of alignment may also be assessed or determined according to a rate of convergence. In embodiments, any combination of these quality of alignment measurements may be used.

The quality of alignment may be determined based on a level of misalignment defined by the directions and magnitudes of the new or updated respective vectors 6215. As discussed above, the vectors 6215 may be mathematically interpreted as forces acting on the template object 6290 according to their directions and magnitudes. When stationary and subject to force, an object will experience stress. In embodiments, a level of misalignment may be computed according to mathematically treating the vectors 6215 as forces that generate internal stress in the template object 6290. Thus, for example, equal and opposite vectors 6215 would not cancel one another (as they would if the vectors 6215 were simply added together) but would generate a "stress" in the template object 6290. Where a level of alignment quality is good (and a level of misalignment is low), the vectors 6215 will be relatively small in magnitude, thereby corresponding to a low internal stress. Where alignment quality is poor (and a level of misalignment is high), the vectors 6215 will be large, thereby corresponding to a more significant internal stress. Computations of this internal stress may be considered to be indicative of alignment quality.

In an embodiment, the quality of alignment may be determined based on distance measurements between the new or updated set of template locations 6210 and the set of object locations 6220. The distance measurements may be Euclidean distance measurements, or the length of a line segment between two points in Euclidean space. Euclidean distance (or Pythagorean distance) may be represented via the following formula:

$$d(p,q) = \sqrt{\Sigma_{i=1}^{3}(q_i - p_i)^2}; \text{ wherein:}$$

d=distance;
p=first point, having 3D coordinates $p_1$, $p_2$, $p_3$.
q=second point, having 3D coordinates $q_1$, $q_2$, $q_3$.

The distance measurements generated via the above equation will output a distance value (typically greater than, or equal to zero), where output values closer to zero represent closer distances between points p, q (zero representing no distance, or identical/overlapping points). The distance measurements between each of the new or updated set of template locations 6210 and the set of object locations 6220 may be combined, for example, by taking an arithmetic mean or a geometric mean. The combined distance value may then be compared against a pre-determined threshold value, wherein distance values equal or below the pre-determined threshold value (i.e. between zero and the pre-determined threshold value) are indicative of a good match (i.e. between the template object 6290 and the object image information 12002) and distance output values greater than the pre-determined threshold value are indicative of a poor match.

In an embodiment, the distance measurements may be cosine distances between surface normal vectors associated with the new set of template locations 6210 (i.e. template vectors 6260) and the set of object locations 6220 (i.e. object vectors 6270). The template vectors 6260 may include some or all of the previously determined surface normal vectors 9101 associated with the corresponding object recognition template 4300B. The object vectors 6270 may include the surface normal vectors 8101 associated with the object image information 12002. The measured cosine distance may indicate an angle between the surface normal vectors (e.g. template vectors 6260 and object vectors 6270), wherein the degree of the angle indicated directly correlates with a degree or quality of alignment between the surface normal vectors (e.g. template vectors 6260 and object vectors 6270). Cosine distance may be represented by the following formula:

Cosine Distance=1−Cosine Similarity;

where Cosine Similarity is represented via the following formula:

$$\frac{\sum_{i=1}^{n} x_i y_i}{\sqrt{\sum_{i=1}^{n} x_i^2} \sqrt{\sum_{i=1}^{n} y_i^2}};$$

where $x_i$ and $y_i$ are components of the vectors X and Y.
Or in the alternative:

$$\frac{x * y}{\|x\| \|y\|}.$$

The distance measurements generated by the above equation output a value indicative of a distance between two surface normal vectors (i.e. as a Cosine distance). This output value may further indicate an angle between the template vectors 6260 and object vectors 6270, or more specifically between a planar portion of the template object 6290, and a planar portion of the object image information 12002. The planar portion refers to the surface from which the surface normal vector extends and is parallel to. An output that provides a small angle may be indicative of a good match (i.e. good convergence or alignment) between the planar portion of the template object 6290 and the planar portion of the object portion 12002. The cosine distances between each corresponding pair of the template vectors 6260 and object vectors 6270 may be combined to produce a distance measurement, for example by taking an arithmetic or geometric mean.

In another embodiment, the distance measurements may be planar distance measurements, measured from one of the template locations 6210 to a plane containing a corresponding point from the object locations 6220, or vice versa. The planar distances between each corresponding pair of the template vectors 6260 and object vectors 6270 may be combined to produce a distance measurement, for example by taking an arithmetic or geometric mean.

Quality of alignment between the template object 6290 and the object image information 12002 may further be determined according to a profile indicative of decreasing distances over successive iterations of ICP techniques. As discussed above, ICP techniques may be used to align the template object 6290 and the object image information 12002 by causing the template locations 6210 to converge with the object locations 6210. During successive iterations, distance measurements (e.g., cosine distance, Euclidean distance, planar distances etc.) between the template object 6290 and the object image information 12002 may be taken. A profile may indicate the change in such distance over the successive iterations.

For example, a profile which indicates a consistent decrease in the distances over successive iterations of ICP may indicate a high quality of alignment in terms of convergence between the template object 6290 and the object image information 12002. Conversely, if the profile shows that there are successive iterations of ICP where the distances increase, or otherwise indicate that the distances are not decreasing very quickly over successive iterations, then the profile may indicate that the template object 6290 and the object image information 12002 are not exhibiting a high quality convergence and that a final alignment between the template object 6290 and the object image information 12002 may be of low quality.

In an operation 11011, the hypothesis refinement method 11000 may include generating an adjusted detection hypothesis. The adjusted detection hypothesis 6300' may be generated according to the adjustments made to the template locations 6210, as discussed above. The adjustments may represent adjusted versions of the various pieces of information stored in the detection hypothesis 6300. For example, the adjusted detection hypothesis 6300' may include information associating the object image information 12002 with the adjusted corresponding object recognition template 4300B' and may include adjusted pose information 6301'. The adjusted corresponding object recognition template 4300B' may include one or more of an adjusted 2D appearance 4302B', an adjusted 3D appearance 4303B', adjusted 2D measurement information 4304B', and adjusted 3D measurement information 4305B'. The adjusted 2D measurement information 4304B' may include adjusted gradient information 9100B' and adjusted gradient extraction locations 5100B' while the adjusted 3D measurement information 4305B' may include adjusted surface normal vectors 9101B' and adjusted surface normal locations 5101B'. The adjusted object recognition template 4300B' may further include adjusted template locations 6210', which may include adjusted gradient extraction locations 5100B' and adjusted surface normal locations 5101B' or a subset thereof. It is not required that all of the "adjusted" versions of the information contained in the adjusted detection hypothesis 6300' be different than the corresponding information in the detection hypothesis 6300. For example, in embodiments, locations may be adjusted while information (gradients and surface normal) associated with the locations may remain the same. In embodiments, the adjusted information may be captured by storing information about the adjustments in conjunction with storing the original detection hypothesis 6300.

The present disclosure further relates to detection hypothesis validation. FIG. 13 depicts a flow diagram for an example detection hypothesis validation method 13000 for validating a detection hypothesis. The following description of detection hypotheses validation makes reference to FIG. 14. The detection hypothesis validation method 13000 may operate on one or more previously obtained detection hypotheses to validate a specific detection hypothesis as corresponding to a specifically detected physical object in a scene. As discussed above, through the template matching and detection hypothesis generation and refinement, multiple detection hypotheses may be proposed as pertaining to or describing a specific physical object within a scene. The detection hypothesis validation method 13000 may receive the object image information of the specific physical object as well as a set of detection hypotheses that pertain thereto and validate the multiple detection hypotheses to determine the optimal or best fit detection hypothesis. The set of detection hypotheses may be initial detection hypotheses (such as detection hypothesis 6300) and/or may be adjusted detection hypotheses (such as adjusted detection hypothesis 6300') or may be a combination thereof. The at least one processing circuit 1110 may perform the specific steps of the detection hypothesis validation method 13000 for validating the detection hypothesis 8300, as described below.

In an embodiment, the detection hypothesis validation method 13000 may be performed by, e.g., the computing system 1100 (or 1100A/1100B/1100C) of FIGS. 2A-2D or the computing system 1100 of FIGS. 3A-3B, or more specifically by the at least one processing circuit 1110 of the computing system 1100. In some scenarios, the computing system 1100 may perform the detection hypothesis validation method 13000 by executing instructions stored on a non-transitory computer-readable medium (e.g., 1120). For instance, the instructions may cause the computing system 1100 to execute one or more of the modules illustrated in FIG. 2D, which may perform the detection hypothesis validation method 13000. For example, in embodiments, steps of the method 13000 may be performed by the hypothesis generation module 1128, the hypothesis refinement module 1136, and the hypothesis validation module 1138 operating in conjunction.

The detection hypothesis validation method 13000 may be used to validate one or more detection hypotheses 8300 of a detection hypothesis set 8309 generated to identify one or more objects 5012 physically located within a scene 5013. The detection hypothesis validation method 13000 may operate on image information 12001 obtained of a scene 5013. The image information 12001 may be similar to the 2D image information 2600 and the 3D image information 2700. Within the image information 12001 may be one or more object image information 12002 representative of the objects 5012 within the scene 5013.

In the following discussion, the detection hypothesis validation method 13000 is discussed according to the use of detection hypothesis set 8309 pertaining to a single object 5012 to be identified. As discussed below, the detection hypothesis validation method 13000 operates to identify a best detection hypothesis 8300 corresponding to the single object 5012. In other embodiments, the detection hypothesis set 8309 may include detection hypotheses 8300 pertaining to more than a single object 5012 in the scene 5013. Each individual object 5012 may have a corresponding group of detection hypotheses 8300 from the detection hypothesis set 8309 which may be validated according to the methods described with respect to the corresponding individual object 5012. In this way, the detection hypothesis validation method 13000 may be employed to validate and identify a best detection hypothesis 8300 for a single object 5012 or to identify multiple best detection hypotheses 8300, each corresponding to a different individual object 5012. By validating multiple detection hypotheses 8300, complex picking operations that involve the picking of multiple objects 5012 in succession may be planned and executed.

In the detection hypothesis validation method 13000, the at least one processing circuit 1110 may be in communication with a robot 3300, having a robotic arm 3320 and an end effector apparatus 3330 connected thereto, and a camera 1200 having a field of view and configured, when one or more objects 5012 are or have been in the field of view, to execute instructions stored on a non-transitory computer-readable medium. In embodiments, the at least one processing circuit 1110 may not be in direct communication from with the robot 3300, but may receive and transmit information to robot 3300 via networks and/or via storage devices. In embodiments, the at least one processing circuit 1110 may be in direct communication from with the robot 3300. The at least one processing circuit 1110 may obtain image information 12001 of one or more objects 5012 in the scene 5013. The at least one processing circuit 1110 may also obtain one or more detection hypotheses 8300 and/or a detection hypothesis set 8309.

Each detection hypothesis 8300 may include information associating an object image information 12002 with an object recognition template 4300 (e.g., a corresponding object recognition template 4300C selected from multiple object recognition templates 4300) and may include pose information 6301 of an object 5012 represented by the object image information 12002. The pose information 6301 of the object 5012 may refer to the location and orientation of the object 5012. In embodiments, the detection hypothesis 8300 may include or may include a reference to a corresponding object recognition template 4300C.

In an operation 13001, the detection hypothesis validation method 13000 includes obtaining image information of one or more objects in a scene. The operation 13001 may be similar to the operation 11001, discussed above. Obtaining the image information 12001 may include capturing an image of the scene 5013. In such instances, the image information 12001 may represent objects 5012 located in boxes, bins, cases, crates, pallets, or other containers. The image information 12001 may be obtained by a camera 1200, as discussed herein. The at least one processing circuit 1110 may be configured to generate, receive, and/or process the image information 12001, such as by using the image information 12001 to distinguish between individual objects in the camera 1200 field of view, to perform object recognition or object registration based on the image information 12001. In an embodiment, the image information 12001 may include two-dimensional image information (e.g., akin to 2D image information 2600) that describes a visual appearance of the environment or scene 5013 in the field of view of the camera 1200. In an embodiment, the image information 12001 may include three-dimensional image information (e.g., akin to 3D image information 2700) that provides a point cloud, spatial structure information, depth map, or other three-dimensional image of the scene 5013 in the field of view of the camera 1200. The three-dimensional image information in this example may be used to estimate how the objects 5012 are spatially arranged in three-dimensional space (e.g. the scene 5013). Obtaining the image information 12001 may include generating or obtaining the image information 12001 that represents the scene 5013 and may include generating or obtaining one or more object image information 12002 that represent individual objects 5012 or multiple objects 5012 in the scene 5013, as necessary. The object image information 12002 may include 2D image information 12600 representative of the object 5012. The 2D image information 12600 may be similar to image information 2600 and/or may include rendered 2D image information generated according to rendering techniques such as ray tracing and discontinuity detection. The object image information 12002 may include 3D image information 12700 representative of the object 5012 similar to image information 2700. The image information 12001 may be generated by the camera 1200 when the object(s) 5012 is (or has been) in the field of view of the camera 1200, and may include, e.g., two-dimensional image information and/or three-dimensional image information.

The object image information 12002 may include image information related to specific physical objects 5012 within the scene 5013. The object image information 12002 may include 2D image information 12600 representative of the object 5012 similar to image information 2600. The object image information 12002 may include 3D image information 12700 representative of the object 5012 similar to image information 2700. The object image information 12002 may include object locations 6220, which may further include gradient extraction locations 8100 and surface normal locations 8101, representing locations at which respective gradient information 8102 and surface normal vectors 8103 are obtained, e.g., via a feature generation method 8000 The gradient extraction locations 8100, surface normal locations 8101, gradient information 8102, and surface normal vectors 8103 may be similar to the gradient extraction locations 5100, surface normal locations 5101, gradient information 9100, and surface normal vectors 9101, described above, excepting that the gradient extraction locations 8100, surface normal locations 8101, gradient information 8102, and surface normal vectors 8103 are obtained from image information obtained of a physical object.

The image information 12001 may be the same image information 12001 obtained during performance of a hypothesis refinement method 11000. Thus, the computing system 1100 may obtain the image information 12001 for performance of the hypothesis refinement method 11000, store the image information 12001, and access the image information 12001 for performance of the detection hypothesis validation method 13000. In embodiments, the image information 12001 may be newly obtained specifically for performance of the detection hypothesis validation method 13000.

As discussed above, the image information 12001 may include a two-dimensional grayscale and/or color image and may describe an appearance of the scene 5013 (and/or the object(s) 5012 within the scene) from the viewpoint of the camera 1200. In an embodiment, the image information 12001 may correspond to a single-color channel (e.g., red, green, or blue color channel) of a color image. If the camera 1200 is disposed above the objects 5012, then the two-dimensional image information may represent an appearance of respective top surfaces of the objects 5012. Further, the image information 12001 may include three-dimensional image information, which may include, e.g., a depth map or a point cloud that indicates respective depth values of various object locations 6220 on one or more surfaces (e.g., top surface or other outer surface) or along one or more edges of the objects 5012. The two-dimensional image information and the three-dimensional image information of the object image information 12002 may be referred to as 2D image information 12600 and 3D image information 12700 respectively. In some implementations, the object locations 6220 representing physical edges of an object 5012 may be used to identify an object image information 12002 that is limited to representing an individual object 5012.

In an operation 13003, the detection hypothesis validation method 13000 may further include obtaining one or more detection hypotheses 8300 and/or a detection hypothesis set 8309. For ease of explanation, the described attributes and qualities of a specific detection hypothesis 8300 may be understood to apply to each of the detection hypotheses 8300 of the detection hypothesis set 8309, unless otherwise noted. The detection hypothesis 8300 may be obtained as an adjusted detection hypothesis 6300' subsequent to performance of a hypothesis refinement method 11000. The detection hypothesis 8300 may be obtained as an initial detection hypothesis 8300 from a template matching operation, as described above.

The detection hypothesis 8300 may include a corresponding object recognition template 4300C and object pose information 8301 indicating the location and orientation of the corresponding object recognition template 4300C necessary to overlay a corresponding object image information 12002 within the image information 12001. The corresponding object recognition template 4300C may include one or more of a 2D appearance 4302C, a 3D appearance 4303C, 2D measurement information 4304C, and 3D measurement information 4305C. As discussed above, the 2D measurement information 4304C may include gradient information 9100C and gradient extraction locations 5100C while the 3D measurement information 4305C may include surface normal vectors 9101C and surface normal locations 5101C. The corresponding object recognition template 4300C may further include template locations 8210, which may include the gradient extraction locations 5100B and surface normal locations 5101B or a subset thereof. The information of the detection hypothesis 8300 may define a digital representation of an object, which is referred to herein as the template object 8290. The template object 8290 represents the information of the detection hypothesis 6300 in three-dimensional space in the coordinate system of the image information 12001 for comparison to the object image information 12002.

The detection hypothesis set 8309, in particular the size of the set, may be selected or determined so as to balance speed and thoroughness. Selection a larger number of detection hypotheses 8300 may result in a higher opportunity to achieve a good match but may also take longer to process. As discussed above with respect to the hypothesis refinement method 11000, quality of alignment may be measured or determined during the steps related to refinement. Surpassing a quality threshold may be a marker that causes the hypothesis refinement method 11000 to be determined as complete. Similarly, surpassing the quality threshold may be considered as a marker that permits inclusion of an adjusted detection hypothesis 6300' within the detection hypothesis set 8309. Failure to surpass a quality threshold may result in exclusion of an adjusted detection hypothesis 6300'. Accordingly, the size of the detection hypothesis set 8309 may be driven by how stringent the quality threshold is. In some embodiments, the size of the detection hypothesis set 8309 may be limited and only the highest quality alignment adjusted detection hypotheses 6300' are included. In embodiments, both a quality threshold and a ranked order may be used. In embodiments, it may be beneficial to use template matching and hypothesis refinement techniques that generate a large hypothesis detection set 8309 (e.g., in excess of 500, 1000, or 10,000 total detection hypotheses) with the understanding that many false positives will be generated. Such embodiments may rely on the detection hypothesis validation method 13000 to filter the false positives as discussed below.

In an operation 13005, the detection hypothesis validation method 13000 includes validating each detection hypothesis of the set of detection hypotheses. Multiple detection hypotheses 8300 are obtained and compared to an object image information 12002 of the image information 12001 to identify which detection hypothesis 8300 is the best estimate or best fit to describe the physical object 5012 represented by the object image information 12002. Selecting the best detection hypothesis from the detection hypothesis set 8309 involves validating each of the detection hypotheses according to the operations 13007-13011, described below. Hypothesis validation may include generating three-dimensional and two-dimensional validation scores and filtering the detection hypothesis set 8309 according to these.

In an operation 13007, the operation 13005 includes generating a plurality of three-dimensional validation scores. Each three-dimensional validation score may be based on comparing three-dimensional information of a detection hypothesis 8300 and corresponding three-dimensional information of the image information corresponding to an object from the scene (e.g., the object image information 12002). The plurality of three-dimensional validation scores may at least one of an occlusion validator score, a point cloud validator score, a hole matching validator score, and a normal vector validator score. The three-dimensional information of the detection hypothesis 8300 may include the 3D appearance 4303C and the 3D measurement information 4305C including surface normal vectors 9101C and surface normal locations 5101C. The three-dimensional information of the object image information 12002 may include the 3D image information 12700, the surface normal locations 8101, and the surface normal vectors 8103.

Validator scores, as discussed herein, may be scores or numbers representative of how well a particular detection hypothesis corresponds or aligns with the object image information 12002. The validator scores may be penalty scores applied to a hypothesis confidence score wherein lower values represent a better fit, as discussed herein. Alternatively, the validator scores may be bonus scores wherein higher values represent a better fit. For ease of explanation, the validator scores discussed herein may be penalty scores, but it is understood that all of the same concepts and techniques may be applied using bonus scores.

The occlusion validator score and the point cloud validator score may each be obtained by comparing object locations 6220 of the object image information 12002 to the surface of the template object 8290 represented by the detection hypothesis 8300 and identifying inconsistencies between the object locations 6220 and the surface of the template object 8290 to obtain the occlusion validator score and the point cloud validator score. The three-dimensional information of the detection hypothesis may indicate the location of a surface of the template object 8290. If the three-dimensional information in the detection hypothesis 8300 does in fact represent an object 5012 in the scene 5013, then the object locations 6220 associated with the 3D image information 12700 should fall on the surface or close to the surface. If they do not fall close to the surface, then the match determined by the template matching operation may be a false positive. Comparing the object locations 6220 to the surface of the template object 8290 may identify valid points and two types of inconsistencies: occlusions and invalid points. Inconsistencies that place object locations 6220 above or otherwise outside the surface of the template object 8290 may be referred to as occlusions and be used for calculating the occlusion validator score. Inconsistencies that place object locations 6220 below the surface of the template object 8290 may be referred to as invalid points and be used for calculating the point cloud validator score. Object locations 6220 that fall on or near (within a threshold distance, also referred to as a skin depth parameter) from the surface of the template object 8290 may be referred to as valid points. Some amount of deviation between the object locations 6220 and the surface of the template object 8290 is to be expected. Such deviation may be accounted for by a skin depth parameter, the size of which determines the amount of tolerated deviation.

The occlusion validator score is obtained by identifying the inconsistencies that place object locations 6220 above or outside the surface of the template object 8290. These inconsistencies are referred to as occlusions. The occlusion validator score results in a weighted penalty against the hypothesis confidence score, where the weight is dependent on the distance of the object location 6220 from the surface of the template object 6290. The occlusion validator score may be calculated as a function of distance from the surface of the template object 6290. The function may be, for example, a log-normal function, wherein a peak of the curve of the log-normal function is representative of a distance from the surface that coincide with 3D points near the surface of the template object 8290 but are unlikely to be a part of the template object 8290. In embodiments, the function with the peak may be selected at a distance just beyond a point at which a sensor or camera that captures the image information 12001 loses accuracy. For example, an object location 6220 with a very large distance beyond the surface of the template object 6290 may have a lower penalty applied against it due to the likelihood that such an object location 6220 results from occlusion from another object 5012 that is between a matching portion of the scene 5013 and the camera 1200 or noise in the image information 12001, rather than an actual point on the object 5012 represented by the object image information 12002. Thus, the penalty of the occlusion validator score for a particular object location 6220 may initially increase with distance, lowering the confidence in the detection hypothesis. After the distance increases past a peak, it becomes increasingly likely that the particular object location 6220 was not generated by the object 5012 represented by the object image information 12002, and the penalty decreases.

In embodiments, an occlusion confidence score may be determined for the occlusion validator score. The occlusion confidence score represents a confidence level that the occlusion validator score provides good information on which decisions may be made. The object locations 6220 may represent points or locations for which there is confidence that they belong to the object. The object image information 12002, however, may contain additional points that are not confidently identified as belonging to the object 5012. The occlusion confidence score may be based on a ratio of the object locations 6220 to the total number of visible points in the object image information 12002. Thus, where the object locations 6220 for which there is confidence that they belong to the object are a lower percentage of the total visible points, the confidence that an occlusion validator score based on the object locations 6220 provides accurate information is lowered and the associated occlusion confidence score is likewise lowered. In some embodiments, a final occlusion validator score may be represented by an initial occlusions validator score that is modified according to the occlusion confidence score.

The point cloud validator score is obtained by identifying the inconsistencies that place object locations 6220 inside or below the surface of the template object 8290. These inconsistencies are referred to as invalid points. The point cloud validator score results in a penalty against the hypothesis confidence score. Object locations 6220 identified as invalid points, e.g., beneath the surface of the template object 8290, may be a strong indicator that the detection hypothesis 8300 is incorrect and may result in a correspondingly high penalty score. In embodiments, the point cloud validator score may be based on a number of invalid points or on a ratio of invalid points to an invalid point cutoff value.

A point cloud validator score may have a point cloud confidence score determined in the same fashion as discussed above with respect to the occlusion confidence score, e.g., according to a ratio of the object locations 6220 to the total number of visible points in the object image information 12002. In embodiments, a final point cloud validator score may be represented by a point cloud validator score that is modified according to the point cloud confidence score.

In embodiments, the point cloud validator score and the occlusion validator score may be combined into a single surface validator score. The surface validator score may be determined as a combination of the point cloud validator score and the occlusion validator score, e.g., by adding, averaging, or performing another mathematical operation to combine the two.

The normal vector validator score may be obtained by determining whether valid points, identified according to object locations 6220 on or near the surface of the template object 6290, have surface normal vectors 8103 which match the orientations of the surface of the template object 6290. Such a determination may be made by comparing the surface normal vectors 8103 associated with object locations 6220 with the corresponding surface normal vectors 9101C associated with the corresponding surface normal locations 5101C of the corresponding object recognition template 4300C. Where the surface normal vectors 8103 do not align or match orientation with the corresponding surface normal vectors 9101C, the normal vector validator score may be applied as a penalty to the detection hypothesis confidence score. In embodiments, the amount of mismatch or misalignment may influence the size of the penalty applied.

In embodiments, some tolerance for situations may be provided for situations where, even when a detection hypothesis is accurate, the surface normal vectors 8103 are not expected to align or match orientation with the corresponding surface normal vectors 9101C. For example, an object such as a gear with many teeth may have portions which exhibit edges and sudden changes in surface normal vectors. Such an object structure may cause a large deviation in the surface normal vectors 8103 and the corresponding surface normal vectors 9101C even when there is only a slight misalignment between the object image information 12002 and the template object 8290 being overlayed on the scene. To account for such a scenario, the at least one processing circuit 1110 may examine whether the corresponding object recognition template 4300C or the image information 12001 has a region with a high variation in surface normal vectors 9101C/8103. If the result is positive, the at least one processing circuit 1110 may apply a higher amount of tolerance, by lowering the normal vector validation scores for differences in the high variance regions between corresponding surface normal vectors 9101C in the corresponding object recognition template 4300C and the surface normal vectors 8103 in the object image information 12002.

In embodiments, the surface normal validator score may have a surface normal confidence level associated therewith. The surface normal confidence level may represent a confidence level in the information provided by the surface normal validator score. In an embodiment, the surface normal confidence level may be determined according to a quality of the extracted edges. In an embodiment, a surface normal validator score may be adjusted according to the surface normal confidence level.

The hole matching validator score is obtained by comparing object locations 6220 obtained from the object image information 12002 to a structure of the template object 8290 as represented by the corresponding object recognition template 4300C and identifying inconsistencies between the object locations 6220 and the structure to identify invalid holes or empty coordinates (referred to as hole invalidity) according to object locations 6220 that correspond to empty volumes in the structure of the template object or positions where the structure is absent. Because the object locations 6220 of the object image information 12002 represent locations on a surface of a physical structure of the object 5012, the object 5012 in the scene should have no structure in a space which the corresponding object recognition template 4300C indicates to be empty. The presence of object locations 6220 in portions that the corresponding object recognition template 4300C indicates to be empty may be due to noise, but may also be indicative of an incorrect detection hypothesis. Thus, the hole matching validator score may be determined as a penalty score to the detection hypothesis confidence level for every hole invalidity that is identified.

In embodiments, the hole matching validator score may have a hole matching confidence level associated therewith. The hole matching confidence level may represent a confidence level in the information provided by the hole matching validator score. In an embodiment, the hole matching confidence level may be determined according to a quality of the extracted edges. In an embodiment, a hole matching validator score may be adjusted according to the hole matching confidence level.

In embodiments, tolerance may be provided to account for noise or other situations that may generate hole invalidity even with a correct detection hypothesis. For example, if the object image information 12002 includes an object location 6220 corresponding to an empty space of the template object 8290, (e.g. a hole or opening in the object), then that object location 6220 may correspond to a portion of another object that is coincidentally located in the open space. Such a scenario may be consistent with an accurate detection hypothesis 8300 for an object 5012 in the scene 5013, as the object location 6220 in the supposedly empty space does not belong to the object 5012 being represented by the corresponding object recognition template 4300C, but instead belongs to another object. In an embodiment, the hole matching validator score may provide greater tolerance when the size of the hole, opening, or empty coordinate in the template object 8290 is relatively large, as it increases the chance of irregularities (e.g. objects intersecting with or protruding through the hole or opening) affecting the measurement of that space, and the chance of another object extending into that space.

In embodiments, the point cloud validator score, the occlusion validator score, the hole matching validator score, and the surface normal validator score may be combined into a single 3D validator score. The 3D validator score may be determined as a combination of any of the point cloud validator score, the occlusion validator score (or the combined surface validator score), the hole matching validator score, and the surface normal validator score, e.g., by adding, averaging, or performing another mathematical operation to combine the two.

In an operation 13009, the operation 13005 includes generating a plurality of two-dimensional validation scores, which may include at least one of a rendered match validator score and a template match validator score.

The rendered match validator score is obtained by comparing rendered 2D image information 12600 of the image information 12001 to the corresponding 2D appearance 4302C. The rendered match validator score may further operate to extract edge information from both the rendered 2D image information 12600 and the corresponding 2D appearance 4302C. The rendered match validator score may be based on a determination of whether the edges extracted from the 2D image information 12600 align with the edges extracted from the corresponding 2D appearance 4302C. The rendered match validator score may be based on an amount of overlap between the areas defined by the extracted edges, by average distances between the extracted edges, or any other suitable metric. The rendered match validator score may be used as a penalty score applied to a detection hypothesis confidence score. In some instances, using the rendering (e.g., ray tracing) to generate and extract the edge information may compensate for noise and other conditions that may cause artifacts, such as glare of light reflecting off metal objects, or shadows. In some instances, the operation 13009 may also operate to re-render information from the corresponding object recognition template 4300C to extract edges from the corresponding object recognition template 4300C.

In embodiments, the rendered match validator score may have a rendered match confidence level associated therewith. The rendered match confidence level may represent a confidence level in the information provided by the rendered match validator score. In an embodiment, the rendered match confidence level may be determined according to a quality of the extracted edges. In an embodiment, a rendered match validator score may be adjusted according to the rendered match confidence level.

The template match validator score is obtained by comparing edges extracted from the object image information 12002 and an object image derived from the corresponding object recognition template 4300C (e.g., such as the template object 8290 or the 2D appearance 4302C). An edge detecting algorithm, for example a Canny edge detector, may be employed to identify object edges directly from the object image information 12002 and template edges from image information stored in the corresponding object recognition template 4300C. The template match validator score may be determined according to there is an offset between the object edges and the template edges, by sliding the template edges relative to the object edges to determine how much sliding (if any) will yield a peak response or overlap. The template match validator score may be based on the amount of sliding, movement, offset, or adjustment that is required to achieve the peak response or overlap. The greater the amount of movement or sliding that is required, the higher the template match validator score and the greater the applied penalty. In other words, more required movement indicates a poorer match.

In embodiments, the template match validator score may have a template match confidence level associated therewith. The template match confidence level may represent a confidence level in the information provided by the template match validator score. In an embodiment, the template match confidence level may be determined according to a quality of the extracted edges. In an embodiment, a template match validator score may be adjusted according to the template match confidence level.

The three-dimensional validator scores and the two-dimensional validator scores may be combined to determine an overall validation score which may be used in a further operation to determine an overall confidence level in a detection hypothesis. The total validation score may be based on a combination of each of the three-dimensional and two-dimensional validator scores and the confidence values associated with each validator score. For example, validator scores with higher confidence values and/or a higher score weight, may have a larger influence on the total validation score, while validator scores with lower confidence values and/or a lower score weight may have a smaller influence on the total validation score.

In an embodiment, the operation 13005 may further include an additional validation step of determining whether a corresponding object recognition template 4300C has global consistency with other structures or objects in the image information 12001 corresponding to the scene 5013. For example, such other structures and objects may include a container in which workpieces or other objects are located. For example, the operation 13005 may further determine whether the template object 8290 fits completely within such a container (e.g., based on the location of the template object 8290 determined by the pose information 6301), or whether the template object 8290 extends or protrudes outside a surface of the container. If the template object 8290 or a portion thereof is outside the container, such a situation may be an indication of an incorrect detection hypothesis. In such a situation, the total validation score may be adjusted accordingly with a penalty weighted according to how far outside the container the template object 8290 is. In embodiments, where a template object 8290 or a portion thereof is outside of the container in excess of a threshold amount, the total validation score may be adjusted so as to indicate an incorrect detection hypothesis. Some tolerance may be provided to account for situations in which an accurate detection hypothesis may still be consistent with a template object 8290 extending outside of a container, or extending beyond a plane which defines an inner surface of the container. Such situations may occur when, e.g., the container is a mesh container, or when the object is a metal object which is hard enough to indent or otherwise deform the inner surface of the container.

In an operation 13011, the operation 13005 further includes filtering detection hypotheses from the set of detection hypotheses according to the plurality of three-dimensional validation scores and the plurality of two-dimensional validation scores.

In embodiments, the multiple validator scores may be combined to produce a total validator score that may be used to determine a detection hypothesis confidence level. The total validator score and the detection hypothesis confidence level may be indicative of how well a corresponding object recognition template 4300C matches the object image information 12002 obtained of a scene 5013. The hypothesis detection confidence level may be used to determine whether to filter out the detection hypothesis, or whether to use the detection hypothesis for planning robot motion to pick up the object 5012 in the scene 5013. In embodiments.

In embodiments, filtering the detection hypotheses may be performed according to a sequential filtering technique, where each of the validator scores is compared to a corresponding threshold to determine whether to retain or filter a given detection hypothesis 8300 from the detection hypothesis set 8309. Each successive validator score may be compared to a threshold and, if the validator score exceeds the threshold, the detection hypothesis 8300 may be filtered out. In an example, the filtering of the detection hypothesis 8300 from the detection hypothesis set 8309 may include comparing the occlusion validator score, the point cloud validator score, the hole matching validator score, the normal vector validator score, the rendered match validator score, and the template match validator score to corresponding thresholds and removing any detection hypothesis 8300 with a validator score that exceeds the corresponding threshold. The comparing described above may be performed in a sequential fashion. The above ordering is by way of example only, and any ordering may be used. When sequential filtering is employed, efficiency of the process may be increased by not computing additional validator scores for detection hypotheses that have been filtered out.

In embodiments, comparing the validator scores to the corresponding thresholds may take into account confidence levels associated with the validator scores. For example, the relevant threshold may be adjusted according to a validator score confidence level and/or the validator score may be adjusted according to the confidence level. Thus, a low confidence validator score indicating a poor match may be filtered out as a detection hypothesis, while a high confidence validator score may have greater influence.

Thus, a detection hypothesis 8300 may be removed or filtered from the detection hypothesis set 8309 if one or more of the three-dimensional validation scores or the two-dimensional validation scores exceed the corresponding thresholds (taking into account confidence levels as necessary). A detection hypothesis 8300 may remain within the detection hypothesis set 8309 if all of the three-dimensional validation scores and the two-dimensional validation scores fail to exceed all of the corresponding thresholds (taking into account confidence levels as necessary).

The filtering process may continue until a single detection hypothesis 8300 remains for each specific object 5012 corresponding to object image information 12002. Such may occur by selecting the detection hypothesis with the highest detection hypothesis confidence level (and lowest total validation score) and/or by iterating the filtering process with increasingly lowered filter thresholds until only a single detection hypothesis 8300 succeeds for each object 5012. The single detection hypothesis 8300 may be an unfiltered detection hypothesis 8300. In embodiments, a minimum confidence level may be set for detection hypotheses 8300. In such embodiments, if the best fit detection hypothesis 8300 for an object 5012 fails to exceed a confidence threshold, the system may return no detection hypotheses 8300 for that object.

In an operation 13013, the hypothesis validation method 13000 includes detecting the one or more object in the scene according to unfiltered detection hypotheses remaining in the set of detection hypotheses after validating. After filtering, a best detection hypothesis 8300 corresponding to the object 5012 associated with the object image information 12002 is identified to detect the object 5012 within the scene. As discussed above, the hypothesis validation method 13000 may also be employed to identify multiple different objects 5012 according to multiple different associated detection hypotheses 8300.

In some embodiments, the hypothesis validation method 13000 may further include an overlap detection operation, whereby one or more detection hypotheses 8300 are compared to one another to determine whether or not their corresponding template objects 8290 have overlap. Such overlap may indicate that one or both of the detection hypotheses 8300 having overlap are incorrect. The detection hypotheses 8300 may be compared for overlap after a filtering operation 13011. Prior to the filtering operation 13011, multiple detection hypotheses 8300 may remain for each object 5012, and thus overlap is to be expected. After the filtering operation 13011, the remaining detection hypotheses 8300 represent best-fits for individual object 5012 and overlap is not to be expected. In response to detecting overlap, the system may be configured to discard one or both of the overlapping detection hypotheses 8300, for example, based on their confidence scores, or may be configured to perform additional analysis or processing with respect to the overlapping detection hypotheses 8300. Determination to discard, keep, or reanalyze overlapping detection hypotheses 8300 may further take into account a degree of overlap.

Subsequent to detecting one or more objects 5012 in a scene 5013, the at least one processing circuit 1110 may operate to perform a robot control operation 15000 for retrieval of the one or more objects 5012 and to output a command to cause movement of the robot 3300 to retrieve the one or more objects 5012. The robot control operation 15000 may include obstacle detection, motion planning, an motion execution.

Obstacle detection may include detecting and accounting for obstacles in a vicinity of an object 5012 to be retrieved. As discussed herein, the object 5012 may be in a container with other items and objects. Thus, the other items and objects as well as the container itself may represent obstacles to the robotic operation of the robot 3300. Such obstacles may be captured in the image information 12001 and/or the object image information 12002 which may be processed to determine the location of obstacles in the vicinity of the object.

Motion planning may include planning robotic motion, e.g., plotting trajectories, for a robot 3300 to carry out to retrieve the object 5012. Trajectories may be plotted so as to account for and avoid the identified obstacles. Motion execution may include sending commands related to the motion planning to a robot 3300 or robotic control system to cause the robot to execute the planned motion.

The methods discussed herein, e.g., methods 6000, 8000, 10000, 11000, and 13000 may be operated in concert to create object recognition templates and employ the object recognition templates to generate, refine, and validate detection hypotheses for objects in a scene. The methods 6000, 8000, 10000, 11000, and 13000 may thus be employed to facilitate a robotic process of detecting, identifying and retrieving multiple objects from within a container.

It will be apparent to one of ordinary skill in the relevant arts that other suitable modifications and adaptations to the methods and applications described herein can be made without departing from the scope of any of the embodiments. The embodiments described above are illustrative examples and it should not be construed that the present disclosure is limited to these particular embodiments. It should be understood that various embodiments disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the methods or processes). In addition, while certain features of embodiments hereof are described as being performed by a single component, module, or unit for purposes of clarity, it should be understood that the features and functions described herein may be performed by any combination of components, units, or modules. Thus, various changes and modifications may be affected by one skilled in the art without departing from the spirit or scope of the invention as defined in the appended claims.

Further embodiments include:

Embodiment 1 is a computing system configured to generate an object recognition template set for identifying an object in a scene comprising: at least one processing circuit configured for: obtaining registration data of the object, the registration data including an object model representative of the object; determining a plurality of viewpoints of the object model in a three-dimensional space; estimating a plurality of appearances of the object model at each of the plurality of viewpoints; generating a plurality of object recognition templates according to the plurality of appearances, each of the plurality of object recognition templates corresponding to a respective one of the plurality of appearances; and communicating the plurality of object recognition templates as the object recognition template set to a robotic control system, wherein each of the plurality of object recognition templates represent a pose the object may have relative to an optical axis of a camera generating image information of the object within the scene.

Embodiment 2 is the computing system of embodiment 1, wherein: the three-dimensional space is enclosed by a surface, each of the plurality of viewpoints corresponds to a camera location on the surface, and each of the object recognition templates corresponds to one viewpoint of the plurality of viewpoints and includes an appearance of the object from the one viewpoint.

Embodiment 3 is the computing system of embodiment 1, wherein each of the plurality of viewpoints further corresponds to a camera rotation angle.

Embodiment 4 is the computing system of embodiment 2, wherein the object model is fixed within the three-dimensional space.

Embodiment 5 is the computing system of embodiment 2, wherein the three-dimensional space is substantially spherical and the object model is fixed at the center of the three-dimensional space.

Embodiment 6 is the computing system of embodiment 2, wherein the plurality of viewpoints are selected according to an even distribution across the surface.

Embodiment 7 is the computing system of embodiment 3, wherein each camera location corresponds to a set of viewpoints, each viewpoint of the set of viewpoints corresponding to a different camera rotation angle.

Embodiment 8 is the computing system of embodiment 3, wherein a subset of the set of object recognition templates includes object recognition templates corresponding to viewpoints corresponding to different locations and to different camera rotation angles.

Embodiment 9 is the computing system of embodiment 2 further including: determining the plurality of viewpoints based on predicted ranges of poses observed for the plurality of object recognition templates.

Embodiment 10 is the computing system of embodiment 2 further including: determining the plurality of viewpoints based on symmetry of the object.

Embodiment 11 is the computing system of embodiment 10, further including determining symmetry of the object according to at least one of a determination that an object appearance of the object changes after rotation and an identification of an axis of the object.

Embodiment 12 is a method of generating an object recognition template set for identifying an object in a scene comprising: obtaining a registration data of the object, the registration data including an object model representative of the object; determining a plurality of viewpoints of the object model in a three-dimensional space; estimating a plurality of appearances of the object model at each of the plurality of viewpoints; generating a plurality of object recognition templates according to the plurality of appearances, each of the plurality of object recognition templates corresponding to a respective one of the plurality of appearances; and communicating the plurality of object recognition templates as the object recognition template set to a robotic control system, wherein each of the plurality of object recognition template represents a pose the object may have relative to an optical axis of a camera generating image information of the object within the scene.

Embodiment 13 is the method of embodiment 12, wherein the three-dimensional space is enclosed by a surface, and further including: corresponding the plurality of viewpoints to a camera location on the surface, and corresponding each of the object recognition templates to one viewpoint of the plurality of viewpoints.

Embodiment 14 is the method of embodiment 13, further including: corresponding each of the plurality of viewpoints to a camera rotation angle.

Embodiment 15 is the method of embodiment 13, further including: fixing the object model within the three-dimensional space.

Embodiment 16 is the method of embodiment 13, further including: selecting the plurality of viewpoints according to an even distribution across the surface.

Embodiment 17 is the method of embodiment 13, further including: determining the plurality of viewpoints based on predicted ranges of poses observed for the plurality of object recognition templates.

Embodiment 18 is the method of embodiment 13, further including: determining the plurality of viewpoints based on symmetry of the object.

Embodiment 19 is the method of embodiment 18, further including: determining symmetry of the object according to at least one of a determination that an object appearance of the object changes after rotation and an identification of an axis of the object.

Embodiment 20 is a non-transitory computer readable medium, configured with executable instructions for implementing a method for generating an object recognition template for identifying an object in a scene, operable by at least one processing circuit via a communication interface configured to communicate with a robotic system, the method comprising: receiving a registration data of the object, the registration data including an object model representative of the object; performing an operation to generate a plurality of viewpoints of the object model in a three-dimensional space; performing an operation to estimate a plurality of appearances of the object model at each of the plurality of viewpoints; performing an operation to generate a plurality of object recognition templates according to the plurality of appearances, each of the plurality of object recognition templates corresponding to a respective one of the plurality of appearances; and outputting the plurality of object recognition templates as the object recognition template set to the robotic system; wherein each of the plurality of object recognition templates represent a pose the object may have relative to an optical axis of a camera generating image information of the object within the scene.

Embodiment 21 is a computing system configured to generate an object recognition template for identifying an object in a scene comprising: at least one processing circuit configured for: obtaining object information including a digitally represented object; extracting two-dimensional measurement information from the object information; extracting three-dimensional measurement information from the object information; and generating an object recognition template according to the two-dimensional measurement information and the three-dimensional measurement information.

Embodiment 22 is the computing system of embodiment 21, wherein the digitally represented object is an object model and extracting the two-dimensional measurement information and the three-dimensional measurement is performed to generate feature maps of the object model at a selected viewpoint.

Embodiment 23 is the computing system of embodiment 21, wherein the at least one processing circuit is further configured for: obtaining image information of the scene; accessing the object recognition template; and comparing the two-dimensional measurement information and the three-dimensional measurement information to the image information to identify the object as corresponding to the digitally represented object.

Embodiment 24 is the computing system of embodiment 21, wherein extracting the two-dimensional measurement information includes extracting gradient information from the object information, the gradient information being indicative of a direction or orientation of a candidate edge of the digitally represented object, and wherein extracting three-dimensional measurement information includes extracting surface normal vector information from the object information, the surface normal vector information describing a plurality of vectors normal to a surface of the digitally represented object.

Embodiment 25 is the computing system of embodiment 21, wherein the object information includes registration data of the object and the digitally represented object includes an object model.

Embodiment 26 is the computing system of embodiment 21, wherein the object information includes at least one of two-dimensional image information and three-dimensional image information.

Embodiment 27 is the computing system of embodiment 24, wherein the gradient information is extracted at a plurality of gradient extraction locations of the digitally represented object, and extracting the gradient information includes analyzing pixel intensity of two-dimensional image information of the object information to measure a direction in which the pixel intensity of the two-dimensional image information at each gradient extraction location is changing.

Embodiment 28 is the computing system of embodiment 24, wherein the surface normal vector information is extracted at a plurality of surface normal locations of the digitally represented object, and extracting the surface normal vector information includes identifying the plurality of vectors normal to the surface of the digitally represented object at each surface normal location.

Embodiment 29 is the computing system of embodiment 24, wherein the gradient information is extracted at a plurality of gradient extraction locations of the digitally represented object, the surface normal vector information is extracted at a plurality of surface normal locations of the digitally represented object, and the plurality of gradient extraction locations are different than the plurality of surface normal locations.

Embodiment 30 is the computing system of embodiment 29, wherein the plurality of gradient extraction locations do not overlap with the plurality of surface normal locations.

Embodiment 31 is the computing system of embodiment 29, wherein the plurality of gradient extraction locations are disposed at edges of the digitally represented object and the plurality of surface normal locations are disposed away from the edges of the digitally represented object.

Embodiment 32 is a method of generating an object recognition template for identifying an object in a scene comprising: obtaining object information including a digitally represented object; extracting two-dimensional measurement information from the object information; extracting three-dimensional measurement information from the object information; and generating an object recognition template according to the two-dimensional measurement information and the three-dimensional measurement information.

Embodiment 33 is the method of embodiment 32, further including: generating feature maps of an object model at a selected viewpoint.

Embodiment 34 is the method of embodiment 32, further including: obtaining image information of the scene; accessing the object recognition template; and comparing the two-dimensional measurement information and the three-dimensional measurement information to the image information to identify the object as corresponding to the digitally represented object.

Embodiment 35 is the method of embodiment 32, wherein extracting the two-dimensional measurement information further includes: extracting gradient information from the object information, the gradient information being indicative of a direction or orientation of a candidate edge of the digitally represented object.

Embodiment 36 is the method of embodiment 32, wherein extracting the three-dimensional measurement information further includes: extracting surface normal vector information from the object information, the surface normal vector information describing a plurality of vectors normal to a surface of the digitally represented object.

Embodiment 37 is the method of embodiment 35, further including: extracting the gradient information at a plurality of gradient extraction locations of the digitally represented object; and analyzing pixel intensity of two-dimensional image information of the object information to measure a direction in which the pixel intensity of the two-dimensional image information at each gradient extraction location is changing.

Embodiment 38 is the method of embodiment 36, further including: extracting the surface normal vector information at a plurality of surface normal locations of the digitally represented object; and identifying the plurality of vectors normal to the surface of the digitally represented object at each surface normal location.

Embodiment 39 is a non-transitory computer readable medium, configured with executable instructions for implementing a method for generating an object recognition template for identifying an object in a scene, operable by at least one processing circuit via a communication interface configured to communicate with a robotic system, the method comprising: receiving object information including a digitally represented object; performing an operation to extract two-dimensional measurement information from the object information; performing an operation to extract three-dimensional measurement information from the object information; and outputting an object recognition template to the robotic system according to the two-dimensional measurement information and the three-dimensional measurement information.

Embodiment 40 is the embodiment of claim 39, further including: receiving image information of the scene; accessing the object recognition template; and outputting a comparison between the two-dimensional measurement information and the three-dimensional measurement information to the image information to the robotic system to identify the object as corresponding to the digitally represented object.

Embodiment 41 is a computing system comprising: at least one processing circuit in communication with a robot, having an arm and an end-effector connected thereto, and a camera having a field of view and configured, when one or more objects are or have been in the field of view, to execute instructions stored on a non-transitory computer-readable medium for: obtaining object image information of an object in a scene; obtaining a detection hypothesis including a corresponding object recognition template representing a template object; identifying a discrepancy between the template object and the object image information; identifying a set of template locations in the template object corresponding to a set of object locations of the object image information; adjusting the set of template locations to converge to the set of object locations; and generating an adjusted detection hypothesis including an adjusted corresponding object recognition template according to the set of template locations after adjustment.

Embodiment 42 is the computing system of embodiment 41, further comprising adjusting the set of template locations by: identifying respective vectors extending between the set of template locations and corresponding ones of the set of object locations; and iteratively adjusting the set of template locations according to the respective vectors.

Embodiment 43 is the computing system of embodiment 42, wherein iteratively adjusting the set of template locations includes: iteratively generating an adjusted set of template locations according to magnitudes and directions of the respective vectors acting on the template object, adjusting the respective vectors according to the adjusted set of template locations, and identifying new respective vectors according to the adjusted set of template locations until a quality of alignment surpasses a threshold.

Embodiment 44 is the computing system of embodiment 43, wherein the quality of alignment is determined based on a level of misalignment defined by the new respective vectors.

Embodiment 45 is the computing system of embodiment 43, wherein the quality of alignment is determined based on distance measurements between the adjusted set of template locations and the set of object locations.

Embodiment 46 is the computing system of embodiment 45, wherein the distance measurements include Euclidean distance measurements.

Embodiment 47 is the computing system of embodiment 45, wherein the distance measurements include cosine distances between surface normal vectors associated with the adjusted set of template locations and the set of object locations.

Embodiment 48 is the computing system of embodiment 47, wherein the cosine distances indicate angles between the surface normal vectors, and wherein sizes of the angles correlates with the quality of alignment.

Embodiment 49 is the computing system of embodiment 45, wherein the distance measurements are measurements from a first location of the adjusted set of template locations to a plane of a second location of the set of object locations.

Embodiment 50 is the computing system of embodiment 43, wherein the quality of alignment is determined by a rate of convergence between the adjusted set of template locations and the set of object locations.

Embodiment 51 is the system of embodiment 41 further including: obtaining the detection hypothesis by overlaying the object recognition template with image information of the scene to identify the object image information based on comparisons between template gradient information and template surface normal vector information of the object recognition template and object gradient information and object surface normal vector information extracted from the image information.

Embodiment 52 is a method comprising: obtaining object image information of an object in a scene; obtaining a detection hypothesis including a corresponding object recognition template representing a template object; identifying a discrepancy between the template object and the object image information; identifying a set of template locations in the template object corresponding to a set of object locations of the object image information; adjusting the set of template locations to converge to the set of object locations; and generating an adjusted detection hypothesis including an adjusted corresponding object recognition template according to the set of template locations after adjustment.

Embodiment 53 is the method of embodiment 52, wherein adjusting the set of template locations further includes: identifying respective vectors extending between the set of template locations and corresponding ones of the set of object locations; and adjusting the set of template locations in an iterative manner according to the respective vectors.

Embodiment 54 is the method of embodiment 53, further including: generating an adjusted set of template locations in an iterative manner according to magnitudes and directions of the respective vectors acting on the template object, adjusting the respective vectors according to the adjusted set of template locations, and identifying new respective vectors according to the adjusted set of template locations until a quality of alignment surpasses a threshold.

Embodiment 55 is the method of embodiment 54, further including: determining the quality of alignment based on a level of misalignment defined by the new respective vectors.

Embodiment 56 is the method of embodiment 54, further including: determining the quality of alignment based on distance measurements between the adjusted set of template locations and the set of object locations.

Embodiment 57 is the method of embodiment 54, further including: determining the quality of alignment by a rate of convergence between the adjusted set of template locations and the set of object locations.

Embodiment 58 is the method of embodiment 52 wherein obtaining the detection hypothesis further includes: overlaying the object recognition template with image information of the scene to identify the object image information based on comparisons between template gradient information and template surface normal vector information of the object recognition template and object gradient information and object surface normal vector information extracted from the image information.

Embodiment 59 is a non-transitory computer readable medium, configured with executable instructions for implementing a method for refining a detection hypothesis, operable by at least one processing circuit via a communication interface configured to communicate with a robotic system, the method comprising: receiving object image information of an object in a scene; receiving a detection hypothesis including a corresponding object recognition template representing a template object; performing an operation to identify a discrepancy between the template object and the object image information; performing an operation to identify a set of template locations in the template object corresponding to a set of object locations of the object image information; performing an operation to adjust the set of template locations to converge to the set of object locations; and outputting to the robotic system an adjusted detection hypothesis including an adjusted corresponding object recognition template according to the set of template locations after adjustment.

Embodiment 60 is the method of embodiment 59 wherein the operation to adjust the set of template locations includes: performing an operation to identify respective vectors extending between the set of template locations and corresponding ones of the set of object locations; and performing an operation to adjust the set of template locations after iteratively adjusting the set of template locations according to the respective vectors.

Embodiment 61 is a computing system comprising: at least one processing circuit in communication with a robot, having an arm and an end-effector connected thereto, and a camera having a field of view and configured, when one or more objects are or have been in the field of view, to execute instructions stored on a non-transitory computer-readable medium for: obtaining object image information of an object in a scene; obtaining a set of detection hypotheses, each detection hypothesis including a corresponding object recognition template representing a template object; and validating each detection hypothesis of the set of detection hypotheses by: generating a plurality of three-dimensional validation scores based on comparing three-dimensional information of the object recognition template of the detection hypothesis and three-dimensional information of the object image information corresponding to the object, the plurality of three-dimensional validation scores including at least one of an occlusion validator score, a point cloud validator score, a hole matching validator score, and a normal vector validator score; generating a plurality of two-dimensional validation scores based on comparing two-dimensional information of the corresponding object recognition template of the detection hypothesis and three-dimensional information of the object image information, the plurality of two-dimensional validation scores including at least one of a rendered match validator score and a template match validator score; filtering the detection hypothesis from the set of detection hypotheses according to the plurality of three-dimensional validation scores and the plurality of two-dimensional validation scores; and detecting the object in the scene according to unfiltered detection hypotheses remaining in the set of detection hypotheses after validating.

Embodiment 62 is the computing system of embodiment 61 wherein the instructions are further configured for: performing a robot motion planning procedure for retrieval of the object from the scene; and outputting a command to move the robot to retrieve the object.

Embodiment 63 is the computing system of embodiment 61, wherein the plurality of three-dimensional validation scores include the point cloud validator score, the point cloud validator score being obtained by: comparing object locations obtained from the object image information to a surface of the template object; identifying inconsistencies between the object locations and the surface to obtain the point cloud validator score.

Embodiment 64 is the computing system of embodiment 63, wherein invalid object locations are identified according to the inconsistencies placing the object locations beneath the surface of the template object, and the point cloud validator score is based on the invalid object locations.

Embodiment 65 is the computing system of embodiment 61, wherein the plurality of three-dimensional validation scores include the occlusion validator score, the occlusion validator score being obtained by: comparing object locations obtained from the object image information to a surface of the template object; identifying inconsistencies between the object locations and the surface to obtain the occlusion validator score.

Embodiment 66 is the computing system of embodiment 65, wherein occlusions are identified according to inconsistencies placing the corresponding object locations above or outside the surface of the template object, and the occlusion validator score is based on the occlusions.

Embodiment 67 is the computing system of embodiment 61, wherein the plurality of three-dimensional validation scores include the normal vector validator score, the normal vector validator score being obtained by: comparing surface normal vectors obtained from the object image information to corresponding surface normal vectors of the template object; identifying inconsistencies between the surface normal vectors and the corresponding surface normal vectors to obtain the normal vector validator score.

Embodiment 68 is the computing system of embodiment 61, wherein the plurality of three-dimensional validation scores includes the hole matching validator score, the hole matching validator score being obtained by: comparing object locations obtained from the object image information to a structure of the template object; identifying inconsistencies between the object locations and the structure to identify hole invalidity according to object locations at locations that correspond to empty volumes in the structure of the template object.

Embodiment 69 is the computing system of embodiment 61, wherein the rendered match validator score is obtained by: generating a two-dimensional rendering of the object in the scene, and comparing rendered edges of the two-dimensional rendering of the object with extracted edges of the template object to identify invalid edges.

Embodiment 70 is the computing system of embodiment 61, wherein validating each detection hypothesis of the set of detection hypotheses further includes comparing the corresponding object recognition template to scene elements other than an object corresponding to the template object.

Embodiment 71 is the computing system of embodiment 70, wherein comparing the corresponding object recognition template representing an estimated object to scene elements includes determining whether the object corresponding to the template object is within a container.

Embodiment 72 is the computing system of embodiment 71, wherein filtering the detection hypothesis from the set of detection hypotheses includes comparing the occlusion validator score, the point cloud validator score, the hole matching validator score, the normal vector validator score, the rendered match validator score, and the template match validator score to corresponding thresholds, wherein the detection hypothesis is removed from the set of detection hypotheses if any of the three-dimensional validation scores or the two-dimensional validation scores fail to exceed the corresponding thresholds and wherein the detection hypothesis remains within the set of detection hypotheses if the three-dimensional validation scores and the two-dimensional validation scores exceed all of the corresponding thresholds.

Embodiment 73 is a method comprising: obtaining object image information of an object in a scene; obtaining a set of detection hypotheses, each detection hypothesis including a corresponding object recognition template representing a template object; and validating each detection hypothesis of the set of detection hypotheses by: generating a plurality of three-dimensional validation scores based on comparing three-dimensional information of the object recognition template of the detection hypothesis and three-dimensional information of the object image information corresponding to the object, the plurality of three-dimensional validation scores including at least one of an occlusion validator score, a point cloud validator score, a hole matching validator score, and a normal vector validator score; generating a plurality of two-dimensional validation scores based on comparing two-dimensional information of the corresponding object recognition template of the detection hypothesis and three-dimensional information of the object image information, the plurality of two-dimensional validation scores including at least one of a rendered match validator score and a template match validator score; filtering the detection hypothesis from the set of detection hypotheses according to the plurality of three-dimensional validation scores and the plurality of two-dimensional validation scores; and detecting the object in the scene according to unfiltered detection hypotheses remaining in the set of detection hypotheses after validating.

Embodiment 74 is the method of embodiment 73 further including: performing a robot motion planning procedure for retrieval of the object from the scene; and outputting a command to move a robot to retrieve the object.

Embodiment 75 is the method of embodiment 73, wherein generating the plurality of three-dimensional validation scores further includes: obtaining the normal vector validator score, the normal vector validator score being obtained by: comparing surface normal vectors obtained from the object image information to corresponding surface normal vectors of the template object; and identifying inconsistencies between the surface normal vectors and the corresponding surface normal vectors to obtain the normal vector validator score.

Embodiment 76 is the method of embodiment 73, wherein obtaining the hole matching validator score includes: comparing object locations obtained from the object image information to a structure of the template object; and identifying inconsistencies between the object locations and the structure to identify hole invalidity according to object locations at locations that that correspond to empty volumes in the structure of the template object.

Embodiment 77 is the method of embodiment 73, wherein obtaining the rendered match validator score includes: generating a two-dimensional rendering of the object in the scene, and comparing rendered edges of the two-dimensional rendering of the object with extracted edges of the template object to identify invalid edges.

Embodiment 78 is the method of embodiment 73, wherein validating each detection hypothesis of the set of detection hypotheses further includes: comparing the corresponding object recognition template to scene elements other than an object corresponding to the template object.

Embodiment 79 is the method of embodiment 73, wherein filtering the detection hypothesis from the set of detection hypotheses includes: comparing the occlusion validator score, the point cloud validator score, the hole matching validator score, the normal vector validator score, the rendered match validator score, and the template match validator score to corresponding thresholds, removing the detection hypothesis from the set of detection hypotheses if any of the three-dimensional validation scores or the two-dimensional validation scores fail to exceed the corresponding thresholds; and keeping the detection hypothesis within the set of detection hypotheses if the three-dimensional validation scores and the two-dimensional validation scores exceed all of the corresponding thresholds.

Embodiment 80 is A non-transitory computer readable medium, configured with executable instructions for implementing a method for validating a detection hypothesis, operable by at least one processing circuit via a communication interface configured to communicate with a robotic system, the method comprising: receiving object image information of an object in a scene; receiving a set of detection hypotheses, each detection hypothesis including a corresponding object recognition template representing a template object; performing an operation to generate a plurality of three-dimensional validation scores based on comparing three-dimensional information of the object recognition template of the detection hypothesis and three-dimensional information of the object image information corresponding to the object, the plurality of three-dimensional validation scores including at least one of an occlusion validator score, a point cloud validator score, a hole matching validator score, and a normal vector validator score; performing an operation to generate a plurality of two-dimensional validation scores based on comparing two-dimensional information of the corresponding object recognition template of the detection hypothesis and three-dimensional information of the object image information, the plurality of two-dimensional validation scores including at least one of a rendered match validator score and a template match validator score; performing an operation to filter the detection hypothesis from the set of detection hypotheses according to the plurality of three-dimensional validation scores and the plurality of two-dimensional validation scores; detecting the object in the scene according to unfiltered detection hypotheses remaining in the set of detection hypotheses after validating; and outputting the detected object in the scene to the robotic system.

Embodiment 81 is the method of embodiment 13, wherein the three-dimensional space is substantially spherical and the object model is fixed at the center of the three-dimensional space.

Embodiment 82 is the method of embodiment 14, wherein each camera location corresponds to a set of viewpoints, each viewpoint of the set of viewpoints corresponding to a different camera rotation angle.

Embodiment 83 is the method of embodiment 14, wherein a subset of the set of object recognition templates includes object recognition templates corresponding to viewpoints corresponding to different locations and to different camera rotation angles.

Embodiment 84 is the method of embodiment 32, wherein the digitally represented object is an object model and extracting the two-dimensional measurement information and the three-dimensional measurement is performed to generate feature maps of the object model at a selected viewpoint.

Embodiment 85 is the method of embodiment 32, wherein the object information includes registration data of the object and the digitally represented object includes an object model.

Embodiment 86 is the method of embodiment 32, wherein the object information includes at least one of two-dimensional image information and three-dimensional image information.

Embodiment 87 is the method of embodiment 36, wherein the gradient information is extracted at a plurality of gradient extraction locations of the digitally represented object, the surface normal vector information is extracted at a plurality of surface normal locations of the digitally represented object, and the plurality of gradient extraction locations are different than the plurality of surface normal locations.

Embodiment 88 is the method of embodiment 87, wherein the plurality of gradient extraction locations do not overlap with the plurality of surface normal locations.

Embodiment 89 is the method of embodiment 87, wherein the plurality of gradient extraction locations are disposed at edges of the digitally represented object and the plurality of surface normal locations are disposed away from the edges of the digitally represented object.

Embodiment 90 is the method of embodiment 56, wherein the distance measurements include Euclidean distance measurements.

Embodiment 91 is the method of embodiment 56, wherein the distance measurements include cosine distances between surface normal vectors associated with the adjusted set of template locations and the set of object locations.

Embodiment 92 is the method of embodiment 91, wherein the cosine distances indicate angles between the surface normal vectors, and wherein sizes of the angles correlates with the quality of alignment.

Embodiment 93 is the method of embodiment 56, wherein the distance measurements are measurements from a first location of the adjusted set of template locations to a plane of a second location of the set of object locations.

Embodiment 94 is the method of embodiment 73, wherein the plurality of three-dimensional validation scores include the point cloud validator score, the point cloud validator score being obtained by: comparing object locations obtained from the object image information to a surface of the template object; identifying inconsistencies between the object locations and the surface to obtain the point cloud validator score.

Embodiment 95 is the method of embodiment 94, wherein invalid object locations are identified according to the inconsistencies placing the object locations beneath the surface of the template object, and the point cloud validator score is based on the invalid object locations.

Embodiment 96 is the method of embodiment 73, wherein the plurality of three-dimensional validation scores include the occlusion validator score, the occlusion validator score being obtained by: comparing object locations obtained from the object image information to a surface of the template object; identifying inconsistencies between the object locations and the surface to obtain the occlusion validator score.

Embodiment 97 is the method of embodiment 96, wherein occlusions are identified according to inconsistencies placing the corresponding object locations above or outside the surface of the template object, and the occlusion validator score is based on the occlusions.

Embodiment 98 is the method of embodiment 78, wherein comparing the corresponding object recognition template representing an estimated object to scene elements includes determining whether the object corresponding to the template object is within a container.

The invention claimed is:

1. A computing system comprising:
    at least one processing circuit in communication with a robot, having an arm and an end-effector connected thereto, and a camera having a field of view and configured, when one or more objects are or have been in the field of view, to execute instructions stored on a non-transitory computer-readable medium for:
    obtaining object image information of an object in a scene;
    generating one or more detection hypotheses, wherein the one or more detection hypotheses correspond to an object recognition template representing a template object; and
    validating each detection hypothesis of the one or more detection hypotheses by:
        generating one or more three-dimensional validation scores based on comparing three-dimensional information of the object recognition template of the one or more detection hypotheses and three-dimensional information of the object image information corresponding to the object, the one or more three-dimensional validation scores including at least one of an occlusion validator score, a three-demensional information validator score, a hole matching validator score, and a normal vector validator score;
        generating one or more two-dimensional validation scores based on comparing two-dimensional information of the corresponding object recognition template of the one or more detection hypotheses and two-dimensional information of the object image information, the one or more two-dimensional validation scores including at least one of a rendered match validator score and a template match validator score;
        selecting a detection hypothesis from the one or more detection hypotheses according to the one or more three-dimensional validation scores and the one or more two-dimensional validation scores; and
    generating a detection result for the object in the scene according to the selected detection hypothesis.

2. The computing system of claim 1 wherein the instructions are further configured for:
    performing a robot motion planning procedure for retrieval of the object from the scene; and
    outputting a command to move the robot to retrieve the object.

3. The computing system of claim 1, wherein the one or more three-dimensional validation scores include the three-dimensional information validator score, the three-dimensional information validator score being obtained by:
    comparing object locations obtained from the object image information to a surface of the template object;
    identifying inconsistencies between the object locations and the surface to obtain the three-dimensional information validator score.

4. The computing system of claim 3, wherein invalid object locations are identified according to the inconsistencies placing the object locations beneath the surface of the template object, and
    the three-dimensional information validator score is based on the invalid object locations.

5. The computing system of claim 1, wherein the one or more three-dimensional validation scores include the occlusion validator score, the occlusion validator score being obtained by:
    comparing object locations obtained from the object image information to a surface of the template object;
    identifying inconsistencies between the object locations and the surface to obtain the occlusion validator score.

6. The computing system of claim 5, wherein occlusions are identified according to inconsistencies placing corresponding object locations above or outside the surface of the template object, and
    the occlusion validator score is based on the occlusions.

7. The computing system of claim 1, wherein the one or more three-dimensional validation scores include the normal vector validator score, the normal vector validator score being obtained by:
    comparing surface normal vectors obtained from the object image information to corresponding surface normal vectors of the template object;
    identifying inconsistencies between the surface normal vectors and the corresponding surface normal vectors to obtain the normal vector validator score.

8. The computing system of claim 1, wherein the one or more three-dimensional validation scores includes the hole matching validator score, the hole matching validator score being obtained by:
    comparing object locations obtained from the object image information to a structure of the template object;
    identifying inconsistencies between the object locations and the structure to identify hole invalidity according to object locations that correspond to empty volumes in the structure of the template object.

9. The computing system of claim 1, wherein the rendered match validator score is obtained by:
    generating a two-dimensional rendering of the object in the scene, and
    comparing rendered edges of the two-dimensional rendering of the object with extracted edges of the template object to identify invalid edges.

10. The computing system of claim 1, wherein validating each detection hypothesis of the one or more detection hypotheses further includes comparing the corresponding object recognition template to scene elements other than an object corresponding to the template object.

11. The computing system of claim 10, wherein comparing the corresponding object recognition template representing an estimated object to scene elements includes determining whether the object corresponding to the template object is within a container.

12. The computing system of claim 1, wherein filtering the detection hypothesis from the one or more detection hypotheses includes comparing the occlusion validator score, the three-dimensional information validator score, the hole matching validator score, the normal vector validator score, the rendered match validator score, and the template match validator score to corresponding thresholds, wherein the detection hypothesis is removed from the one or more detection hypotheses if any of the one or more three-dimensional validation scores or the one or more two-dimensional validation scores fail to exceed the corresponding thresholds and wherein the detection hypothesis remains within the one or more detection hypotheses if the one or more three-dimensional validation scores and the one or more two-dimensional validation scores exceed all of the corresponding thresholds.

13. A method comprising:
obtaining object image information of an object in a scene;
generating one or more detection hypotheses, wherein the one or more detection hypotheses correspond to an object recognition template representing a template object; and
validating each detection hypothesis of the one or more detection hypotheses by:
  generating one or more three-dimensional validation scores based on comparing three-dimensional information of the object recognition template of the one or more detection hypothesis and three-dimensional information of the object image information corresponding to the object, the one or more three-dimensional validation scores including at least one of an occlusion validator score, a three-dimensional information validator score, a hole matching validator score, and a normal vector validator score;
  generating one or more two-dimensional validation scores based on comparing two-dimensional information of the corresponding object recognition template of the one or more detection hypotheses and two-dimensional information of the object image information, the one or more two-dimensional validation scores including at least one of a rendered match validator score and a template match validator score;
  selecting a detection hypothesis from the one or more detection hypotheses according to the one or more three-dimensional validation scores and the one or more two-dimensional validation scores; and
generating a detection result for the object in the scene according to the selected detection hypothesis.

14. The method of claim 13 further including:
performing a robot motion planning procedure for retrieval of the object from the scene; and
outputting a command to move a robot to retrieve the object.

15. The method of claim 13, wherein generating the one or more three-dimensional validation scores further includes:
obtaining the normal vector validator score, the normal vector validator score being obtained by:
  comparing surface normal vectors obtained from the object image information to corresponding surface normal vectors of the template object; and
  identifying inconsistencies between the surface normal vectors and the corresponding surface normal vectors to obtain the normal vector validator score.

16. The method of claim 13, wherein obtaining the hole matching validator score includes:
comparing object locations obtained from the object image information to a structure of the template object; and
identifying inconsistencies between the object locations and the structure to identify hole invalidity according to object locations at locations that correspond to empty volumes in the structure of the template object.

17. The method of claim 13, wherein obtaining the rendered match validator score includes:
generating a two-dimensional rendering of the object in the scene, and
comparing rendered edges of the two-dimensional rendering of the object with extracted edges of the template object to identify invalid edges.

18. The method of claim 13, wherein validating each detection hypothesis of the one or more detection hypotheses further includes:
comparing the corresponding object recognition template to scene elements other than an object corresponding to the template object.

19. The method of claim 13, wherein filtering the detection hypothesis from the one or more detection hypotheses includes:
comparing the occlusion validator score, the three-dimensional information validator score, the hole matching validator score, the normal vector validator score, the rendered match validator score, and the template match validator score to corresponding thresholds,
removing the detection hypothesis from the one or more detection hypotheses if any of the one or more three-dimensional validation scores or the one or more two-dimensional validation scores fail to exceed the corresponding thresholds; and
keeping the detection hypothesis within the one or more detection hypotheses if the one or more three-dimensional validation scores and the one or more two-dimensional validation scores exceed all of the corresponding thresholds.

20. A non-transitory computer readable medium, configured with executable instructions for implementing a method for validating a detection hypothesis, operable by at least one processing circuit via a communication interface configured to communicate with a robotic system, the method comprising:
receiving object image information of an object in a scene;
receiving one or more detection hypotheses, wherein the one or more detection hypotheses correspond to an object recognition template representing a template object;
performing an operation to generate one or more three-dimensional validation scores based on comparing three-dimensional information of the object recognition template of the one or more detection hypotheses and three-dimensional information of the object image information corresponding to the object, the one or more three-dimensional validation scores including at least one of an occlusion validator score, a three-dimensional information validator score, a hole matching validator score, and a normal vector validator score;
performing an operation to generate one or more two-dimensional validation scores based on comparing two-dimensional information of the corresponding object recognition template of the one or more detection hypotheses and two-dimensional information of the object image information, the one or more two-dimensional validation scores including at least one of a rendered match validator score and a template match validator score;
performing an operation to select a detection hypothesis from the one or more detection hypotheses according to the one or more three-dimensional validation scores and the one or more two-dimensional validation scores;

detecting the object in the scene according to unfiltered detection hypotheses remaining in the one or more detection hypotheses after validating; and outputting the detected object in the scene to the robotic system.

* * * * *